(12) United States Patent
Kondo

(10) Patent No.: US 9,872,023 B2
(45) Date of Patent: Jan. 16, 2018

(54) IMAGE PROCESSING APPARATUS AND METHOD

(71) Applicant: SONY CORPORATION, Tokyo (JP)

(72) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/611,246

(22) Filed: Jun. 1, 2017

(65) Prior Publication Data

US 2017/0280138 A1 Sep. 28, 2017

Related U.S. Application Data

(62) Division of application No. 12/817,606, filed on Jun. 17, 2010, now Pat. No. 9,712,821.

(30) Foreign Application Priority Data

Jul. 31, 2009 (JP) ................................. 2009-179396

(51) Int. Cl.
| | | |
|---|---|---|
| *H04N 19/117* | (2014.01) | |
| *H04N 19/70* | (2014.01) | |
| *H04N 19/172* | (2014.01) | |
| *H04N 19/86* | (2014.01) | |
| *H04N 19/127* | (2014.01) | |
| *H04N 19/82* | (2014.01) | |

(52) U.S. Cl.
CPC ......... *H04N 19/117* (2014.11); *H04N 19/127* (2014.11); *H04N 19/172* (2014.11); *H04N 19/70* (2014.11); *H04N 19/82* (2014.11); *H04N 19/86* (2014.11)

(58) Field of Classification Search
CPC .. H04N 19/117; H04N 19/127; H04N 19/172; H04N 19/70; H04N 19/82; H04N 19/86
See application file for complete search history.

(56) References Cited

U.S. PATENT DOCUMENTS

| 4,903,128 A | 2/1990 | Thoreau |
|---|---|---|
| 2006/0078209 A1 | 4/2006 | Kobayashi |

(Continued)

FOREIGN PATENT DOCUMENTS

| JP | 2004-159331 A | 6/2004 |
|---|---|---|
| JP | 2004-180248 A | 6/2004 |

(Continued)

OTHER PUBLICATIONS

Yi-Jen Chiu et al., "Adaptive (Wiener) Filter for Video Compression", ITU-T SG16 Contribution, C437, Apr. 2008, 7 pages.
Takeshi Chujoh et al., "Block-based Adaptive Loop Filter", ITU-T SG16 Q6 VCEG Contribution, AI18, Jul. 16-18, 2008, 6 pages.

(Continued)

*Primary Examiner* — Anner N Holder
(74) *Attorney, Agent, or Firm* — Oblon, McClelland, Maier & Neustadt, L.L.P.

(57) ABSTRACT

Provided is an image processing apparatus which includes a setting unit assigning a control block, which is a control unit of a filter process that is locally performed with respect to an image, to an initial position of the image determined based on a predetermined reference point; a movement unit moving the control block, which has been assigned to the initial position of the image by the setting unit, up to a position in which the result of the filter process is improved; and a filter processing unit performing the filter process for the respective control blocks which has been moved by the movement unit.

21 Claims, 33 Drawing Sheets

(56) References Cited

U.S. PATENT DOCUMENTS

| | | | |
|---|---|---|---|
| 2007/0183676 A1 | 8/2007 | Hannuksela et al. |
| 2008/0008250 A1 | 1/2008 | Mori et al. |
| 2008/0130756 A1 | 6/2008 | Sekiguchi et al. |
| 2008/0247467 A1 | 10/2008 | Rusanovskyy |
| 2009/0010331 A1 | 1/2009 | Jeon et al. |
| 2010/0002770 A1 | 1/2010 | Motta et al. |

FOREIGN PATENT DOCUMENTS

| | | |
|---|---|---|
| JP | 2007-027980 A | 2/2007 |
| JP | 2007-235456 A | 9/2007 |
| JP | 2008-182562 A | 8/2008 |
| JP | 2011-503979 A | 1/2011 |
| WO | WO 2009-074117 A1 | 6/2009 |

OTHER PUBLICATIONS

Takeshi Chujoh et al., "Specification and experimental results of Quadtree-based Adaptive Loop Filter", ITU-T SG16 Q6 VCEG Contribution, VCEG-AK22(r1), Apr. 15-18, 2009, 11 pages.

Office Action dated Jan. 9, 2014 in Japanese Patent Application No. 2013-051883.

Office Action dated Jan. 9, 2014 in Japanese Patent Application No. 2013-051884.

Office Action dated Jul. 14, 2015 in Japanese Patent Application No. 2014-131807.

Chinese Office Action issued in Application No. 201310447241.6, dated Feb. 23, 2016. With English translation (18 pages).

Japanese Office Action issued in Application No. 2014-131807, dated Mar. 8, 2016. (5 pages).

Japanese Office Action dated Oct. 4, 2016 in Japanese Patent Application No. 2014-131807.

FIG. 4A
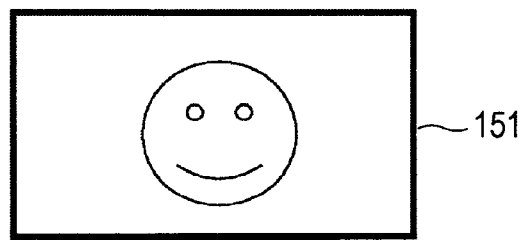
FIG. 4B
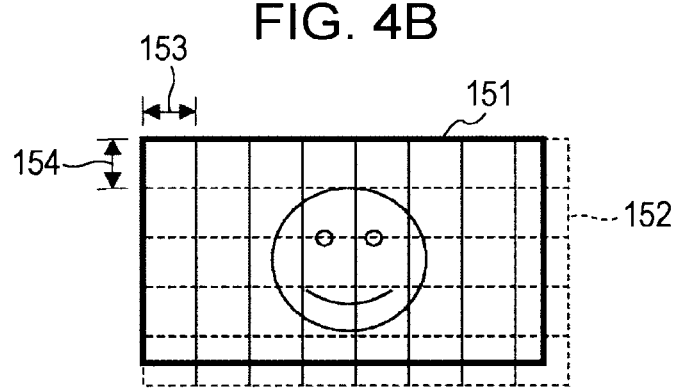
FIG. 4C

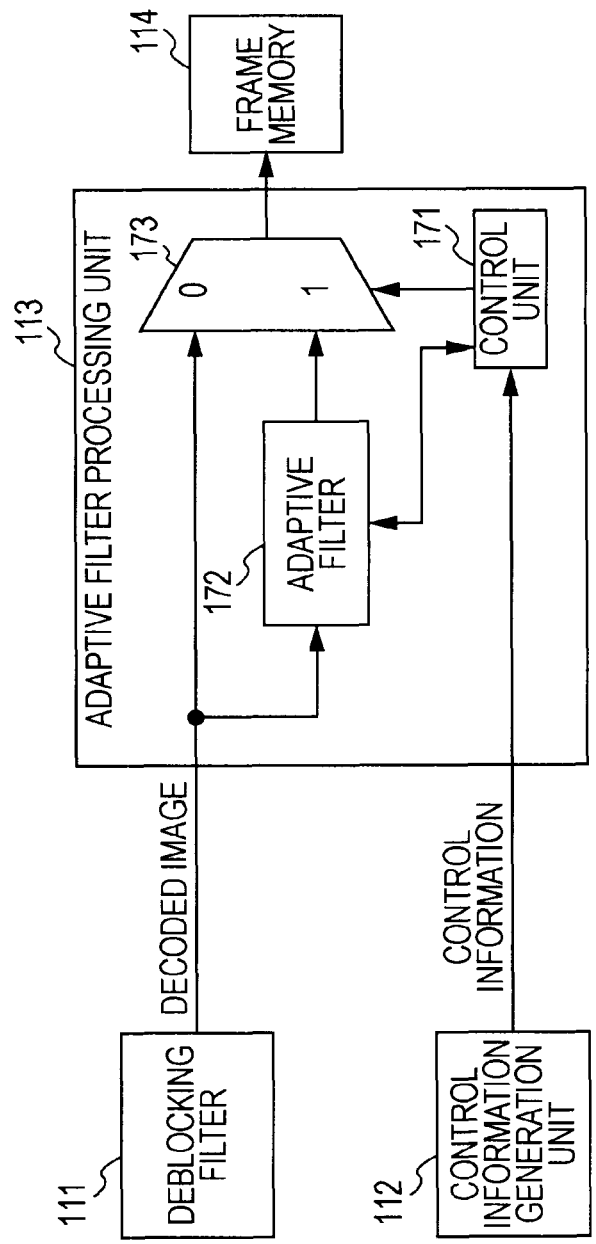

FIG. 12

| slice_header( ) { | Descriptor |
|---|---|
| ... | |
| adaptive_loopfilter_flag | u(1) |
| while( !byte_aligned() ) { | |
|    alignment_one_bit  /* equal to 1 */ | u(1) |
| } | |
| if( adaptive_loopfilter_flag) { | |
|    adaptive_loopfilter_data( ) | |
| } | |
| } | |

FIG. 13

| adaptive_loopfilter_data( ) { | Descriptor |
|---|---|
| pred_coef_mode | u(1) |
| alf_tap_size_luma | ue(v) |
| for( i = 0; i < num_of_coeff_luma; i ++ ) { | |
| filter_coeff_luma[i] | se(v) |
| } | |
| alf_chroma_idc | u(2) |
| if(alf_chroma_idc!=0) { | |
| alf_tap_size_chroma | ue(v) |
| for(i = 0; i < num_of_coeff_chroma, i ++ ) { | |
| filter_coeff_chroma[i] | se(v) |
| } | |
| } | |
| block_control_flag | u(1) |
| if(block_adaptive_control_flag==1) { | |
| alf_block_ofst_x | u(3) |
| alf_block_size_x_idx | u(3) |
| alf_block_ofst_y | u(3) |
| alf_block_size_y_idx | u(3) |
| qt_partition_flag | u(1) |
| if(qt_partition_flag) { | |
| quadtree_based_block_partitioning( ) | |
| } | |
| else { | |
| for(i = 0; i < num_of_block; i ++) { | |
| filter_block_flag[i] | ue(v)\|ae(v) |
| } | |
| } | |
| } | |
| while( !byte_aligned() ) { | |
| alignment_one_bit   /* equal to 1 */ | u(1) |
| } | |
| } | |

FIG. 28

| quadtree_based_block_partitioning( ) { | Descriptor |
|---|---|
|   max_layer_level | u(2) |
|   for( i = 0; i < num_of_parent_block; i ++ ) { | |
|     for(j=0; j < max_layer_level; j++) { | |
|       for(k=0; k < num_of_child_block[j]; k++) { | |
|         if(j==0 \|\| valid_block_flag[j][k]==1) { | |
|           block_partition_flag[i][j][k] | u(1) |
|           if(block_partition_flag[i][j][k]==0) { | |
|             for(l=0; l<4; l++) { | |
|               valid_block_flag[i][j+1][(k<<2)+l]=0 | |
|             } | |
|           } | |
|         } | |
|         else { | |
|         for(l=0; l<4; l++) { | |
|           valid_block_flag[i][j+1][(k<<2)+l]=0 | |
|         } | |
|         } | |
|       } | |
|     } | |
|     for(j=0; j<=max_layer_level; j++) { | |
|       for(k=0; k<num_of_child_block[j]; k++) { | |
|         if(valid_block_flag[i][j][k]==1 &&<br>          block_partition_flag[i][j][k]==0) { | |
|           filter_block_flag[i][j][k] | u(1) |
|         } | |
|       } | |
|     } | |
|   } | |
| } | |

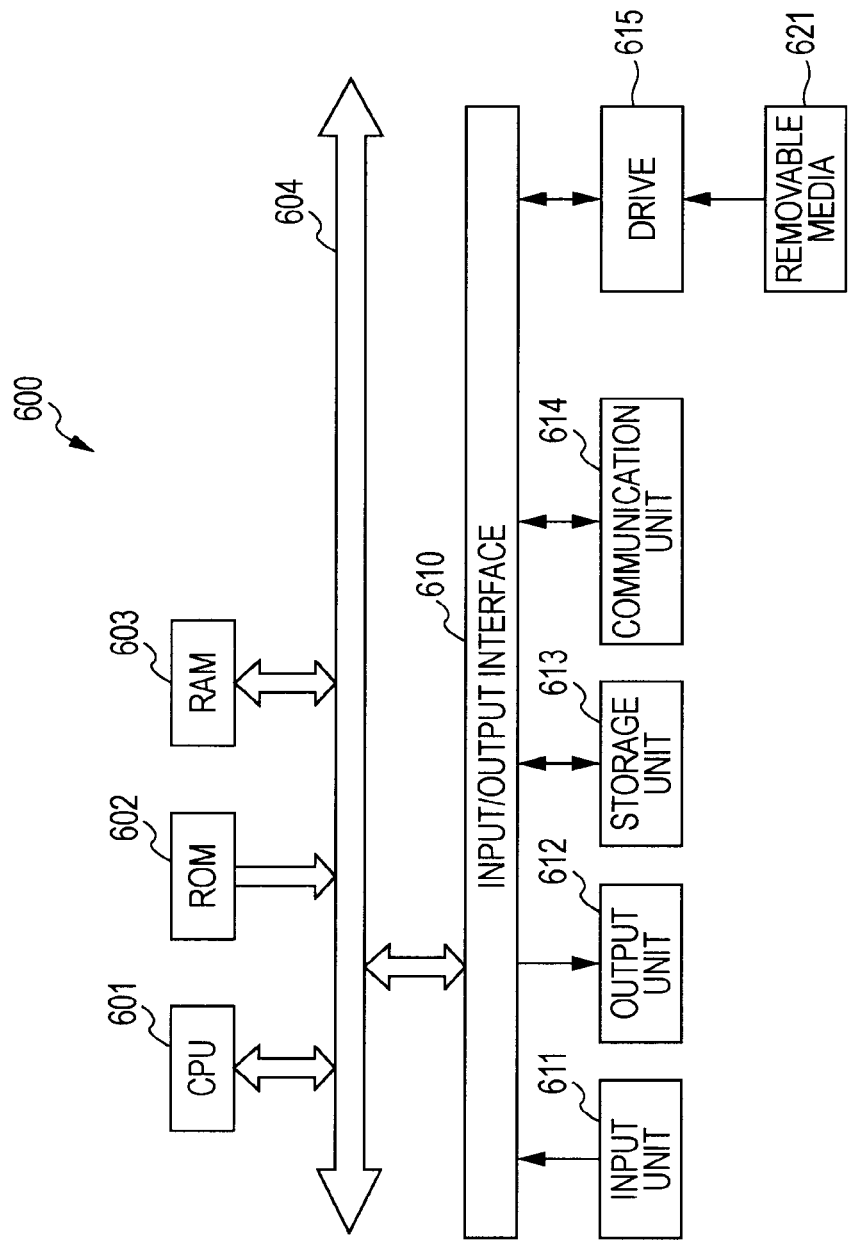

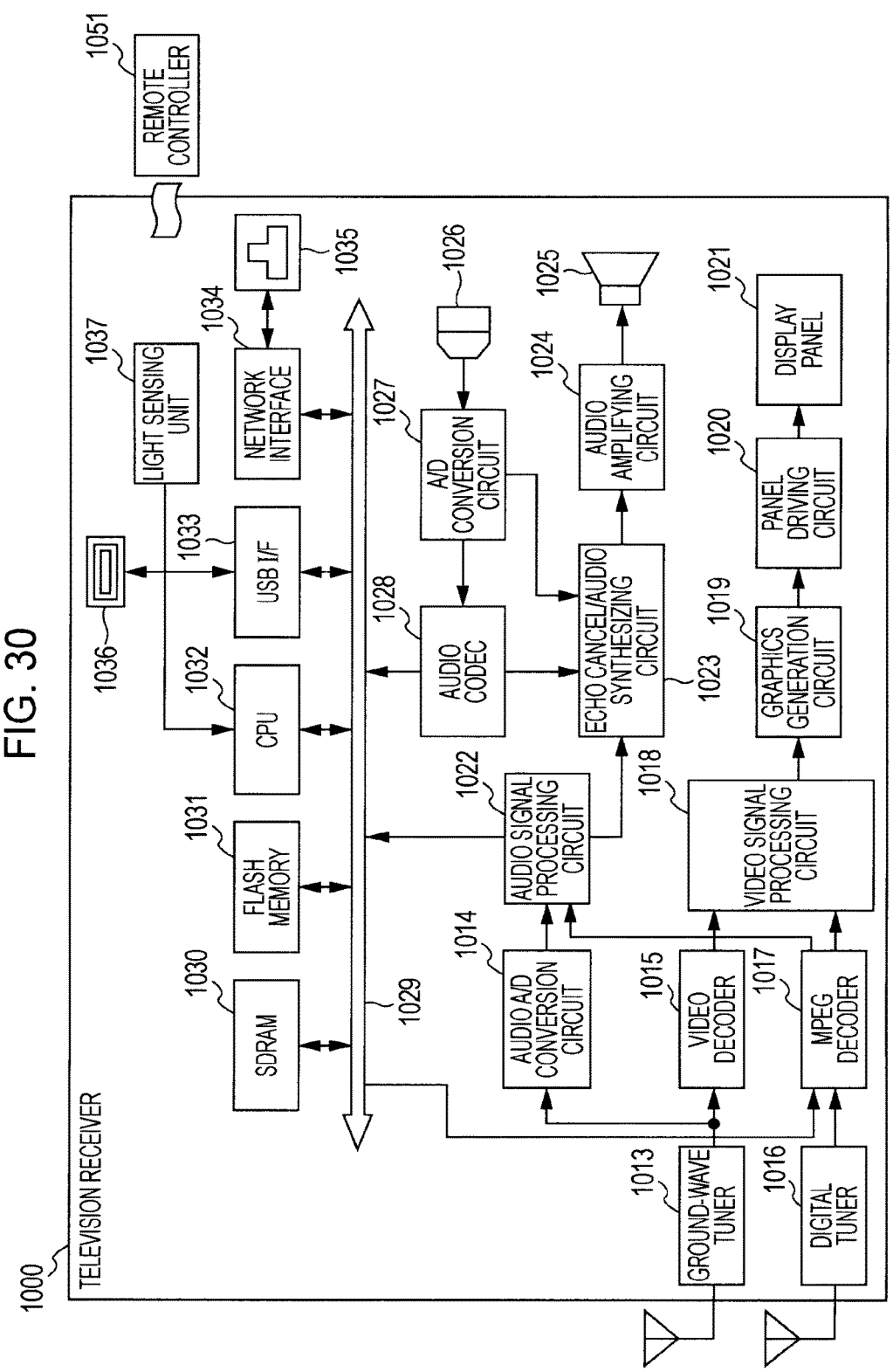

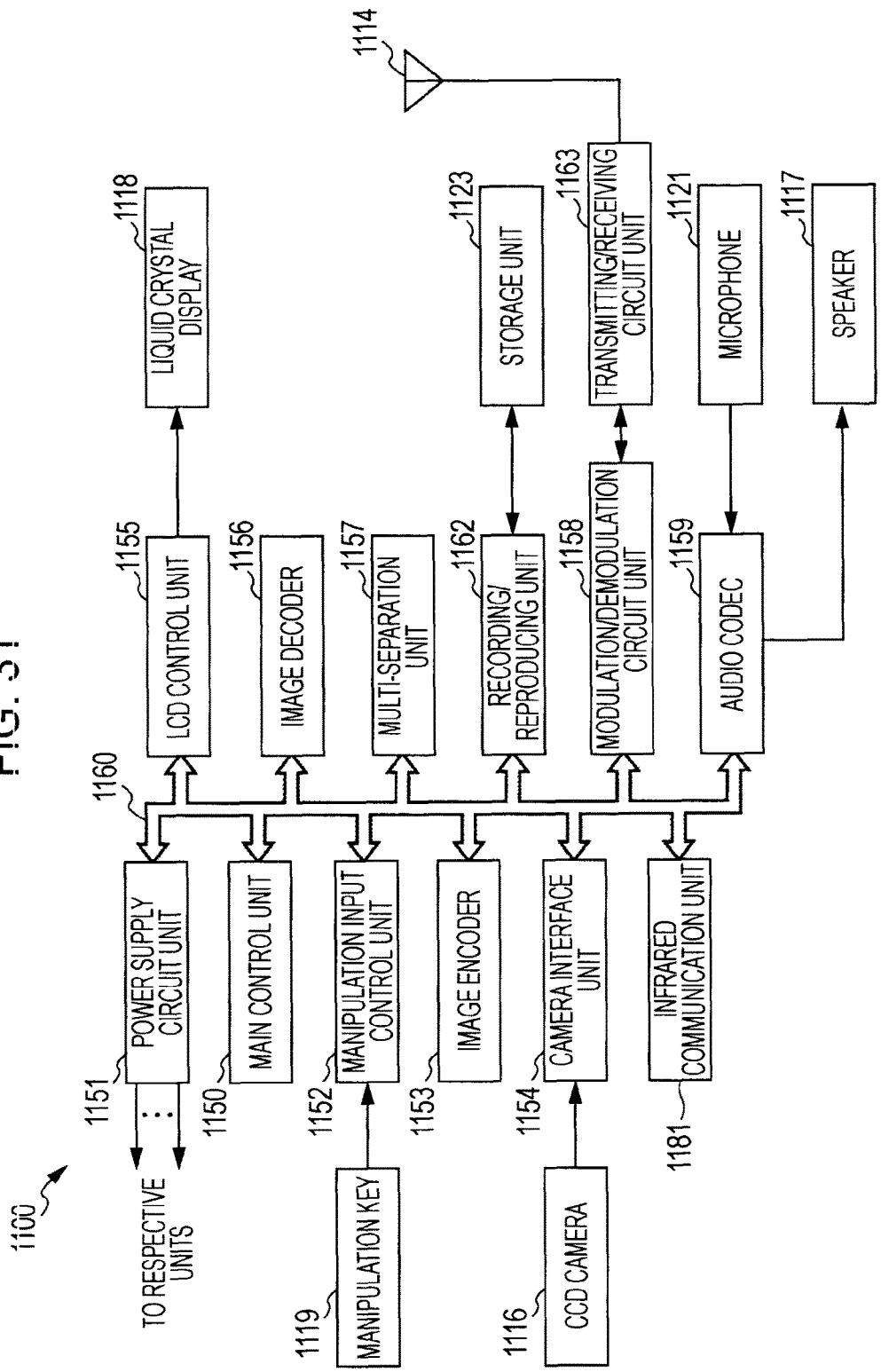

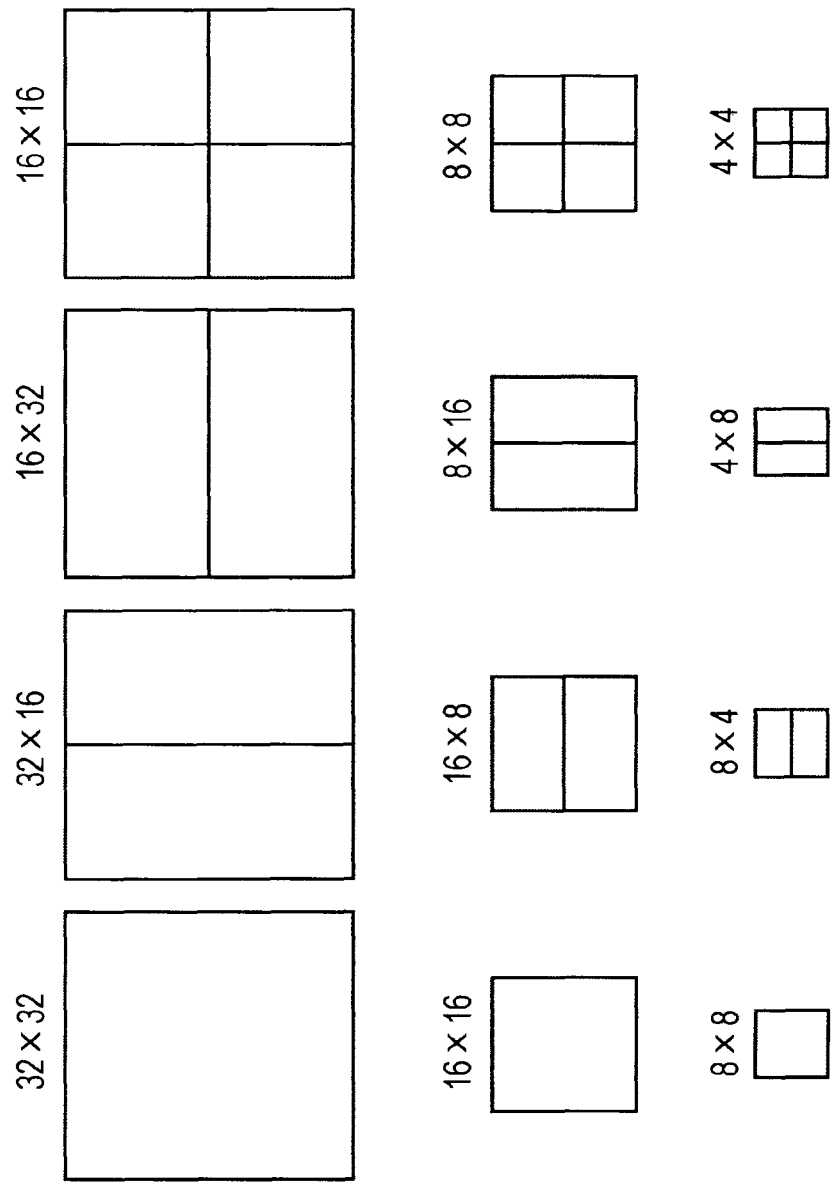

IMAGE PROCESSING APPARATUS AND METHOD

CROSS-REFERENCE

The present application is a divisional of U.S. application Ser. No. 12/817,606, filed Jun. 17, 2010, the entire contents of which are incorporated herein by reference. U.S. application Ser. No. 12/817,606 claims foreign priority to Japanese Application No. 2009-179396, filed Jul. 31, 2009.

BACKGROUND OF THE INVENTION

1. Field of the Invention

The present invention relates to an image processing apparatus and method. In particular, the present invention relates to an image processing apparatus and method, which can more appropriately perform a local control of a filter process during an encoding or decoding operation.

2. Description of the Related Art

Recently, devices complied with an MPEG (Moving Picture Experts Group) system or the like, which manage image information as digital information, and compress, for the purpose of transmitting and accumulating information having high efficiency, the image information by an orthogonal transform such as a discrete cosine transform and motion compensation using redundancy peculiar to the image information, have been widely used on both sides of a broadcasting station for transferring the information and general home for receiving the information.

In particular, MPEG-2 (ISO (International Organization for Standardization)/IEC (International Electrotechnical Commission) 13818-2) has been defined as a general purpose image encoding method, and has been widely used in widespread applications for professional use and consumer use as the standard encompassing both an interlaced scan image and a progressive scan image, a standard-resolution image, and high-definition image. By using the MPEG-2 compression method, for example, by assigning a code rate (bit rate) of 4 to 8 Mbps to a standard-resolution interlaced scan image having 720×480 pixels and a code rate of 18 to 22 Mbps to a high-resolution interlaced scan image having 1920×1088 pixels, a high compression rate and a good picture quality can be realized.

Although MPEG-2 is mainly for the high picture quality encoding that is suitable to broadcasting, it does not yet cope with the code rate (bit rate) that is lower than MPEG-1, that is, the encoding method having a higher compression rate. With the spread of portable terminals, the necessity for such an encoding method is considered to have increased hereafter, and to cope with this, the standardization of the MPEG-4 encoding method has been performed. With respect to such an image encoding method, the standard thereof has been approved as an international standard in ISO/IEC 14496-2 as of December, 1998.

Further, recently, for the original purpose of performing image encoding for a video conference, it has been known that the standard called H.26L (ITU-T (ITU Telecommunication Standardization Sector) Q6/16 VCEG (Video Coding Experts Group)) has recently been standardized. In comparison to the encoding method such as MPEG-2 or MPEG-4 in the related art, H.26L necessitates a larger amount of computation in encoding and decoding operations, but can realize higher encoding efficiency. Also, currently, as a part of MPEG-4 standardization activities, the standardization to realize higher encoding efficiency through adoption of even functions that are not supported in the H.26L, on the basis of the H.26L, has been made as the Joint Model of Enhanced-Compression Video Coding. According to the schedule of standardization, international standards based on the names of H.264 and MPEG-4 Part 10 (AVC (Advanced Video Coding)) have been made as of May, 2003.

Also, as the next-generation video encoding technology having been recently examined, there is an adaptive loop filter (ALF) (for example, see Yi-Jen Chiu and L. Xu, "Adaptive (Wiener) Filter for Video Compression," ITU-T SG16 Contribution, C437, Geneva, April 2008). According to this adaptive loop filter, the optimum filter process is performed for each frame, and block distortion, which could not have been completely caught by a deblocking filter, or distortion caused by quantization can be reduced.

However, since it is general that an image has diverse features locally, optimum filter coefficients also differ locally. In a method described in Yi-Jen Chiu and L. Xu, "Adaptive (Wiener) Filter for Video Compression," ITU-T SG16 Contribution, C437, Geneva, April 2008, since the same filter coefficient is applied to all pixels in a frame, the picture quality is improved with respect to the whole frame, but may deteriorate locally.

Accordingly, methods which do not perform the filter process in a region where the picture quality deteriorates locally have been considered (for example, see Takeshi. Chujoh, et al., "Block-based Adaptive Loop Filter" ITU-T SG16 Q6 VCEG Contribution, AI18, Germany, July, 2008 and T. Chujoh, N. Wada and G. Yasuda, "Quadtree-based Adaptive Loop Filter," ITU-T SG16 Q6 VCEG Contribution, VCEG-AK22(rl), Japan, April, 2009). In these methods, the image encoding apparatus makes a plurality of control blocks, which are closely arranged over the whole surface of an image region, correspond to the image region, and controls whether or not to perform the filter process with respect to the image for each control block. The image encoding apparatus sets flag information for each block, and perform an adaptive filter process according to the flag information. In the same manner, the image decoding apparatus performs an adaptive filter process based on the flag information.

SUMMARY OF THE INVENTION

The above-described control block is arranged as a reference in a predetermined position with respect to an image. However, the arrangement of the control block may not be typically optimum, in the contents of the image or the encoding processing method, and thus it may unnecessarily reduce the effect of the filter process, or unnecessarily reduce the encoding efficiency.

For example, if the characteristic of an image is greatly changed in the control block, the effect of the filter process may deteriorate in comparison to a case where the characteristic of an image is uniform in the control block. Also, there is a method (multi-slice) of dividing one frame into a plurality of slices and performing an encoding or decoding process of image with respect to the divided slices. If the control block is positioned to extend over a plurality of slices, for the filter process, for example, the plurality of slices should be processed or dummy data should be generated, so that the process may be complicated or delay time may be increased. Also, due to this, the effect of the filter process may be reduced. Further, in the case where control information for the filter process is included in image compression information, unnecessary control information is increased, and this may cause the encoding efficiency to be reduced.

Further, even the size of the control block or the filter coefficient may not be typically appropriate with respect to the image.

In view of the above situation, it is desirable to make it possible to more appropriately perform a local control of a filter process during an encoding or decoding operation by appropriately adjusting parameters, such as the arrangement or size of a control block, and a filter coefficient, in accordance with the contents of an image, image processing method, and the like.

According to an embodiment of the present invention, there is provided an image processing apparatus, which includes a setting means for assigning a control block, which is a control unit of a filter process that is locally performed with respect to an image, to an initial position of the image that is determined based on a predetermined reference point; a movement means for moving the control block, which has been assigned to the initial position of the image by the setting means, up to a position in which the result of the filter process is improved; and a filter processing means for performing the filter process for the respective control block which has been moved by the movement means.

The filter processing means may perform the filter process based on flag information that controls whether or not to perform the filter process for the respective control blocks.

The movement means may move the control block based on an offset value that indicates a moving distance and a moving direction from the initial position up to the position in which the result of the filter process is improved.

The image processing apparatus according to an embodiment of the invention may further include a calculation means for calculating the offset value to move the control block so that a boundary of the plurality of slices, which are obtained by dividing the image, coincides with a boundary of the control block.

The image processing apparatus according to an embodiment of the invention may further include a calculation means for calculating the offset value using a cost function so that a cost value that evaluates the result of filter process is minimized.

The image processing apparatus according to an embodiment of the invention may further include a block size determination means for determining a size of the control block using the cost function so that the cost value is minimized.

The image processing apparatus according to an embodiment of the invention may further include a filter coefficient determination means for determining a filter coefficient of the filter process using the cost function so that the cost value is minimized.

The image processing apparatus according to an embodiment of the invention may further include a calculation means for calculating the offset value and an encoding means for encoding the image and generating encoded data, wherein the encoding means may further add the offset value that is generated by the calculation means to the encoded data that is generated by the encoding means.

The image processing apparatus according to an embodiment of the invention may further include a block size determination means for determining the size of the control block, wherein the encoding means may add information that indicates the size of the control block determined by the block size determination means to the encoded data generated by the encoding means.

The image processing apparatus according to an embodiment of the invention may further include a filter coefficient determination means for determining a filter coefficient of the filtering process, wherein the encoding means may add the filter coefficient determined by the filter coefficient determination means to the encoded data generated by the encoding means.

The image processing apparatus according to an embodiment of the invention may further include a decoding means for decoding the encoded data encoded from the image and generating the image, wherein the decoding means acquires the offset value from the encoded data, and the movement means may move the control block based on the offset value acquired by the decoding means.

The decoding means may acquire size information that indicates the size of the control block from the encoded data, and the filter processing means may perform the filter process for the respective control blocks of which the size is indicated in the size information acquired by the decoding means.

The decoding means may acquire the filter coefficient of the filter process from the encoded data, and the filter processing means may perform the filter process using the filter coefficient acquired by the decoding means.

According to another embodiment of the present invention, there is provided an image processing method, which includes the steps of assigning, by a setting means of an image processing apparatus, a control block, which is a control unit of a filter process that is locally performed with respect to an image, to an initial position of the image that is determined based on a predetermined reference point; moving, by a movement means of the image processing apparatus, the control block, which has been assigned to the initial position of the image, up to a position in which the result of the filter process is improved; and performing, by a filter processing means of the image processing apparatus, the filter process for the respective control blocks which has been moved.

According to another embodiment of the present invention, a control block, which is a control unit of a filter process that is locally performed with respect to an image, is assigned to an initial position of the image that is determined based on a predetermined reference point, the control block, which has been assigned to the initial position of the image, is moved up to a position in which the result of the filter process is improved, and the filter process is performed for the respective control block which has been moved.

According to the embodiments of the present invention, an image can be encoded or decoded. In particular, the local control of the filter process can be performed more appropriately during an encoding or decoding operation.

BRIEF DESCRIPTION OF THE DRAWINGS

FIGS. 4A to 4C are diagrams illustrating an ALF block and a filter block flag;

FIG. 10 is a block diagram illustrating a main configuration example of an adaptive filter processing unit;

FIG. 12 is a diagram illustrating an example of syntax of a slice header;

FIG. 13 is a diagram illustrating an example of syntax of a slice header;

FIG. 28 is a diagram illustrating an example of syntax of a slice header;

FIG. 29 is a block diagram illustrating a main configuration example of a personal computer to which the present invention is applied;

FIG. 30 is a block diagram illustrating a main configuration example of a television receiver to which the present invention is applied;

FIG. 31 is a block diagram illustrating a main configuration example of a portable phone to which the present invention is applied;

FIG. 34 is a diagram illustrating an example of a macro block.

DESCRIPTION OF THE PREFERRED EMBODIMENTS

Hereinafter, best modes (hereinafter referred to as "embodiments") for carrying out the invention will be described. In this case, the explanation will be made in the following order.

1. First embodiment (image encoding apparatus)
2. Second embodiment (image decoding apparatus)
3. Third embodiment (modified example of filter block flag generation processing)
4. Fourth embodiment (control information generation unit)
5. Fifth embodiment (QALF)
6. Sixth embodiment (personal computer)
7. Seventh embodiment (television receiver)
8. Eighth embodiment (portable phone)
9. Ninth embodiment (hard disc recorder)
10. Tenth embodiment (camera)

1. First Embodiment

[Configuration of a Device]

Figure 1:
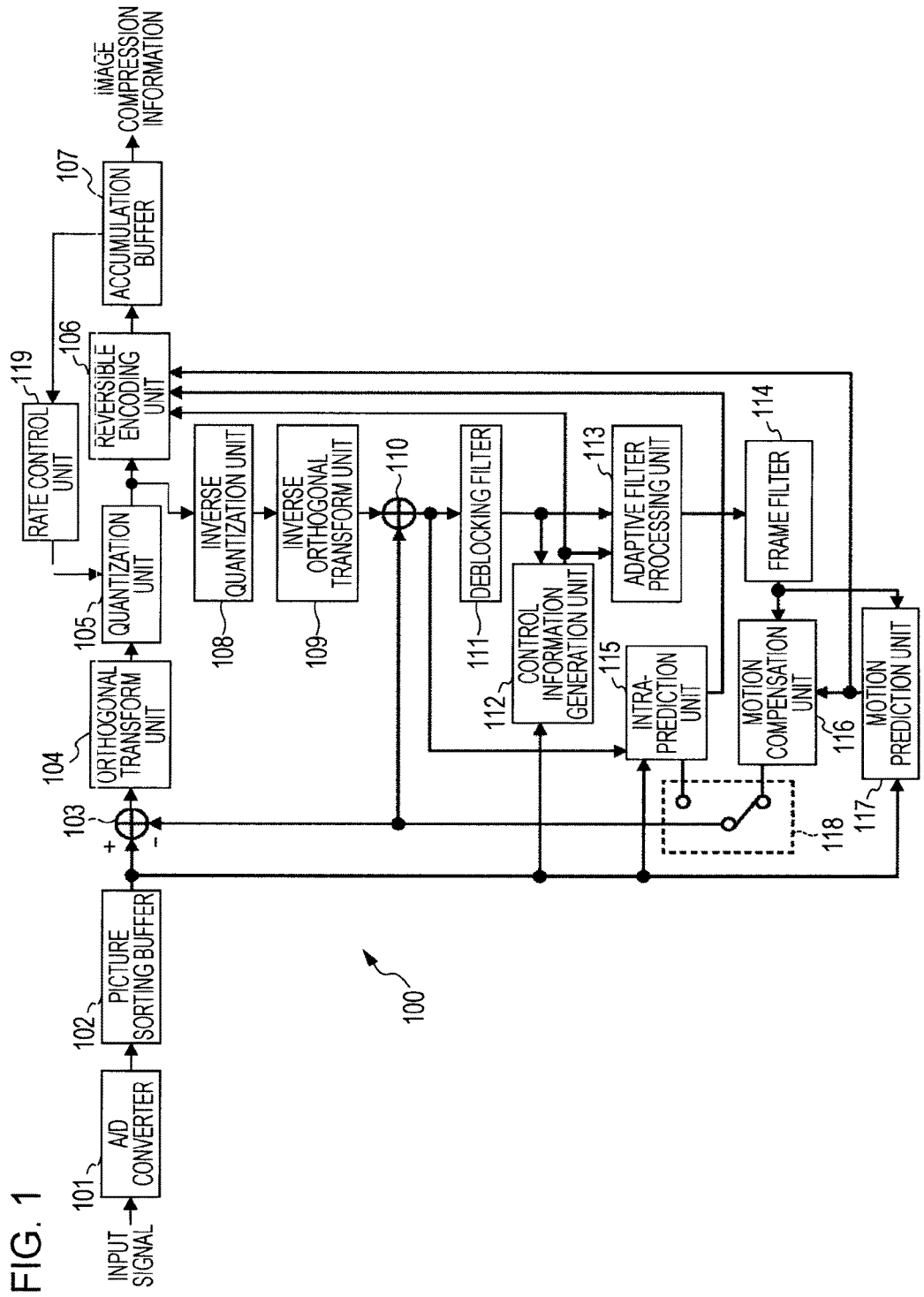
FIG. 1 is a block diagram illustrating a main configuration example of an image encoding apparatus to which the present invention is applied.

FIG. 1 is a block diagram illustrating a configuration example of an image encoding apparatus as an image processing apparatus to which the present invention is applied.

An image encoding apparatus 100 as illustrated in FIG. 1 is an encoding apparatus that compresses and encodes an image, for example, in the H.264 and MPEG-4 Part 10 (Advanced Video Coding) (hereinafter described as "H.264/AVC") method, and further adopts an adaptive loop filter.

In an example of FIG. 1, the image encoding apparatus 100 includes an A/D (Analog/Digital) conversion unit 101, a picture sorting buffer 102, an operation unit 103, an orthogonal transform unit 104, a quantization unit 105, a reversible encoding unit 106, and an accumulation buffer 107. Also, the image encoding apparatus 100 includes an inverse quantization unit 108, an inverse orthogonal transform unit 109, an operation unit 110, and a deblocking filter 111. Further, the image encoding apparatus 100 includes a control information generation unit 112, an adaptive filter processing unit 113, and a frame memory 114. Also, the image encoding apparatus 100 includes an intra-prediction unit 115, a motion compensation unit 116, a motion prediction unit 117, and a predicted image selection unit 118. Further, the image encoding apparatus 100 includes a rate control unit 119.

The A/D conversion unit 101 A/D-converts an input image, outputs and stores the A/D-converted image in the picture sorting buffer 102. The picture sorting buffer 102 arranges images of frames, which have been stored in the order of their display, in the order of frames for encoding in accordance with a GOP (Group of Picture) structure.

The operation unit 103 subtracts a predicted image from the intra-prediction unit 115 selected by the predicted image selection unit 118 or a predicted image from the motion compensation unit 116 from the image read from the picture sorting buffer 102, and output the difference information to the orthogonal transform unit 104. The orthogonal transform unit 104 performs an orthogonal transform, such as a discrete cosine transform, or Karhunen Loeve transform with respect to the difference information from the operation unit 103, and outputs the transform coefficient. The quantization unit 105 quantizes the transform coefficient output from the orthogonal transform unit 104.

The quantized transform coefficient, which is the output of the quantization unit 105, is input to the reversible encoding unit 106. The reversible encoding unit 106 compresses the quantized transform coefficient by performing a reversible encoding, such as a variable length coding, or arithmetic coding, with respect to the quantized transform coefficient.

The reversible encoding unit 106 acquires information and so on that indicates the intra-prediction from the intra-prediction unit 115, and acquires information and so on that indicates the inter-prediction mode from the motion prediction unit 117. Also, the information that indicates the intra-prediction is also called intra-prediction mode information. Also, the information that indicates an information mode indicating the inter-prediction is also called inter-prediction mode information.

Further, the reversible encoding unit 106 acquires the control information of the adaptive filter process that is performed in the adaptive filter processing unit 113 from the control information generation unit 112.

The reversible encoding unit 106 encodes the quantized transform coefficient, encodes control information of the adaptive filter process, information indicating the intra-prediction or information indicating the inter-prediction mode, quantization parameters, and the like, and makes (multiplexes) them as a part of the header information in the compressed image. The reversible encoding unit 106 supplied the encoded data to the accumulation buffer 107 to accumulate the encoded data.

For example, the reversible encoding unit 106 performs the reversible encoding process, such as the variable length coding or the arithmetic coding. An example of the variable length coding may be a CAVLC (Context-Adaptive Variable Length Coding) determined in the H.264/AVC method. An example of the arithmetic coding may be a CABAC (Context-Adaptive Binary Arithmetic Coding).

The accumulation buffer 107 temporarily holds data supplied from the reversible encoding unit 106, and outputs the compressed image, which has been encoded by the H.264/AVC method, to, for example, a following recording apparatus or transmission path (not illustrated) in a predetermined timing.

Also, the quantized transform coefficient from the quantization unit 105 is also input to the inverse quantization unit 108. The inverse quantization unit 108 performs inverse quantization of the quantized transform coefficient in a method that corresponds to the quantization performed by the quantization unit 105, and supplies the obtained transform coefficient to the inverse orthogonal transform unit 109.

The inverse orthogonal transform unit 109 performs the inverse orthogonal transform with respect to the supplied transform coefficient in a method that corresponds to the orthogonal transform process performed by the orthogonal transform unit 104. The output of the inverse orthogonal transform is supplied to the operation unit 110. The operation unit 110 obtains a locally decoded image (decoded image) by adding the predicted image that is supplied from the predicted image selection unit 118 to the result of the inverse orthogonal conversion, that is, the restored difference information, supplied from the inverse orthogonal conversion unit 109. The result of addition is supplied to the deblocking filter 111.

The deblocking filter 111 removes a block distortion of the decoded image. The deblocking filter 111 supplies the result of the distortion removal to the control information generation unit 112 and the adaptive filter processing unit 113.

The control information generation unit 112 acquires the decoded image supplied from the deblocking filter 111 and the current input image read from the picture sorting buffer 102, and generates the control information of the adaptive filter that is performed by the adaptive filter processing unit 113. Although the details thereof will be described later, the control information includes the filter coefficient, ALF block size, filter block flag, offset value of the ALF block, and the like.

The control information generation unit 112 supplies the generated control information to the adaptive filter processing unit 113. Also, the control information generation unit 112 supplies the generated control information to the reversible encoding unit 106. As described above, the control information may be reversibly compressed by the reversible encoding unit 106, and may be included in the image compression information (i.e. may be multiplexed). That is, the control information is sent to the image decoding apparatus together with the image compression information.

The adaptive filter processing unit 113 performs the filter process with respect to the decoded image supplied from the deblocking filter 111 using information, such as the filter coefficient, ALF block size, filter block flag, and offset value, which are included in the control information supplied from the control information generation unit 112. As this filter, for example, a Wiener filter may be used. Of course, any filter other than the Wiener filter may also be used. The adaptive filter processing unit 113 supplies the result of the filter process to the frame memory 114 to accumulate the result of the filter process as a reference image.

The frame memory 114 outputs the accumulated image to the motion compensation unit 116 and the motion prediction unit 117 at the predetermined timing.

In the image encoding apparatus 100, for example, an I-picture, a B-picture, and a P-picture from the picture sorting buffer 102 are supplied to the intra-prediction unit 115 as intra-predicted (also called intra-processed) images. Also, the B-picture and the P-picture, which are read from the picture sorting buffer 102, are supplied to the motion prediction unit 117 as the inter-predicted (also called inter-processed) images.

The intra-prediction unit 115 generates a predicted image by performing the intra-prediction process with respect to all of the candidate intra prediction modes based on the intra-predicted image read from the picture sorting buffer 102 and the reference image supplied from the frame memory 114.

In the intra-prediction unit 115, the information on the intra-prediction modes applied to the corresponding block/macro block is transmitted to the reversible encoding unit 106 and is encoded as a part of the header information in the image compression information. In the H.264 image information encoding method, with respect to a luminance signal, an intra 4×4 prediction mode, an intra 8×8 prediction mode, and an intra 16×16 prediction mode are defined, and with respect to a color difference signal, it is possible to define prediction modes, which are independent of the luminance signal, for the respective macro blocks. With respect to the intra 4×4 prediction mode, one intra-prediction mode is defined for the respective 4×4 luminance blocks, and with respect to the intra 8×8 prediction mode, one intra prediction mode is defined for the respective 8×8 luminance blocks. With respect to the intra 16×16 prediction mode and the color difference signal, one prediction mode is defined for one macro block.

The intra-prediction unit 115 calculates a cost function value with respect to the intra-prediction mode which has generated the predicted image, and selects the intra prediction mode in which the calculated cost function value is minimized as the optimum intra-prediction mode. The intra-prediction unit 115 supplies the predicted image generated in the optimum intra-prediction mode to the predicted image selection unit 118.

The motion prediction unit 117 calculates a motion vector by acquiring the image information (input image) supplied from the picture sorting buffer 102 and the image information (decoded image) which corresponds to the reference frame being supplied from the frame memory 114 with respect to the inter-predicted image. The motion prediction unit 117 supplies motion vector information that indicates the calculated motion vector to the reversible encoding unit 106. The motion vector information may be reversibly compressed by the reversible encoding unit 106, and may be included in the image compression information. That is, the motion vector information is sent to the image decoding apparatus together with the image compression information.

Also, the motion prediction unit 117 supplies the motion vector information to the motion compensation unit 116.

The motion compensation unit 116 generates inter-prediction image information by performing a motion compensation process according to the motion vector information supplied from the motion prediction unit 117. The motion compensation unit 116 supplies the generated predicted image information to the predicted image selection unit 118.

The predicted image selection unit 118 supplies the output of the intra-prediction unit 115 to the operation unit 103 in the case of the intra-encoded image, and supplies the output of the motion compensation unit 116 to the operation unit 103 in the case of the inter-encoded image.

The rate control unit 119 controls the rate of the quantization operation of the quantization unit 105 based on the compressed image accumulated in the accumulation buffer 107 so that overflow or underflow does not occur.

In the MPEG (Moving Picture Experts Group)-2, the motion prediction and compensation processing unit is a motion compensation block, and each motion compensation block can have independent motion vector information. The size of the motion compensation block is 16×16 pixels in the case of a frame motion compensation mode, and is 16×8 pixels with respect to each of first and second fields in the case of a field motion compensation mode.

Figure 2:
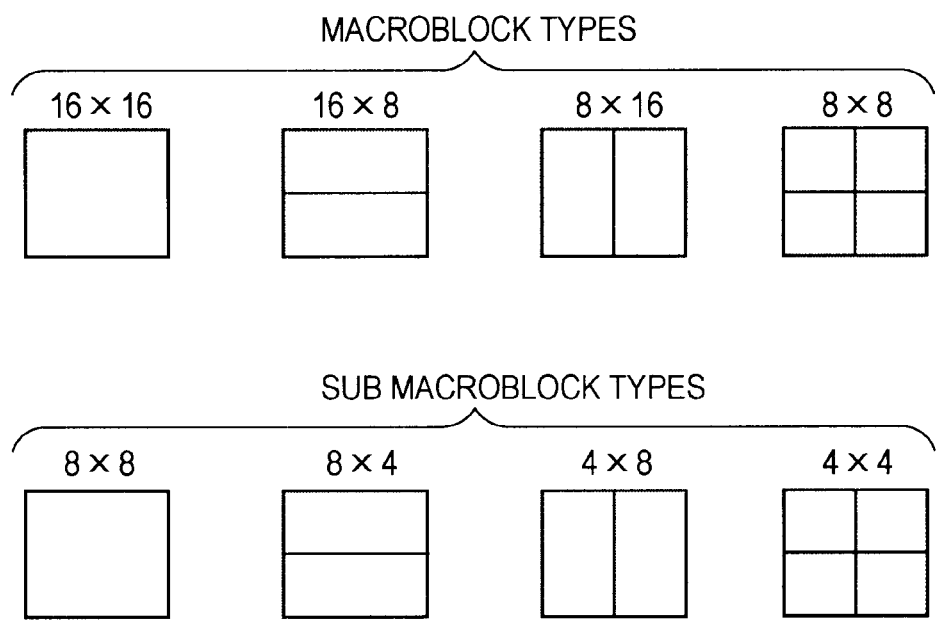
FIG. 2 is a diagram illustrating variable block size motion prediction and a compensation process.

By contrast, in the AVC (Advanced Video Coding), as illustrated on an upper side of FIG. 2, it is possible that one macro block that is composed of 16×16 pixels is divided into one partition composed of 16×16, 16×8, 8×16, or 8×8 pixels, and each of the divided partition has independent motion vector information. Also, with respect to the 8×8 partition, as illustrated on a lower side of FIG. 2, the 8×8 partition is divided into one sub partition composed of 8×8, 8×4, 4×8, or 4×4 pixels, and each of the divided sub partition has independent motion vector information. The motion prediction and compensation process is performed in the unit of the motion compensation block as described above.

Figure 3:
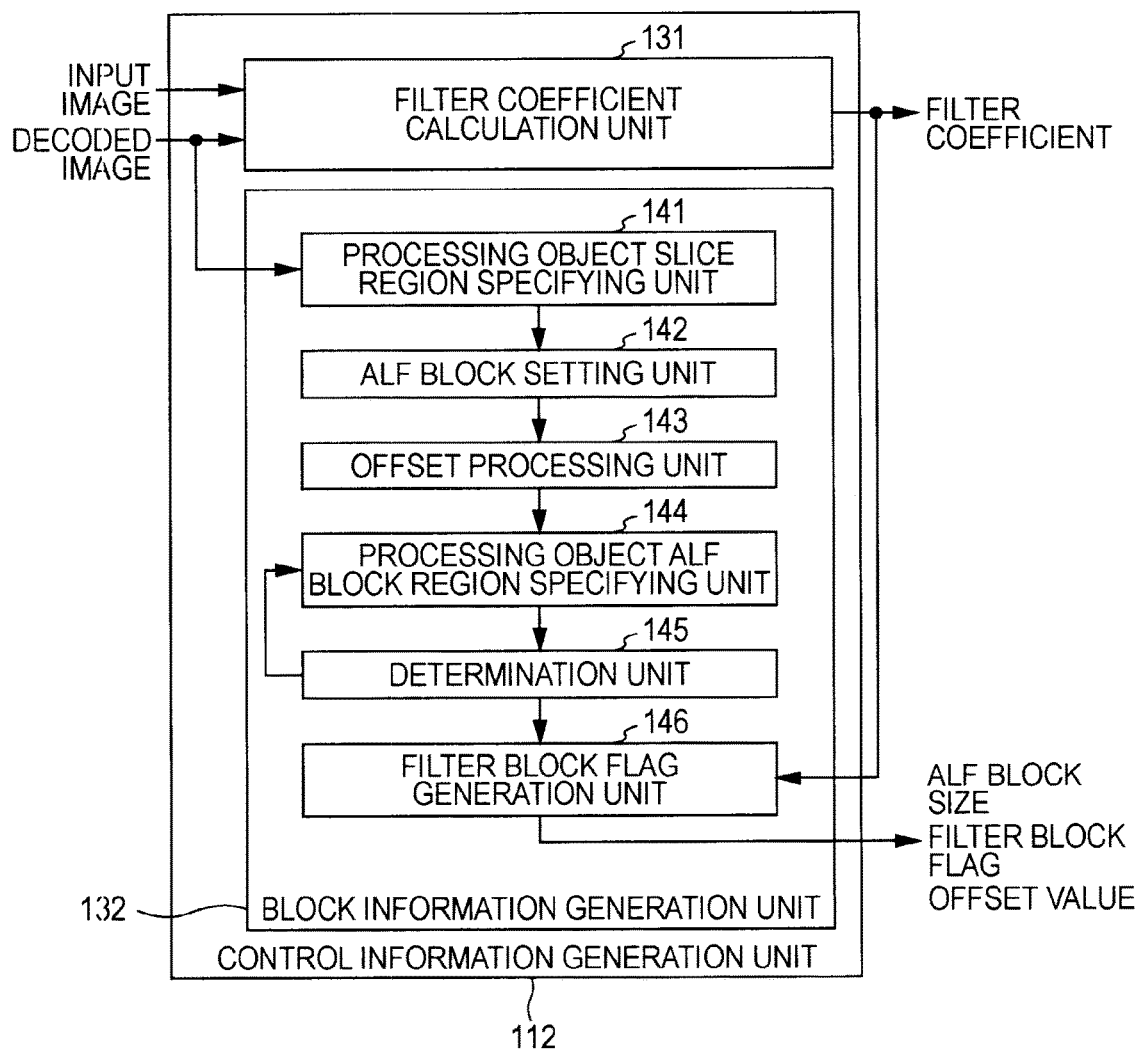
FIG. 3 is a block diagram illustrating a main configuration example of a control information generation unit.

FIG. 3 is a block diagram illustrating a main configuration example of the control information generation unit 112.

The control information generation unit 112, as described above, generates the control information that can be used in the adaptive loop filter (ALF) that is a loop filter in the adaptive filter processing unit 113. The control information generation unit 112 generates, for example, the filter coefficient, the ALF block size, the filter block flag, and the offset value of the ALF block as the control information.

The control information generation unit 112 includes a filter coefficient calculation unit 131 and a block information generation unit 132.

The filter coefficient calculation unit 131 acquires the decoded image supplied from the deblocking filter 111 and the current input image read from the picture sorting buffer 102, and calculates a filter coefficient of the ALF that is performed in the adaptive filter processing unit 113 for each frame from them.

The block information generation unit 132 determines the ALF block size based on the decoded image supplied from the deblocking filter 111 and the filter coefficient calculated by the filter coefficient calculation unit 131, arranges the ALF block, and obtains an appropriate offset value of the ALF block. Also, the block information generation unit 132 moves the ALF block, and generates a filter block flag with respect to the respective ALF block in the slice to be processed.

Here, the ALF block and the filter block flag will be described. FIGS. 4A to 4C are diagrams illustrating the ALF block and the filter block flag.

As described above, in the adaptive filter, the filter coefficient is set for each frame. That is, the optimum filter process is performed in the unit of a frame. However, generally, the frame image is not uniform as a whole, and has diverse features locally. Due to this, optimum filter coefficients differ locally. According to the filter process using the filter coefficient determined for each frame as described above, the picture quality is improved with respect to the whole frame, but may deteriorate locally.

Accordingly, a BALF (Block based Adaptive Loop Filter) which does not perform the filter process in a region where the picture quality deteriorates locally has been considered.

A frame 151 of FIG. 4A represents a decoded image after the deblocking filter process. The block information generation unit 132, as illustrated in FIG. 4B, corresponds to a control block that is a control unit of the adaptive filter process that is performed locally. A plurality of ALF blocks 152 is closely arranged in the same manner as closely spreading the plurality of ALF blocks over the whole region of the frame 151. The block information generation unit 132 determines a predetermined position of the frame 151 as a reference point and determines the arrangement position of the respective ALF blocks 152 based on the reference point.

Here, the "arrangement" is to determine (specify or set) a region (position) of a control target of the respective control block. This means that the respective control blocks are assigned to different regions of the image (frame 151). Accordingly, the actual data do not overlap each other (are not synthesized).

Also, the region where the ALF block 152 is arranged may not be identical to the region of the frame 151, but at least includes the whole region of the frame. As a result, the region of the frame 151 is divided into the regions (plural regions) of the respective ALF blocks 152.

The block information generation unit 132 determines the size in the horizontal direction (both arrows 153) and the size in the vertical direction (both arrows 154) of the ALF block 152. As the size of the ALF block, for example, any one of 8×8, 16×16, 24×24, 32×32, 48×48, 64×64, 96×96, and 128×128 pixels may be designated for each slice. In this case, information on the designation of the AFL block size is called a block size index.

Once the block size is determined, the number of ALF blocks for one frame is determined since the frame size is fixed.

The block information generation unit 132, as illustrated in FIG. 4C, sets a filter block flag 155 that controls whether or not to perform the filter process for each ALF block 152. For example, with respect to a region in which the picture quality is improved by the adaptive filter, a filter block flag 155 having a value of "1" is generated, while with respect to a region in which the picture quality is deteriorated by the adaptive filter, a filter block flag 155 having a value of "0" is generated. In the filter block flag 155, the value of "1" indicates that the filter process is to be performed, and the value of "0" indicates that the filter process is not to be performed.

The adaptive filter processing unit 113 controls the adaptive filter process based on the value of the filter block flag 155. For example, the adaptive filter processing unit 113 performs the filter process only with respect to the region of the AFL block 152 in which the value of the filter block flag 155 is "1", and does not perform the filter process with respect to the region of the AFL block 152 in which the value of the filter block flag 155 is "0".

Also, the above-described ALF block size and the filter block flag can be included in the slice header of the image compression information, and is sent from the image encoding apparatus 100 to the image decoding apparatus. One or more filter block flags according to the number of AFL blocks 152, for example, may be included in the slice header in the order of raster scan.

Accordingly, as the size of the ALF block is smaller, a closer filter control becomes possible, and thus more appropriate ALF filter can be obtained. However, if the size of the ALF block becomes smaller, the bit rate of the filter block flag is increased. That is, as the size of the ALF block becomes smaller, the encoding efficiency of the image compression information is reduced. As described above, the performance of the adaptive filter and the encoding efficiency of the image compression information are in a tradeoff relationship.

The number of ALF blocks is calculated as in the following Equation (1).

$$N_{ALFBLOCK} = \text{floor}((16 \times N_{MBw} + N_{SIZE} - 1)/N_{SIZE}) \times \text{floor}((16 \times N_{MBh} + N_{SIZE} - 1)/N_{SIZE}) \quad (1)$$

In Equation (1), $N_{ALFBLOCK}$ indicates the number of ALF blocks. Also, $N_{MBw}$ indicates the number of macro blocks in the horizontal direction of a picture, and $N_{MBh}$ indicates the number of macro blocks in the vertical direction of the picture. Further, $N_{SIZE}$ indicates the size of one side of the ALF block. Also, floor[x] is a function that takes an integer by throwing away decimal places of x.

Figure 5:
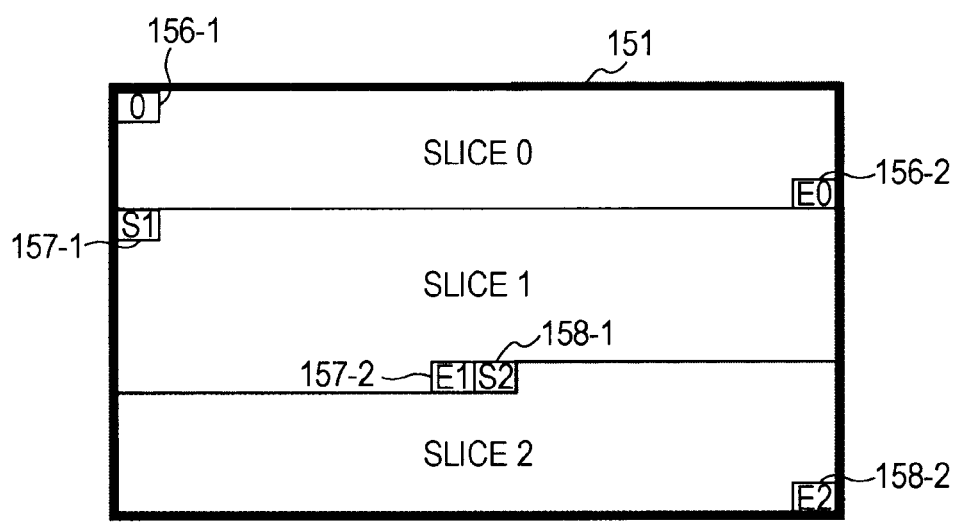
FIG. 5 is a diagram illustrating an example of a multi-slice.

However, in the H.264/AVC, one frame is divided into a plurality of slices, and image compression information is output for each slice. FIG. 5 is a diagram illustrating an example of a multi-slice. In the case of an example in FIG. 5, the frame 151 is divided into three slices, that is, slice 0, slice 1, and slice 2.

As described above, by outputting the image compression information in the unit of a slice that is closer than a frame, the image encoding apparatus 100 can generate and output the image compression information at shorter intervals. That is, the image decoding apparatus that decodes the image compression information can earlier start the decoding of the image compression information. That is, after the image is input, the encoding process and decoding process are performed, and a delay time until the image is output can be shortened.

In the Takeshi. Chujoh, et al., "Block-based Adaptive Loop Filter" ITU-T SG16 Q6 VCEG Contribution, AI18, Germany, July, 2008 that describes about the BALF, the multi-slice is not disclosed. That is, only the setting of the ALF block to the whole frame is described. In generating the filter block flag, a deblock-filtered decoded image is necessary. Accordingly, if the filter block flag of the whole frame is generated once, it is necessary to wait for until the image is decoded with respect to the whole slices in the frame (until the deblock-filtered decoded image is obtained). In this case, the delay time is increased, and thus it is insignificant to perform the process in the unit of a slice.

Accordingly, in the case of the multi-slice, in order to suppress the increase of the delay time, it is preferable to generate the filter block flag by setting the ALF block for each slice. However, as described above, the ALF block is set with respect to the whole frame. That is, the ALF block with respect to the whole frame is set for each slice, and thus an unnecessary ALF block outside the slice region may be set.

Figure 6A:
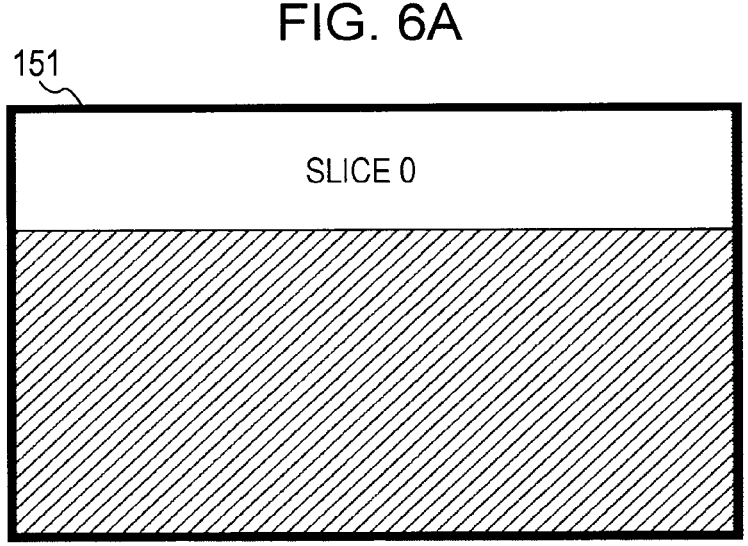
FIGS. 6A and 6B are diagrams illustrating the processing of slice 0.
Figure 6B:
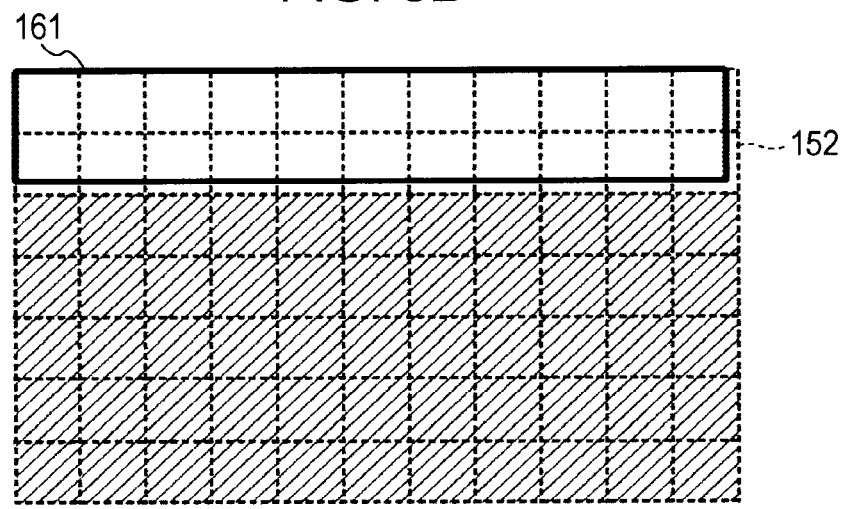

For example, in an example of FIG. 5, in the case of processing slice 0 as illustrated in FIG. 6A, an ALF block 152 of the whole frame 151 is set with respect to a region of slice 0 that is indicated as a frame (framework) 161 as illustrated in FIG. 6B.

Figure 7A:
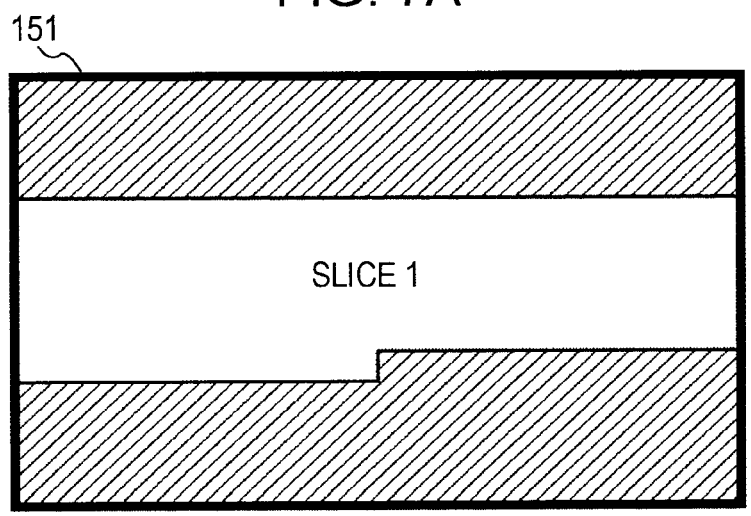
FIGS. 7A and 7B are diagrams illustrating the processing of slice 1.
Figure 7B:
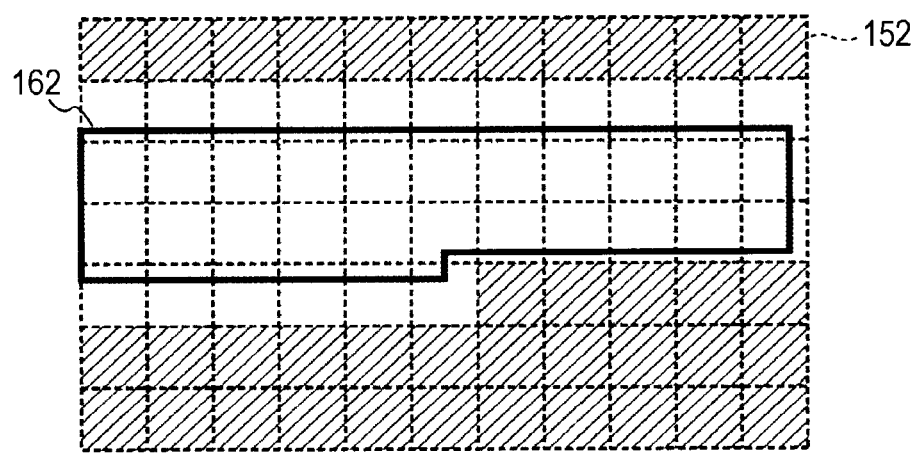

In the same manner, in an example of FIG. 5, in the case of processing slice 1 as illustrated in FIG. 7A, an ALF block 152 of the whole frame 151 is set with respect to a region of slice 1 that is indicated as a frame 162 as illustrated in FIG. 7B.

In FIGS. 6B and 7B, the ALF block 152 indicated by slanting lines is a block other than the region of slice 0 or slice 1, which is unnecessary for processing the region of slice 0 or slice 1.

As described above, a filter block flag 155 is set for each ALF block. That is, in the case of a multi-slice, an unnecessary filter block flag occurs to increase the data amount of the image compression information, and thus the encoding efficiency may be reduced.

Accordingly, the block information generation unit 132 of the control information generation unit 112 of FIG. 3 generates the ALF block that includes the slice region to be processed and the filter block flag in order to suppress the reduction of the encoding efficiency as described above.

Figure 8A:
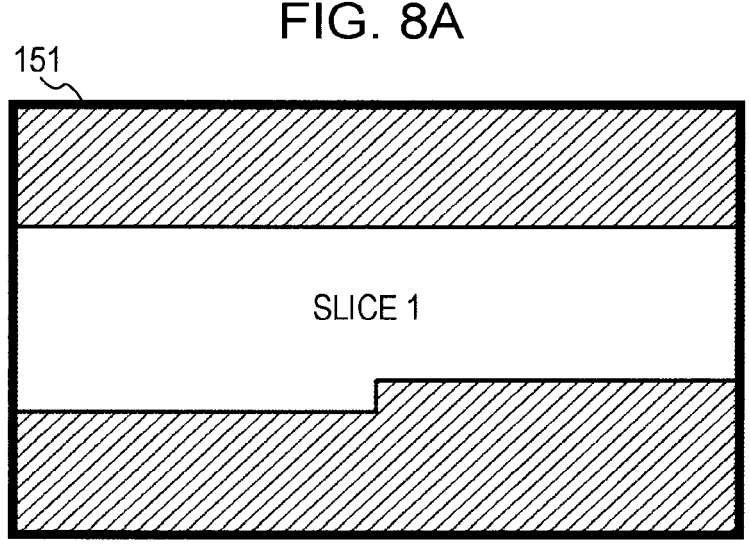
FIGS. 8A and 8B are diagrams illustrating the processing of slice 1 to which the present invention is applied.
Figure 8B:
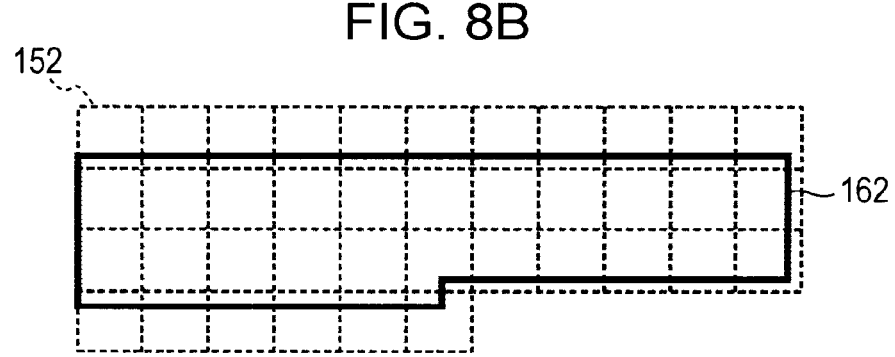

For example, in an example of FIG. 5, in the case of processing slice 1 as illustrated in FIG. 8A, the block information generation unit 132 sets only the ALF block 152 that includes the region of slice 1 indicated as the frame 162 as illustrated in FIG. 8B, and generates the filter block flag only with respect to the ALF block 152.

By doing this, since only the filter block flag that is necessary for the respective slice is added to the image compression information as described above, the bit rate of the filter block flag is reduced in comparison to the case of generating the filter block flag of the whole frame for each slice, and thus the reduction of the encoding efficiency is suppressed. Also, since the image compression information that includes the control information for each slice is generated, the image decoding apparatus can start the image decoding process in the unit of a slice, and thus the increase of the delay time can be suppressed in comparison to the case of generating the filter block flag for each frame.

Also, in this case, since the ALF block 152, which includes an end portion (e.g. boundary of the slice) of the region of slice 1 indicated as the frame 162 as illustrated in FIG. 8B, includes the region of slice 1 in a portion of the region, the filter processing is performed with respect to the ALF block. In other words, even though the region of slice 1 exists only in a portion of the region, it is necessary to perform the filer processing.

As illustrated in FIG. 8B, if the position of the boundary of the slice and the position of the boundary of the ALF block 152 conflict with each other, the ALF block that includes the boundary of the slice is increased, and as a result, the number of bits of the filter block flag (the number of ALF blocks) that is necessary for the filter process of slice 1 is increased.

Figure 9A:
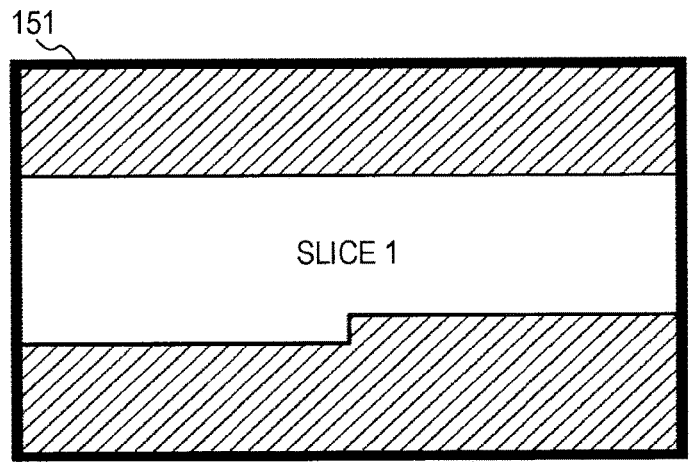
FIGS. 9A to 9C are diagrams illustrating an offset of an ALF block.
Figure 9B:
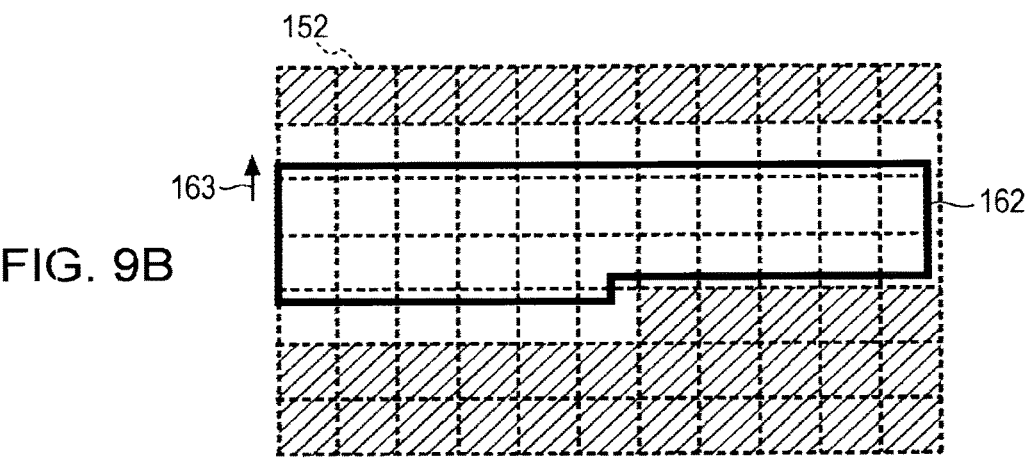

For example, in the case of performing the filter process with respect to the region of slice 1 of the frame 151 as illustrated in FIG. 9A, the position relationship between the ALF block arrange with respect to the whole frame 151 and the region of slice 1 indicated as the frame 162 is as illustrated in FIG. 9B.

In this case, the number of filter block flags (ALF blocks including the region of slice 1) which are necessary for the filter process of slice 1 is 39.

Figure 9C:
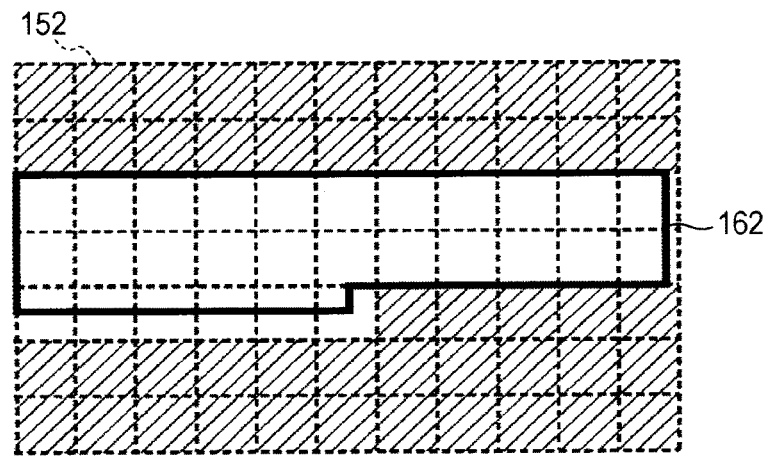

In the state as illustrated in FIG. 9B, the boundary of an upper side of slice 1 and the boundary of the ALF block 152 are made to coincide with each other by moving the position of the ALF block 152, for example, to the upper side as indicated by an arrow 163. In this case, the position relationship between the ALF block 152 and the frame 162 are as illustrated in FIG. 9C.

In this case, the number of filter block flags (ALF blocks including the region of slice 1) which are necessary for the filter process of slice 1 is 28.

As described above, by controlling the movement of the position of the ALF block, the block information generation unit 132 can reduce the number of bits of the necessary filter block flag. Since the filter block flag is also added to the image compression information as described above, the increase of the encoding efficiency can be suppressed.

Also, in the case of the ALF block that includes the boundary of the slice as described above, data of the next slice is necessary or dummy data should be generated, and thus the filter process may be complicated or the delay time may be increased. Since the block information generation unit 132 controls the movement of the position of the ALF block as described above, the number of ALF blocks including the boundary of the slice is reduced, and as a result, the filter process can be performed more easily while suppressing the increase of the delay time.

Further, in the boundary portion of the slice, the picture quality may deteriorate due to the image processing, such as the synthesis with the next slice and generation of the dummy data, and thus the effect of the filter process may deteriorate. Since the block information generation unit 132 controls the movement of the position of the ALF block as described above, the number of ALF blocks including the boundary of the slice is reduced, and as a result, the reduction of the effect of the filter process can be suppressed.

Referring again to FIG. 3, the block information generation unit 132 includes a processing object slice region specifying unit 141, an ALF block setting unit 142, an offset processing unit 143, a processing object ALF block region specifying unit 144, a determination unit 145, and a filter block flag generation unit 146.

The processing object slice region specifying unit 141 specifies the position of the region of the processing object slice that is supplied as the decoded image with respect to the whole frame.

The ALF block setting unit 142 sets the ALF block size and sets a plurality of ALF blocks 152 in the whole frame. The ALF block setting unit 142 determines the position of the respective ALF block 152 in consideration of a predetermined position of the frame as a reference point, and closely arranges the ALF blocks onto the region of the frame. In this case, the reference point can be set in a certain position of the frame. For example, the reference point may be a pixel at a left upper end of the frame, or a pixel at a right upper end, right lower end, left lower end or in the center of the frame.

Since the size of the region of the whole frame is predetermined, the ALF block setting unit 142 can specify the number of ALF blocks of the whole frame from the determined ALF block size.

The offset processing unit 143 appropriately updates the position of the ALF block 152 arranged by the ALF block setting unit 142. The offset processing unit 143 moves all the ALF blocks 152 to arrange the boundary of the ALF block 152 onto the end of the slice. The offset processing unit 143 obtains the offset value that indicates the movement distance and movement direction from the initial arrangement position determined based on the reference point to the position in which the result of the filter process is improved (e.g. to the position (destination) where the end of the slice to be processed coincides with the boundary of the ALF block 152). Since the position of the slice to be processed is specified by the processing object slice region specifying unit 141, the offset processing unit 143 determines the offset value (destination) based on the position information.

In this case, the "end" of the slice to be processed, which is the basis of the destination determination, may be any side of the external appearance of the slice to be processed. For example, in an example of FIG. 9C, the boundary of the ALF block 152 coincides with the upper end of the slice to be processed (slice 1). The offset processing unit 143 may be made to select the optimum side, which is for the optimum coincidence with the boundary of the ALF block 152, among the respective sides of the external appearance of the slice to be processed.

Once the offset value is obtained, the offset processing unit 143 moves all the ALF blocks 152 arranged in the corresponding frame as long as the offset value. The subsequent process is performed based on the ALF block 152 of which the position has been updated.

The processing object ALF block region specifying unit 144 selects the ALF blocks to be processed one by one from the ALF blocks 152 which have been set by the ALF block setting unit 142 and appropriately moved by the offset processing unit 143, and specifies the position of the region of the selected ALF block to be processed.

The determination unit 145 determines whether or not the region of the ALF block to be processed includes the region of the slice to be processed. The filter block flag generation unit 146 generates a filter block flag of the ALF block which has been determined to "include the region of the slice to be processed" by the determination unit 145. The filter block flag generation unit 146 performs the adaptive filter process with respect to the region of the ALF block to be processed using the filter coefficient calculated by the filter coefficient calculation unit 131, and determines the value of the filter block flag according as whether or not the picture quality as the result of the filter process has been improved in comparison to a case before the filter process is performed.

The filter block flag generation unit 146 outputs control information, such as a filter block flag, ALF block size, and offset value.

FIG. 10 is a block diagram illustrating a main configuration example of the adaptive filter processing unit 113 of FIG. 1.

The adaptive filter processing unit 113 performs the filter process with respect to the decoded image that is supplied from the deblocking filter 111 using the control information that is supplied from the control information generation unit 112.

The adaptive filter processing unit 113, as illustrated in FIG. 9, includes a control unit 171, an adaptive filter 172, and a selection unit 173.

The control unit 171 controls the adaptive filter 172 and the selection unit 173. For example, the control unit 171 acquires the control information from the control information generation unit 112. Also, the control unit 171 supplies the filter coefficient that is included in the acquired control information to the adaptive filter 172 to set the filter coefficient. Further, the control unit 171 specifies the position of the region of the ALF block to be processed based on the ALF block size and the offset value included in the control information. Also, the control unit 171 controls the adaptive filter 172 based on the filter block flag value included in the control information to perform the filter processing of the region of the respective ALF block if necessary and to control the operation of the selection unit 173.

The adaptive filter 172 performs the filter process with respect to the region, which is designated as the ALF block to be processed by the control unit 171, of the decoded image supplied from the deblocking filter 111 using the filter coefficient set by the control unit 171. The adaptive filter 172 supplies the result of the filter process to the selection unit 173.

The selection unit 173, under the control of the control unit 171, selects any one of the decoded image (the decoded image of which the adaptive filter process has not been performed) that is supplied from the deblocking filter 111 and the decoded image (the decoded image of which the adaptive filter process has been performed) that is supplied from the adaptive filter 172, and supplies the selected decoded image to the frame memory 114 to accumulate the selected decoded image as a reference image.

That is, the adaptive filter processing unit 113 performs the filter process with respect to only the region, of which the performing of the filter process is indicated by the filter block flag (the region in which the picture quality has been determined to be improved), of the decoded image that is supplied from the deblocking filter 111.

[Flow of Processing]

Next, the flow of processing using the respective units as configured above will be described. First, an example of a flow of encoding processing that is performed by the image encoding apparatus 100 will be described with reference to the flowchart of FIG. 11.

In step S101, the A/D conversion unit 101 A/D-converts the input image. In step S102, the picture sorting buffer 102 stored the A/D-converted image, and performs the sorting from the order of displaying of the respective pictures to the order of encoding of the pictures.

In step S103, the operation unit 103 operates a difference between the image sorted by the process in step S102 and the predicted image. In the case of the inter-prediction, the predicted image is supplied from the motion compensation unit 116 to the operation unit through the predicted image selection unit 118, while in the case of the intra-prediction, the predicted image is supplied from the intra-prediction unit 115 to the operation unit 103 through the predicted image selection unit 118.

The difference data has a smaller amount of data in comparison to the original image data. Accordingly, the amount of data can be compressed in comparison to the case where the image is encoded as it is.

In step S104, the orthogonal transform unit 104 performs the orthogonal transform of the difference information generated by the process in step S103. Specifically, the orthogonal transform, such as a discrete cosine transform, or Karhunen Loeve transform, is performed to output a transform coefficient. In step S105, the quantization unit 105 quantizes the transform coefficient. In this quantization process, the rate is controlled as described later in the process of step S119.

The quantized difference information is locally decoded as follows. That is, in step S106, the inverse quantization unit 108 performs inverse quantization of the transform coefficient quantized by the quantization unit 105 with the characteristic that corresponds to the characteristic of the quantization unit 105. In step S107, the inverse orthogonal transform unit 109 performs inverse orthogonal transform with respect to the transform coefficient inverse-quantized by the inverse quantization unit 108 with the characteristic that corresponds to the characteristic of the orthogonal transform unit 104.

In step S108, the operation unit 110 generates a locally decoded image (image that corresponds to the input of the operation unit 103) by adding the predicted image input through the predicted image selection unit 118 to the locally decoded difference information. In step S109, the deblocking filter 111 performs filtering of the image output from the operation unit 110. Accordingly, the block distortion is removed.

If the above-described process is performed for one slice, the control information generation unit 112, in step S110, generates the control information that is used in the adaptive filter process. The details of the generation and processing of the control information will be described later.

Once the control information, such as the filter coefficient, ALF block size, filter block flag, and offset value, is generated by the process in step S110, the adaptive filter processing unit 113 performs the adaptive filter process with respect to the decoded image deblock-filtered by the process in step S109, using the control information in step S111. The details of the adaptive filter process will be described later.

In step S112, the frame memory 114 stores the image adaptive-filtered in step S111.

In step S113, the intra-prediction unit 115 performs the intra-prediction of the intra-prediction mode. In step S114, the motion prediction unit 117 and the motion compensation unit 116 perform the inter motion prediction and compensation process of the inter-prediction mode.

In step S115, the predicted image selection unit 118 selects any one of the predicted image generated by the intra-prediction process and the predicted image generated by the inter-motion prediction and compensation process in accordance with the prediction mode of the frame to be processed. The predicted image selection unit 118 supplies the selected predicted image to the operation unit 103 and the operation unit 110. As described above, the predicted image is used for the operation in steps S103 and S108.

In step S116, the reversible encoding unit 106 encodes the quantized transform coefficient output from the quantization unit 105. That is, the difference image is compressed through the reversible encoding, such as the variable length coding, or arithmetic coding. In this case, the reversible encoding unit 106 also encodes the control information generated in step S110, the intra-prediction mode information of the intra-prediction process in step S113, and the inter-prediction modes of the inter-motion prediction and compensation process in step S114.

In step S117, the reversible encoding unit 106 buries (describes) meta data such as the encoded control information in a slice header. For example, the burying (description) of the control information in the slice header is performed based on the syntax as illustrated in FIGS. 12 and 13. The meta data is read during the image decoding to be used. By including (multiplexing) the meta data necessary for the decoding process in the slice header, it is possible to perform the decoding process in the unit that is closer than a frame, and thus the increase of the delay time can be suppressed.

In step S118, the accumulation buffer 107 accumulates the difference image as a compression image. The compressed image accumulated in the accumulation buffer 107 is appropriately read and transmitted to the decoding side through a transmission path.

In step S119, the rate control unit 119 controls the rate of the quantization operation of the quantization unit 105 based on the compressed image accumulated in the accumulation buffer 107 so that overflow or underflow does not occur.

Next, an example of a flow of a control signal generation process that is executed by the control information generation unit 112 in step S110 of FIG. 11 will be described with reference to the flowchart of FIG. 14.

When the control information generation process starts, the filter coefficient calculation unit 131 of the control information generation unit 112, in step S131, calculates the filter coefficient using the input image supplied from the picture sorting buffer 102 and the deblock-filtered decoded image supplied from the deblocking filter 111. For example, the filter coefficient calculation unit 131 determines the value of the filter coefficient so that the residual between the input image and the decoded image is minimized.

If the filter coefficient is calculated, the block information generation unit 132, in step S132, generates the block information including the ALF block size, the offset value, and the filter block flag. The details of the block information generation processing will be described later. If the block information is generated, the processing returns to step S110 in FIG. 11, and the subsequent process after the step S111 is performed.

In this case, the calculation of the filter coefficient that is performed in step S131 may be performed in the unit of a frame. In this case, the process in step S131 is performed only with respect to a predetermined slice in the frame (e.g. a slice of which the identification number in the frame has a predetermined value (e.g. "0") or a slice which is initially processed in the frame), and with respect to other slices, the value may be appropriated. Also, in calculating the filter coefficient, a certain image may be used. For example, based on the past frame image, the filter coefficient may be calculated.

Next, with reference to the flowchart of FIG. 15, an example of a flow of a block information generation processing that is executed in step S132 of FIG. 14 will be described.

If the block information generation processing starts, the processing object slice region specifying unit 141 specifies the processing object slice region in step S151.

In order to know the region of the corresponding slice to be processed, it is necessary to know the macro block included in the corresponding slice and to know the pixels included in the macro block. The processing object slice region specifying unit 141 obtains the front macro block address of the corresponding slice from the slice header.

Here, the front macro block address is a number given to the macro block in a raster scan order from the left upper portion of a screen. As illustrated in FIG. 5, the macro block address in the left upper portion of the image (frame 151) becomes "0". Since slice 0 starts from the left upper portion of the frame 151, the macro block address of the front macro block 156-1 of slice 0 becomes "0". In this order, it is assumed that the macro block address of the last macro block 156-2 of slice 0 is E0. Also, it is assumed that in the same manner as slice 0, the macro block address of the front macro block 157-1 of slice 1 is S1, and the macro block address of the last macro block 157-2 is E1. Further, it is assumed that the macro block address of the front macro block 158-1 of slice 2 is S2, and the macro block address of the last macro block 158-2 is E2.

In decoding the corresponding slice, whenever the decoding process of one macro block is completed, the number of the macro block addresses is increased by one to reach the last macro block of the corresponding slice. In the last macro block, a flag that is the last macro block of the slice is set. By this, all addresses of macro blocks that the corresponding slice has can be known. That is, they are from the front macro block address to the last macro block address.

However, the frame size of one frame is indicated by the number of macro blocks in the sequence parameter set (SPS) of the AVC stream (image compression information). "pic_height_in_map_units_minus1" indicates the number of macro blocks in the vertical direction of an image, and "pic_width_in_mbs_minus1" indicates the number of macro blocks in the horizontal direction of the image.

Accordingly, the position of the macro block from the macro block address is indicated as in the following Equations (2) and (3).

$$mbx = \text{macro block address} \\ 0012C694ic\_width\_in\_mbs\_minus1 \quad (2)$$

$$mby = \text{floor}[\text{macro block address}/pic\_width\_in\_mbs\_minus1] \quad (3)$$

In Equations (2) and (3), "mbx" indicates which number from left the macro block is located at, and "mby" indicates which number from the upside the macro block is located at. Also, "floor[z]" is a function that takes an integer by throwing away decimal places of z, and "A" indicates the remainder number obtained by dividing A by B.

If it is assumed that the size of a macro block is set to 16×16 pixels, the position of the pixel in the vertical and horizontal directions in the left upper portion of the macro block becomes (16×mbx, 16×mby), and the pixel included in the macro block becomes the pixel that is included in the range of 16 pixels in the lower direction from the pixel position and in the range of 16 pixels in the right direction. From the information as describe above, all pixels of the corresponding slice can be known. That is, the region of the slice to be processed is specified.

Figure 15:
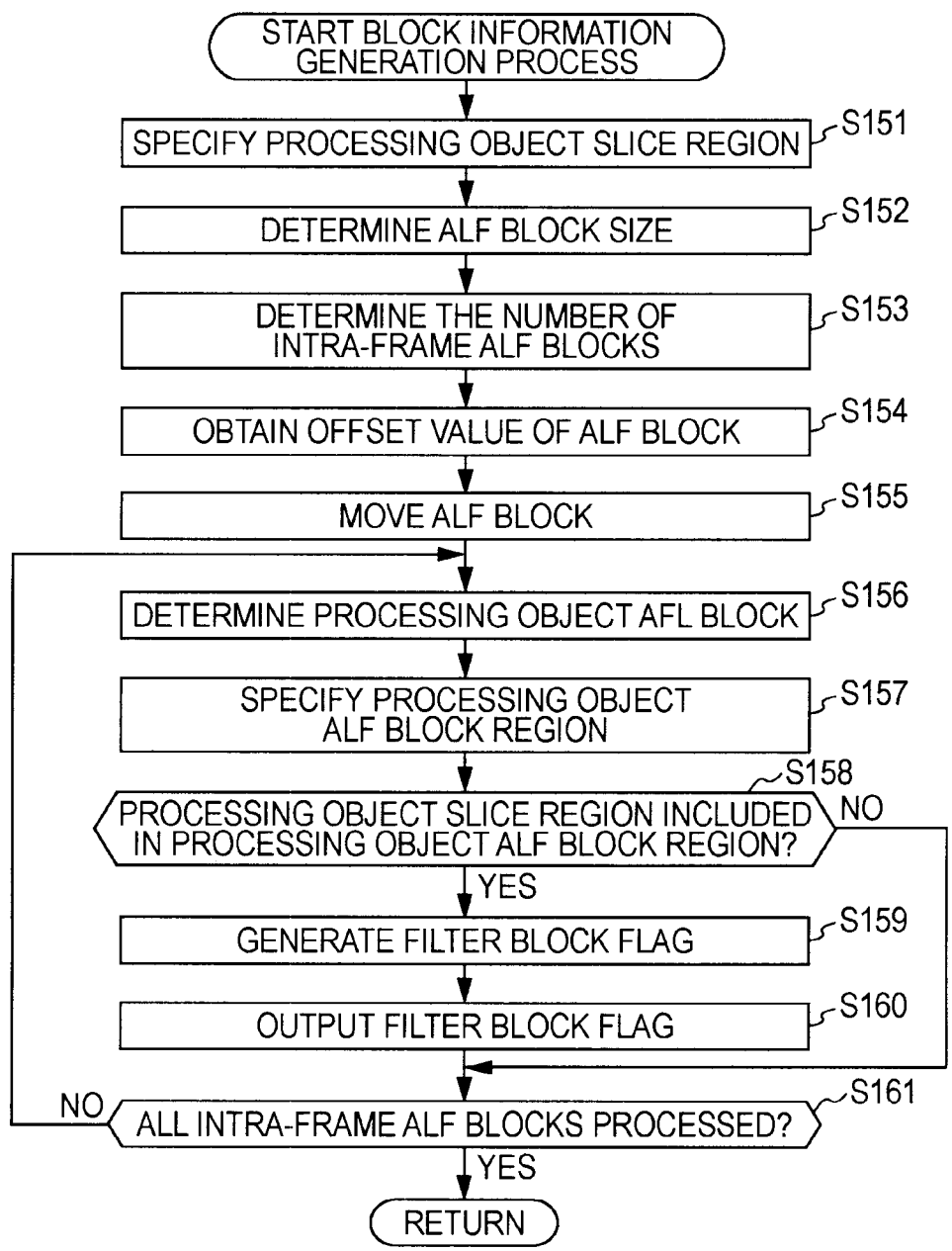
FIG. 15 is a flowchart illustrating an example of the flow of a block information generation process.

In step S152 of FIG. 15, the ALF block setting unit 142 determines the ALF block size. In step S153, the ALF block setting unit 142 determines the number of ALF blocks in the frame. Since the image size of the frame is pre-determined, if the ALF block size is determined, the number of ALF blocks (the number of ALF blocks in the frame), which is necessary to arrange the ALF blocks in consideration of the left upper portion of the frame as the reference point, can be calculated. Since the size (the number of pixels) in the vertical direction of the ALF block and the size (the number of pixels) in the horizontal direction are prepared in advance, the ALF block setting unit 142 determines the size of the respective ALF block and the number of ALF blocks according to the set value, and arranges the ALF blocks with respect to the decoded image.

In this case, the number of ALF blocks is calculated by the following Equations (4) and (5).

$$\text{num\_alf\_block\_}x=\text{floor}[(16\times(\text{pic\_width\_in\_mbs\_minus1}+1)+(\text{alf\_block\_size}-1))/\text{alf\_block\_size}] \quad (4)$$

$$\text{num\_alf\_block\_}y=\text{floor}[(16\times(\text{pic\_height\_in\_map\_units\_minus1}+1)+(\text{alf\_block\_size}-1))/\text{alf\_block\_size}] \quad (5)$$

In Equations (4) and (5), "num_alf_block_x" and "num_alf_block_y" are numbers of ALF blocks in width and length, respectively, which are included in the image. Also, "alf_block_size" indicates the size of one side of the ALF block. Here, for simplicity in explanation, it is assumed that the ALF block is in the form of a square. Of course, the size of the ALF block in the vertical direction and the size of the ALF block in the horizontal direction may be set to be different from each other.

In step S154, the offset processing unit 143 obtains the offset value of the ALF block 152 so that the end of the slice to be processed coincides with the boundary of the ALF block 152. In step S155, the offset processing unit 143 moves the ALF block 152 in accordance with the offset value calculated by the processing in step S154. By this movement, the end of the slice to be processed coincides with the boundary of the ALF block 152. The subsequent process is performed using the ALF block 152 appropriately moved.

In step S156, the processing object ALF block region specifying unit 144 determines the ALF block to be processed. In step S157, the processing object ALF block region specifying unit 144 specifies the region of the ALF block to be processed.

The position of the i-th ALF block is indicated in the following Equations (6) and (7).

$$\text{alf\_block\_}x=i(\text{num\_alf\_block\_}x-1) \quad (6)$$

$$\text{alf\_block\_}y=\text{floor}[i/(\text{num\_alf\_block\_}x-1)] \quad (7)$$

In Equations (6) and (7), "alf_block_x" and "alf_block_y" indicate which number the i-th ALF block is located at in the horizontal and vertical directions, respectively. The position of the pixel in the left upper portion of the i-th ALF block becomes the position obtained by multiplying "alf_block_x" and "alf_block_y" by "alf_block_size", respectively. That is, the horizontal direction becomes 16×alf_block_x, and the vertical direction becomes 16×alf_block_y. Accordingly, the region of the i-th ALF block is in the range of "alf_block_size×alf_block_size" from the pixel in the left upper portion thereof.

In step S158, the determination unit 145 determines whether or not the region of the slice to be processed is included in the region of the predetermined ALF block to be processed.

If it is determined that the region of the slice to be processed is included in the region of the ALF block to be processed, the processing proceeds to step S159. In step S159, the filter block flag generation unit 146 generates a filter block flag with respect to the ALF block to be processed since the ALF block is the ALF block that is necessary in the slice to be processed. In step S160, the filter block flag generation unit 146 outputs the generated filter block flag.

If the processing in step S160 is ended, the processing proceeds to step S161. Also, in step S158, if it is determined that the region of the slice to be processed is not included in the region of the ALF block to be processed, the ALF block is unnecessary in the slice to be processed, and thus the proceeding proceeds to step S161.

In step S161, the processing object ALF block region specifying unit 144 determines whether or not all the ALF blocks in the frame have been processed, and if it is determined that all the ALF blocks have not been processed, it returns to step S156, and repeats the subsequent process with respect to new ALF blocks. Whenever this loop process is repeated, the processing object ALF block region specifying unit 144 selects the ALF block among the ALF block group arranged on the region of the frame one by one, for example, in the raster scan order from the ALF block in the left upper portion, as the ALF block to be processed.

Figure 11:
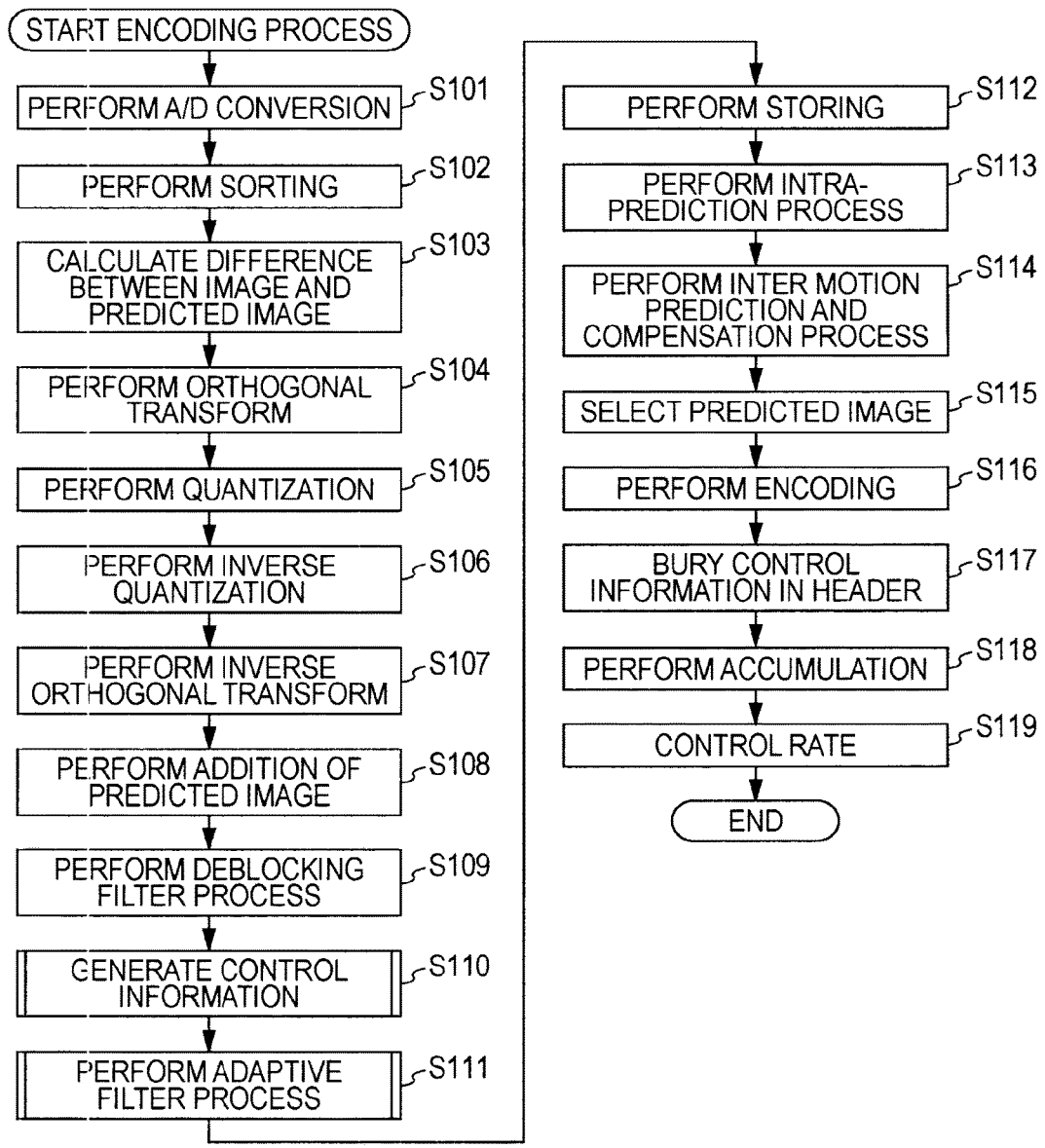
FIG. 11 is a flowchart illustrating an example of the flow of an encoding process.
Figure 14:
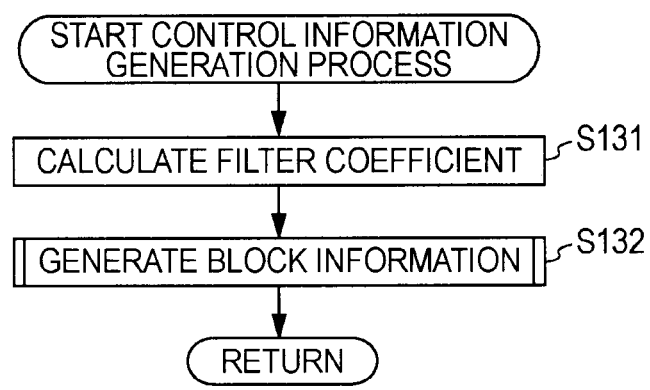
FIG. 14 is a flowchart illustrating an example of the flow of a control information generation process.

Also, in step S161, if it is determined that all the ALF blocks in the frame have been processed, the block information generation process is ended, the processing returns to step S132 of FIG. 14 to end the control information generation process, and then the processing returns to step S110 in FIG. 11 to perform the process subsequent to the step S111.

As described above, it is exemplified that the left upper portion of the frame is considered as the original point when the ALF blocks are arranged on the region of the frame image. However, the position of the original point is optional. For example, the original point may be the left lower portion, right lower portion, right upper portion, or center of the frame. However, it is necessary to determine in advance the position of the original point and the method of arranging the ALF blocks so that they are commonly used in the encoding process and the decoding process.

Also, it is exemplified that the selection of the ALF blocks to be processed is performed in the raster scan order from the left upper portion. However, the selection order and the start position are optional.

Figure 16:
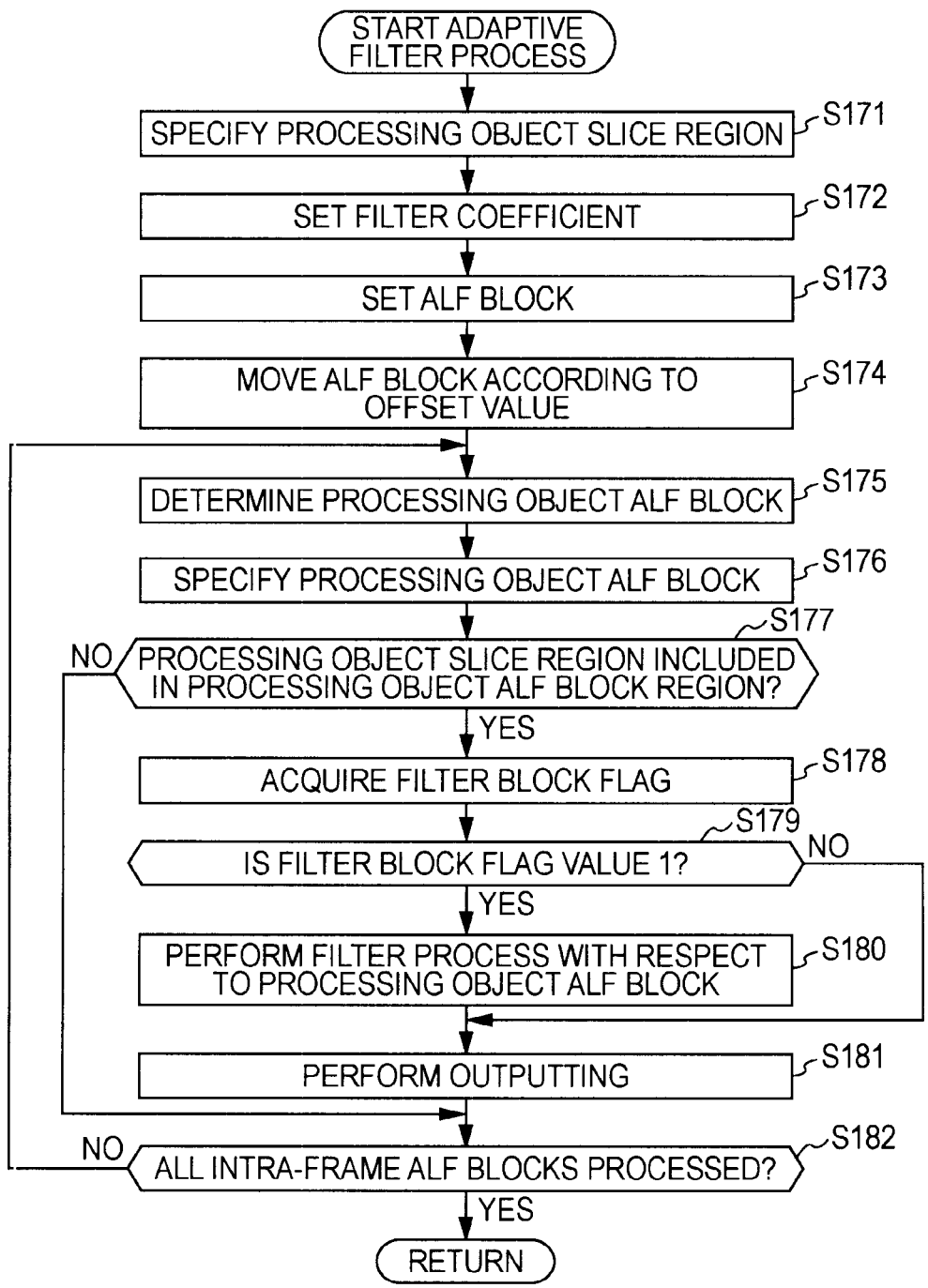
FIG. 16 is a flowchart illustrating an example of the flow of an adaptive filter process.

Next, with reference to the flowchart of FIG. 16, an example of a flow of an adaptive filter process that is executed in step S111 of FIG. 11 will be described.

When the adaptive filter process starts, the decoded image of the slice to be processed is supplied to the adaptive filter 172 and the selection unit 173. In step S171, the control unit 171 specifies the region of the slice to be processed. The control unit 171, in the same manner as the processing in step S151 of FIG. 12, acquires the front macro block address of the corresponding slice of the slice header, detects a flag that indicates the last macro block, and specifies the region from the front macro block address to the last macro block address as the region of the slice to be processed.

In step S172, the control unit 171 acquires the filter coefficient generated by the control information generation unit 112, and sets the filter coefficient in the adaptive filter 172. In step S173, the control unit 171 acquires the ALF block size determined by the control information generation unit 112, and sets (arranges) the ALF blocks having the ALF block size over the whole region of the frame.

In step S174, the control unit 171 acquires the offset value generated by the control information generation unit 112, and appropriately moves the position (updates the position) of the ALF blocks, which has been set in step S173, in accordance with the offset value.

In step S175, the control unit 171 determines one of non-processed ALF blocks among the appropriately moved ALF block group as the ALF block to be processed in the same manner as the case in step S156 of FIG. 15. The selection order of the ALF blocks is predetermined, and is common to the selection order in the control information generation unit 112.

In step S176, the control unit 171 specifies the region of the determined ALF block to be processed in the same manner as the case in step S157 of FIG. 15.

In step S177, the control unit 171, in the same manner as the case in step S158 of FIG. 15, determines whether or not the region of the slice to be processed is included in the region of the ALF block to be processed. If it is determined that the region of the slice to be processed is included in the region of the ALF block to be processed, the control unit 171 proceeds to step S178.

In step S178, the control unit 171 acquires the filter block flag of the ALF block to be processed, which is generated by the control information generation unit 112. Since the control information generation unit 112 generates the filter block flag as described above, the filter block flag is actually supplied only to the ALF block that includes the region of the slice to be processed. Since the processing order of the ALF block is common to that of the control information generation unit 112, the filter block flags are supplied in the processing order of the ALF blocks. Accordingly, the control unit 171 can acquire (adopt) the filter block flags of the ALF blocks to be processed by acquiring (adopting) the filter block flags in the supply order.

In this case, the supply timing of the filter block flag may not coincide with the acquisition timing of the filter block flag by the control unit 171. That is, the control unit 171 may temporarily hold the filter block flag supplied from the control information generation unit 112 in a built-in buffer and so on, and may read the filter block flag from the buffer. Even in this case, only by making the reading order of the filter block flags identical to the supply order of the control information generation unit 112, that is, the accumulation order of the buffer, the control unit 171 can acquire the filter block flag of the ALF block to be processed.

In step S179, the control unit 171 determines whether or not the filter block flag value is "1". If the filter block flag value is "1" and it is instructed that the filter process is performed with respect to the region of the ALF block to be processed, the control unit 171 proceeds to step S180. In step S180, the adaptive filter 172, under the control of the control unit 171, performs the filter process with respect to the ALF block to be processed. After the processing in step S180 is ended, the processing proceeds to step S181. In this case, the selection unit 173, under the control of the control unit 171, selects an output of the adaptive filter 172 and provides the selected output to the frame memory 114 in step S181. That is, the filter-processed decoded image (the region of a portion of the decoded image) is accumulated in the frame memory 114. If the processing in step S181 is ended, the processing proceeds to step S182.

Also, in step S179, if the filter block flag value is "0" and it is instructed that the filter process is not performed with respect to the region of the ALF block to be processed, the processing in step S180 is omitted, and the processing proceeds to step S181. In this case, the selection unit 173, under the control of the control unit 171, selects the output of the deblocking filter 111, and provides the selected output to the frame memory 114 in step S181. That is, the decoded image of which the filter process is not performed (the region of a portion of the decoded image) is accumulated in the frame memory 114. If the processing in step S181 is ended, the processing proceeds to step S182.

Also, in step S177, if it is determined that the region of the slice to be processed is not included in the region of the ALF block to be processed, the ALF block to be processed is the ALF block that is not related to the slice to be processed, and thus the processing in steps S178 to S181 is omitted, and the processing proceeds to step S182.

In step S182, the control unit 171 determines whether or not all the ALF blocks in the frame have been processed. If it is determined that a non-processed ALF block exists, the processing returns to step S175, and the subsequent process is repeated with respect to new ALF blocks. Whenever the loop process is repeated, the control unit 171 selects the ALF block among the ALF block group arranged on the region of the frame one by one in the raster scan order from the ALF block in the left upper portion, as the ALF block to be processed.

Also, in step S182, if it is determined that all the ALF blocks in the frame have been processed, the adaptive filter process is ended, the processing returns to step S111 of FIG. 11, and then the process subsequent to the step S112 is performed.

As described above, the adaptive filter processing unit 113 moves the position of the ALF blocks 152 based on the offset value set to improve the result of the filter process so that the end of the slice coincides with the boundary of the ALF block 152. Accordingly, the adaptive filter processing unit 113 can reduce the number of ALF blocks including the boundary of the slice. As a result, the image encoding apparatus 100 can suppress the increase of the delay time by making the filter process be performed more easily. Further, the image encoding apparatus 100 can suppress the reduction of the effect of the filter process.

Further, the control information generation unit 112 can reduce the number of bits of the filter block flag that is added to the image compression information by generating the offset value for moving the ALF blocks 152 to arrange the end of the slice onto the boundary of the ALF block 152. As a result, the image encoding apparatus 100 can suppress the reduction of the encoding efficiency.

Also, by generating the offset value, the control information generation unit 112 can move the ALF blocks so that the adaptive filter processing unit 113 reduces the number of ALF blocks including the boundary of the slice.

At this time, by performing the adaptive filter process, the adaptive filter processing unit 113 can appropriately perform the filter process with respect to the slice to be processed based on the filter block flag of the ALF block in a portion of the frame. Accordingly, the adaptive filter processing unit 113 can reduce the block distortion on the slice to be processed, which could not have been completely caught by the deblocking filter, or the distortion caused by the quantization.

The method of arranging the ALF blocks (initial arrangement position) is predetermined. Accordingly, in a state (initial state) where the ALF blocks are arranged over the whole frame, the position of the respective ALF block can be easily obtained from the ALF block size. Accordingly, as in the related art, the filter block flag is generated with respect to all the ALF blocks in the frame, and if the ALF block is not moved, the position of the region that corresponds to the respective filter block flag can be easily specified.

However, For example, in the case of a multi-slice which is composed of a plurality of slices in a frame, it is considered to control the filter process of the slice to be processed using the filter block flag of the ALF blocks in a portion of the frame. In this case, depending upon the position of the region of the slice to be processed (depending upon whether or not the slice to be processed is any one of the plurality of slices in the frame), the position of the region that corresponds to the used filter block flag may differ.

Also, the ALF block may be moved according to the offset value as described above.

However, according to the method in the related art, the position of the slice to be processed or the filter block flag is not specified. Accordingly, the control by the filter block flag that is generated by the control information generation unit 112 is not appropriately performed, and this may cause the adaptive filter process not to be appropriately performed.

As described above, since the adaptive filter processing unit 113 specifies the position of the region of the slice to be processed, which is the region in a portion of the frame, and the position of the region that corresponds to the filter block flag of the ALF block in a portion of the frame, the adaptive filter process can be accurately performed. That is, since the filter block flag, which does not affect the slice to be processed, of the ALF block that does not includes the region of the slice to be processed becomes unnecessary, the adaptive filter processing unit 113 can suppress the reduction of the encoding efficiency of the image compression information.

Also, since the control information generation unit 112, as described above, generates the filter block flag only with respect to the ALF block that includes the region of the slice to be processed, the generation of the unnecessary filter block flag is suppressed, and thus the reduction of the encoding efficiency of the image compression information can be suppressed.

Further, the adaptive filter processing unit 113 uses the same method as that of the control information generation unit 112, and thus it can easily specify the position of the region of the slice to be processed and the position of the region that corresponds to the filter block flag.

Also, as the reversible encoding method 106 adds the block information including the ALF block size, the offset value, and the filter block flag to the encoded data (buries the block information in the slice header), even the image decoding apparatus that decodes the encoded data can perform the filter process based on the block information, which is the same as that in the adaptive filter processing unit 113. For example, the image decoding apparatus can move the ALF blocks to reduce the number of ALF blocks including the boundary of the slice.

Here, the term "addition" indicates the relation of the block information to the encoded data in an arbitrary type. For example, the block information may be described as the syntax of the encoded data, or may be described as user data. Also, the block information may be in a link state to the encoded data as the meta data. That is, the "addition" may include "burying", "description", "multiplexing", and "connection".

By performing the encoding process that accompanies the block information generation process or the adaptive filter process, the image encoding apparatus 100 can perform the local control of the filter process more appropriately during the encoding or decoding.

2. Second Embodiment

[Configuration of a Device]

Figure 17:
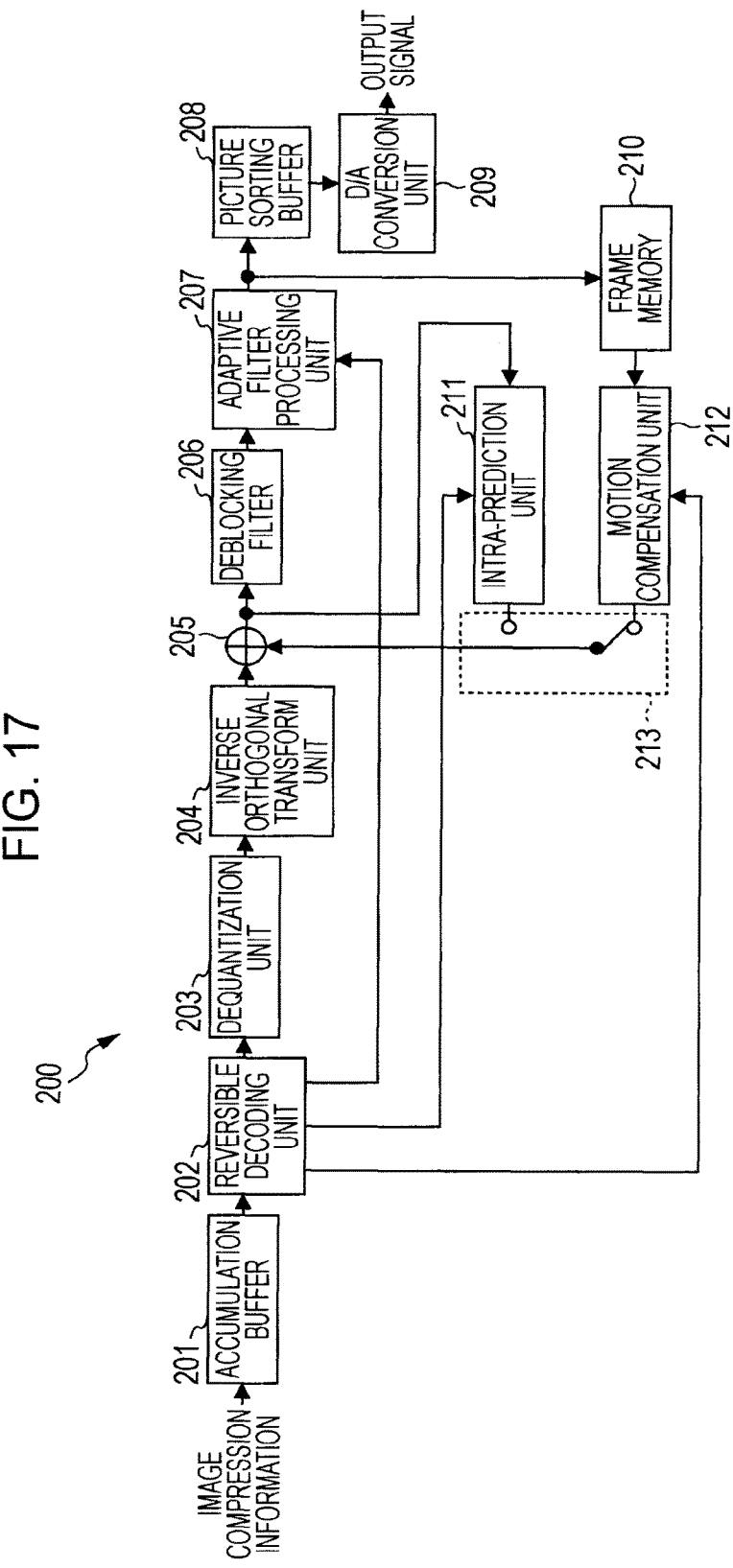
FIG. 17 is a block diagram illustrating a main configuration example of an image decoding apparatus to which the present invention is applied.

Next, an image decoding apparatus that corresponds to the image encoding apparatus 100 as described above with reference to FIG. 1 will be described. FIG. 17 is a block diagram illustrating a configuration example of an image decoding apparatus as an image processing apparatus to which the present invention is applied.

An image decoding apparatus 200 generates a decoded image by decoding the image compression information output from the image encoding apparatus 100.

The image decoding apparatus 200 includes an accumulation buffer 201, a reversible decoding unit 202, an inverse quantization unit 203, an inverse orthogonal transform unit 204, an operation unit 205, and a deblocking filter 206. Also, the image decoding apparatus 200 includes an adaptive filter processing unit 207. Further, the image decoding apparatus 200 includes a picture sorting buffer 208, and a D/A (Digital/Analog) conversion unit 209. Also, the image decoding apparatus 200 includes a frame memory 210, an intra-prediction unit 211, a motion compensation unit 212, and a selection unit 213.

The accumulation buffer 201 accumulates the transmitted image compression information. The reversible decoding unit 202 decodes the information encoded by the reversible encoding unit 106 of FIG. 1 and supplied from the accumulation buffer 201 in a method corresponding to the encoding method of the reversible encoding unit 106.

In the case where the corresponding macro block is intra-encoded, the reversible decoding unit 202 decodes the intra-prediction mode information stored in the header region of the image compression information, and transits the information to the intra-prediction unit 211. Also, in the case where the corresponding macro block is inter-encoded, the reversible decoding unit 202 decodes motion vector information stored in the header region of the image compression information, and transits the information to the motion compensation unit 212.

Also, the reverse decoding unit 202 extracts control information for the adaptive filter (control information generated by the control information generation unit 112) from the slice header of the image compression information to decode the control information, and supplies the information to the adaptive filter processing unit 207.

The inverse quantization unit 203 performs inverse quantization of the image decoded by the reversible decoding unit 202 in a method that corresponds to the quantization method of the quantization unit 105 of FIG. 1. The inverse orthogonal transform unit 204 performs the inverse orthogonal transform with respect to the output of the inverse quantization unit 203 in a method that corresponds to the orthogonal transform method performed by the orthogonal transform unit 104 of FIG. 1.

The operation unit 205 generates the decoded image by adding the predicted image supplied from the selection unit 213 to the inverse-orthogonal-transformed difference information. The deblocking filter 206 removes the block distortion of the decoded image generated through the addition.

The adaptive filter processing unit 207 performs the filter process with respect to the image supplied from the deblocking filter 206 based on the information, such as the filter coefficient, ALF block size, offset value, and filter block flag, which are included in the control information supplied from the reversible decoding unit 202. The adaptive filter processing unit 207 performs the same adaptive filter process as the of the adaptive filter processing unit 113 of FIG. 1. Accordingly, the adaptive filter processing unit 207 can reduce the block distortion, which could not have been completely caught by the deblocking filter 206, or the distortion caused by the quantization.

The adaptive filter processing unit 207 supplies the image after the filter processing to the frame memory 210 to accumulate the image as reference image information, and outputs the image to the picture sorting buffer 208.

The picture sorting buffer 208 performs the sorting of images. That is, the frames, which have been sorted in the order of their encoding by the picture sorting buffer 102 of FIG. 1, are sorted in the original order of their display. The D/A conversion unit 209 D/A-converts the image supplied from the picture sorting buffer 208 to output the converted image. For example, the D/A conversion unit 209 outputs the output signal obtained through the D/A conversion to a display (not illustrated) to display the image.

In the case where the corresponding frame is intra-encoded, the intra-prediction unit 211 generates a predicted image based on the information supplied from the reversible decoding unit 202, and outputs the generated predicted image to the selection unit 213.

In the case where the corresponding frame is inter-encoded, the motion compensation unit 212 perform the motion compensation with respect to the reference image information stored in the frame memory 210 based on the motion vector information supplied from the reversible decoding unit 202.

In the case where the corresponding macro block is intra-encoded, the selection unit 213 connects to the intra-prediction unit 211, and supplies the image supplied from the intra-prediction unit 211 to the operation unit 205 as the predicted image. Also, in the case where the corresponding macro block is inter-encoded, the selection unit 213 connects to the motion compensation unit 212, and supplies the image supplied from the motion compensation unit 212 to the operation unit 205 as the predicted image.

[Flow of Processing]

Figure 18:
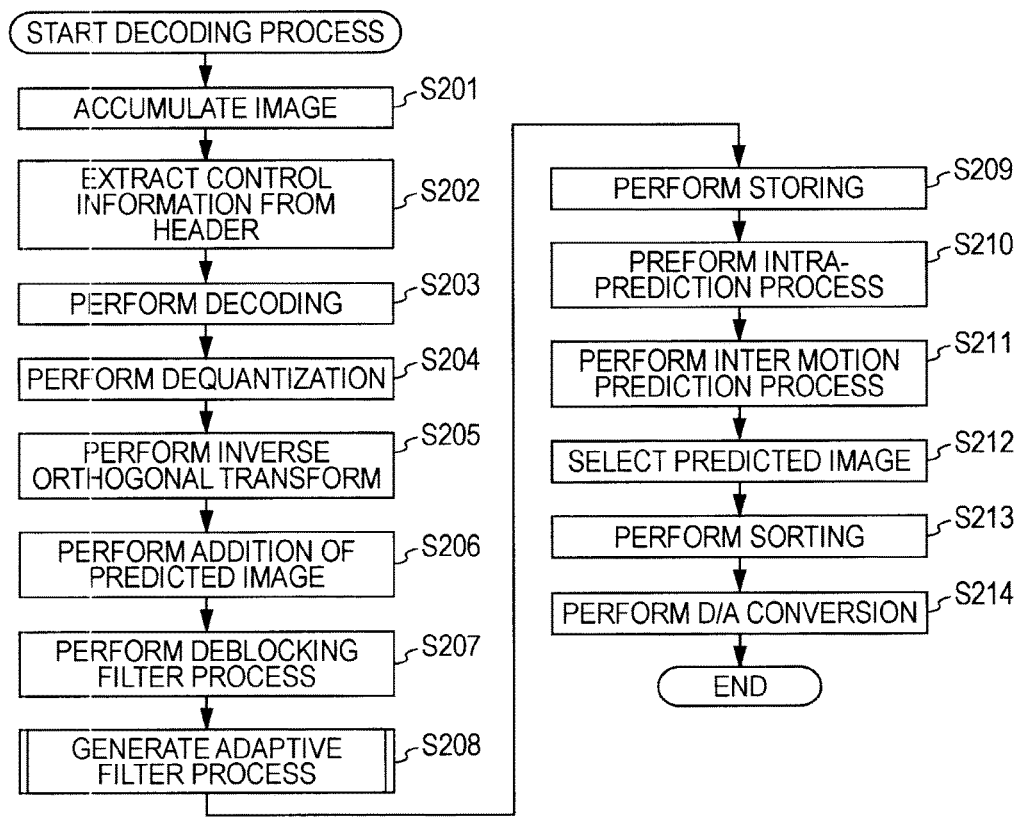
FIG. 18 is a flowchart illustrating an example of the flow of a decoding process.

With reference to the flowchart of FIG. 18, an example of a flow of decoding process that is performed by the image decoding apparatus 200 will be described.

In step S201, the accumulation buffer 201 accumulates the transmitted image. In step S202, the reversible decoding unit 202 decodes the compressed image that is supplied from the accumulation buffer 201. That is, the I-picture, P-picture, and B-picture, which have been encoded by the reversible encoding unit 106 of FIG. 1, are decoded.

At this time, the motion vector information, reference frame information, prediction mode information (information that indicates the intra-prediction mode or inter-prediction mode), and the like, are also decoded.

That is, in the case where the prediction mode information is intra-prediction mode information, the prediction mode information is supplied to the intra-prediction unit 211. In the case where the prediction mode information is inter-prediction mode information, the motion vector information and the reference frame information, which correspond to the prediction mode information, are supplied to the motion compensation unit 212.

Further, in step S202, the reversible decoding unit 202 extracts the control information for the adaptive filter process from the slice header of the image compression information and decodes the extracted control information. The decoded control information is supplied to the adaptive filter processing unit 207.

In step S204, the inverse quantization unit 203 performs inverse quantization of the transform coefficient decoded in step S202 with the characteristic that corresponds to the characteristic of the quantization unit 105 of FIG. 1. In step S205, the inverse orthogonal transform unit 204 performs the inverse orthogonal transform with respect to the transform coefficient inverse-quantized by the process in step S204 with the characteristic that corresponds to the characteristic of the orthogonal transform unit 104 of FIG. 1. Accordingly, the difference information that corresponds to the input of the orthogonal transform unit 104 of FIG. 1 (output of the operation unit 103) is decoded.

In step S206, the operation unit 205 adds the difference information to the predicted image selected in the process of step S212 to be described later. Accordingly, the original image is decoded. In step S207, the deblocking filter 206 performs filtering of the image output from the operation unit 205. Accordingly, the block distortion is removed.

In step S208, the adaptive filter processing unit 207 further performs the adaptive filter process with respect to the deblock-filtered image. This adaptive filter process is the same as the process that is performed by the adaptive filter processing unit 113 of FIG. 1. This adaptive filter process is performed in the same manner as that described with reference to the flowchart of FIG. 16, except for the use of the control information supplied from the reversible decoding unit 202. However, the control information supplied from the reversible decoding unit 202 is also generated by the control information generation unit 112 of FIG. 1, and is substantially equal to the control information which si supplied from the control information generation unit 112 and is used by the adaptive filter processing unit 113 of FIG. 1.

By this adaptive filter process, the block distortion, which could not have been completely caught by the deblocking filter, or the distortion caused by the quantization can be reduced.

In step S209, the frame memory 210 stores the filtered image.

In the case where the intra-prediction mode information is supplied, in step S210, the intra-prediction unit 211 performs the intra-prediction of the intra-prediction mode. Also, in the case where the inter-prediction mode information is supplied, in step S211, the motion compensation unit 212 performs the motion compensation of the inter-prediction mode.

In step S212, the selection unit 213 selects the predicted image. That is, the selection unit 213 selects any one of the predicted image generated by the intra-prediction unit 211 and the predicted image generated by the motion compensation unit 212, and supplies the selected predicted image to the operation unit 205.

For example, in the case of the intra-predicted image, the selection unit 213 selects the predicted image generated by the intra prediction unit 211, and supplies the selected predicted image to the operation unit 205. Also, in the case of the inter-predicted image, the selection unit 213 selects the predicted image generated by the motion compensation unit 212 and supplies the selected predicted image to the operation unit 205.

In step S213, the picture sorting buffer 208 performs the sorting of images. That is, the frames, which have been sorted in the order of their encoding by the picture sorting buffer 102 of the image encoding apparatus 100 of FIG. 1, are sorted in the original order of their display.

In step S214, the D/A conversion unit 209 D/A-converts the image supplied from the picture sorting buffer 208. This image is output to the display (not illustrated) to be displayed.

As described above, in the image decoding apparatus 200, the reversible decoding unit 202 extracts and decodes the control information supplied from the image encoding apparatus 100, and the adaptive filter processing unit 207 performs the adaptive filter process using the control information in the same manner as the adaptive filter processing unit 113 of the image encoding apparatus 100.

That is, the adaptive filter processing unit 207 moves the position of the ALF blocks based on the offset value to arrange the end of the slice onto the boundary of the ALF block. Accordingly, the adaptive filter processing unit 207 can reduce the number of ALF blocks including the boundary of the slice. As a result, the image decoding apparatus 200 makes the filter process be easily performed, and thus can suppress the increase of the delay time. Further, the image decoding apparatus 200 can suppress the reduction of the effect of the filter process.

By performing the above-described adaptive filter process, the adaptive filter processing unit 207 can appropriately perform the filter process with respect to the slice to be processed based on the filter block flag of the ALF blocks in a portion of the frame, which is necessary for the slice to be processed among the plurality of slices formed in the frame. Accordingly, the adaptive filter processing unit 207 can reduce the block distortion, which could not have been completely caught by the deblocking filter, or the distortion caused by the quantization That is, in the same manner as the adaptive filter processing unit 113, the adaptive filter processing unit 207 can appropriately perform the filter process with respect to the slice to be processed based on the filter block flag which is supplied only to the ALF block that is necessary for the slice to be processed.

Accordingly, the image decoding apparatus 200 can perform the local control of the filter process more appropriately during the encoding or decoding operation.

3. Third Embodiment

[Another Example of an ALF Block to be Processed]

As described above, it is exemplified that the control information generation unit 112 generates the filter block flag with respect to all the ALF blocks that include even a small portion of the region of the slice to be processed, and the adaptive filter processing unit 113 performs the filter process with respect to all the ALF blocks that include even a small portion of the slice to be processed.

However, for example, if the region of the slice to be processed that is included in the ALF block is only one pixel, the filter process exerts almost no influence upon the picture quality of the slice to be processed. In this case, even if the filter process is performed with respect to the ALF block having a low rate of the region of the slice to be processed, sufficient effect may not be obtained and the processing (load) may be unnecessary.

Accordingly, the filter process may be performed with respect to only the ALF block having a predetermined rate or more of the region of the slice to be processed. The predetermined rate, which becomes the threshold value, is optional. Also, this value may be predetermined, and may be varied according to the contents of the image and the like.

[Flow of Processing]

With reference to the flowchart of FIG. 19, an example of a flow of block information generation process in this case will be described. The flowchart of FIG. 19 corresponds to the flowchart of FIG. 15.

Figure 19:
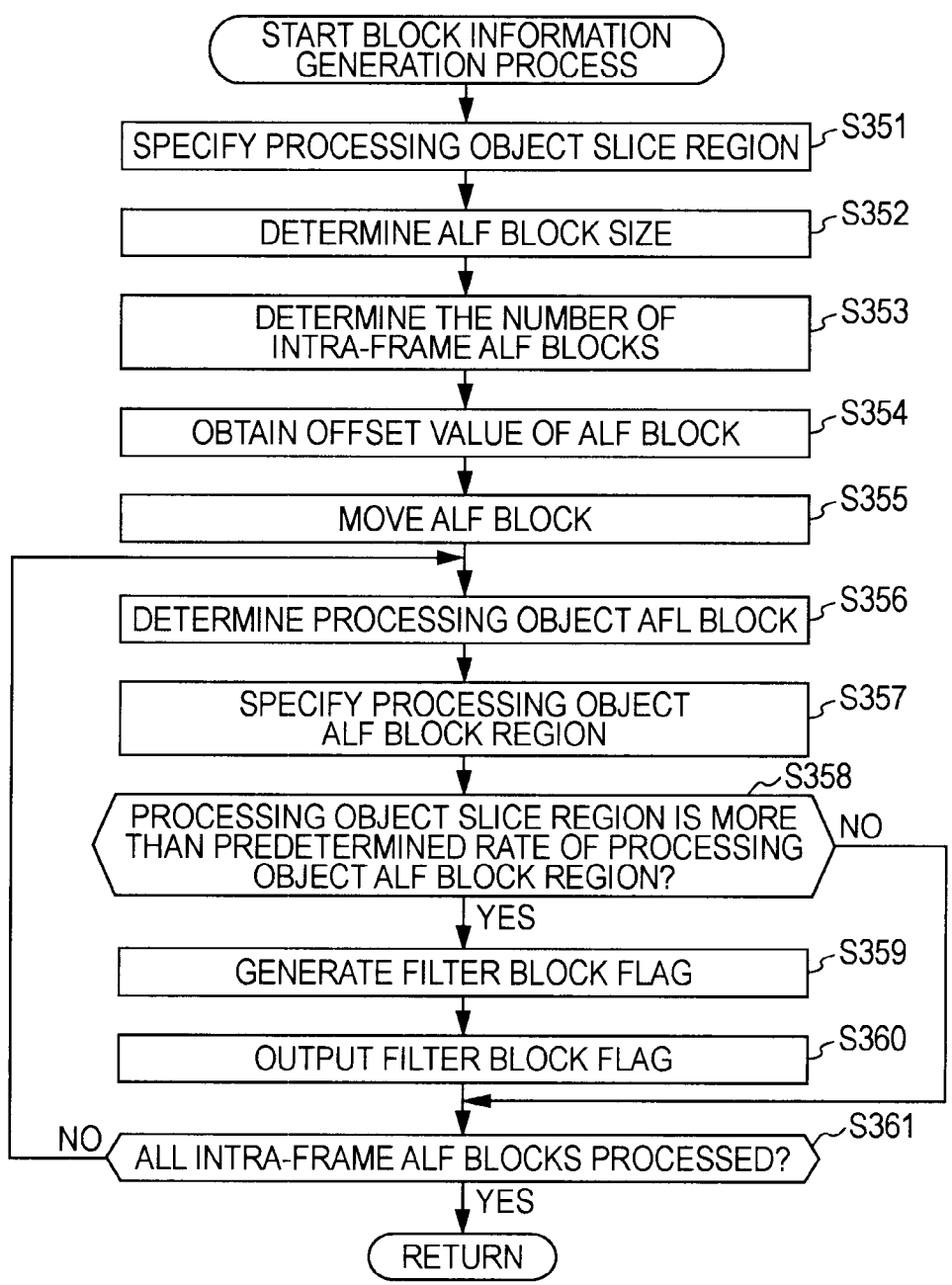
FIG. 19 is a flowchart illustrating another example of the flow of a block information generation process.

As illustrated in FIG. 19, the block information generation process in this case is performed basically in the same manner as the case as described above with reference to FIG. 15.

Accordingly, the configuration of the control information generation unit 112 is the same as that illustrated in FIG. 3.

The processes in steps S351 to S357 in FIG. 19 are the same as those in steps S151 to S157 in FIG. 15.

However, in the case of the processes in FIG. 19, if the region of the ALF block to be processed is specified, the determination unit 145, in step S358, determines whether or not the rate of the region of the slice to be processed to the region of the ALF block to be processed is higher than a predetermined rate.

If the rate of the region of the slice to be processed to the region of the ALF block to be processed is equal to or higher than the predetermined rate, the processing proceeds to step S359. Also, in step S358, if the rate of the region of the slice to be processed to the region of the ALF block to be processed is lower than the predetermined rate, the processing proceeds to step S361.

The respective processes in steps S359 to S361 are the same as those in steps S159 to S161 of FIG. 15.

As described above, the condition of generating the filter block flag may be limited to a range which is substantially much more useful than that in the first embodiment of the invention. Accordingly, the image encoding apparatus 100 and the image decoding apparatus 200 can further suppress the reduction of the encoding efficiency.

As described above, it is exemplified that the processing unit of the encoding or decoding using the adaptive filter is set to a slice unit. However, the processing unit of the encoding or decoding is not limited thereto, and any data unit that is closer than the frame unit may be used.

4. Fourth Embodiment

[Another Example of Control Information Update]

As described above, it is exemplified that the local control of the filter process during the encoding or decoding operation is performed more appropriately by moving the ALF blocks so that the block coincides with the end of the slice. However, any method for making the local control of the filter process be performed more appropriately may be used. For example, the ALF block may be moved to another destination, or the ALF block size may be updated. Further, the filter coefficient may be optimized to match their control information update.

[Other Movement Examples]

Figure 20A:
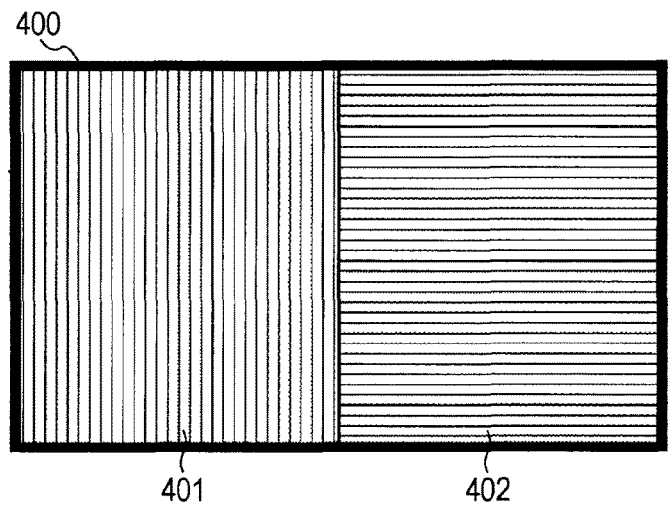
FIGS. 20A to 20C are diagrams illustrating an example of an offset of an ALF block with respect to the change of texture.
Figure 20B:
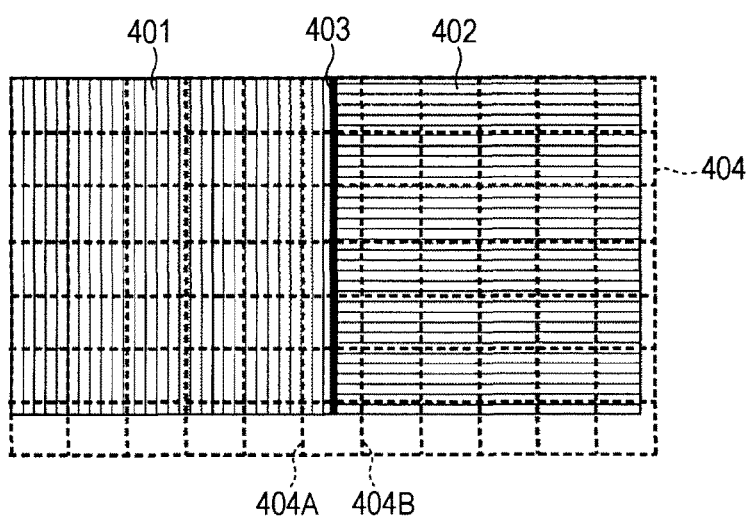
Figure 20C:
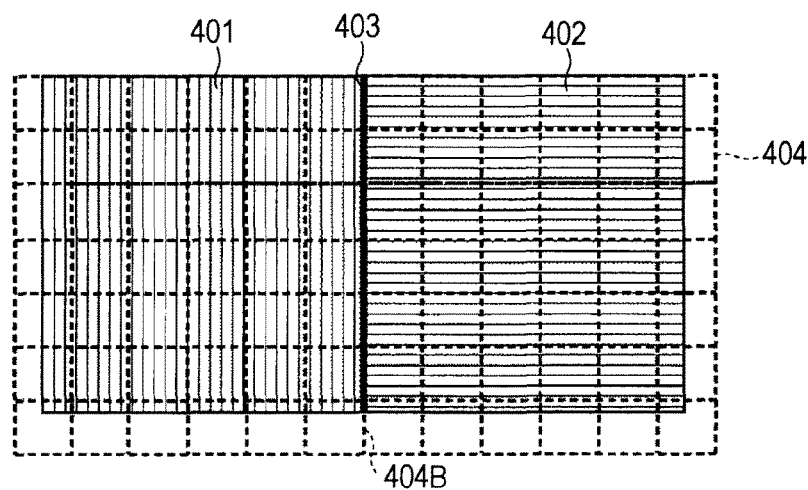

The ALF blocks may be moved based on the change of the texture (the contents of an image). FIGS. 20A to 20C are diagrams illustrating an example of an offset of an ALF block with respect to the change of texture.

For example, as illustrated in FIG. 20A, it is assumed that texture regions having different features (region 401 and region 402) exist in a frame 400 of an image to be encoded. As illustrated in FIG. 20A, the region 401 is a texture in the form of vertical stripes, and the region 402 is a texture in the form of horizontal stripes. Accordingly, the optimum filter characteristics of the region 401 and the region 402 differ from each other.

In the case of arranging the ALF blocks 404 on the frame 400, for example, as illustrated in FIG. 20B, the boundary 403 of the texture (a tangent line between the region 401 and the region 402) and the boundary of the ALF block 404 (the boundary 404A and the boundary 404B) may conflict with each other. In this case, in the region of the ALF block that includes the boundary 403 of the texture, images having different characteristics may coexist. That is, the image characteristic of the ALF block that includes the boundary 403 of the texture greatly differ from that of the ALF block that includes only the region 401 and also greatly differ from that of the ALF block that includes only the region 402, and thus the picture quality may greatly deteriorate by the filter process.

For example, if the filter process is performed only with respect to the ALF block that includes the region 401 with the filter coefficient matching the characteristic of the texture of the region 401, the picture quality of the ALF block that includes the boundary 403 of the texture may deteriorate due to the portion of the region 402 that does not correspond to the filter coefficient. By contrast, if the filter process is performed only with respect to the ALF block that includes the region 402 with the filter coefficient matching the characteristic of the texture of the region 402, the picture quality may deteriorate in the same manner.

As described above, it is difficult to perform the filter process with respect to the ALF block that includes the boundary 403 of the texture.

Accordingly, the control information generation unit, as illustrated in FIG. 20C, may move the ALF block and calculate the offset value so that the boundary 404B of the ALF block and the boundary 403 of the texture coincide with each other, and the adaptive filter processing unit may move the ALF block based on the offset value so that the boundary 404B of the ALF block and the boundary 403 of the texture coincide with each other.

By doing this, as illustrated in FIG. 20C, the number of ALF blocks that include the boundary 403 of the texture in the region can be reduced. Accordingly, the image encoding apparatus or the image decoding apparatus can control the local filter process so that a better filter result can be obtained.

[Movement Example of a Single Slice]

Figure 21A:
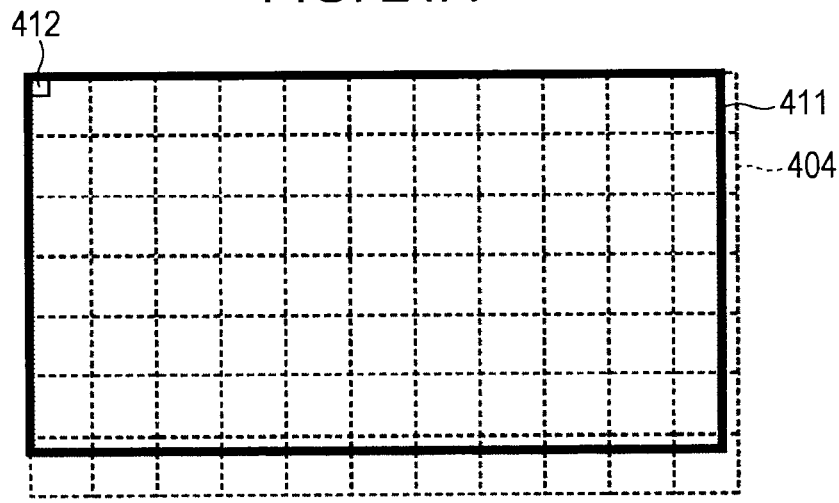
FIGS. 21A and 21B are diagrams illustrating an example of a shape of an offset.

Although in the first embodiment, the multi-slice is exemplified, the movement of the ALF block may be performed even in the single slice. For example, in FIG. 21A, with respect to the region of the frame that is indicated by the frame 411, the ALF block 404 is arranged in consideration of the pixel 412 at the left upper end of the region as the reference point. In this arrangement, if a good value is not obtained as the result of the filter process, the control information generation unit, as illustrated in FIG. 21B, may move the ALF block 404.

Figure 21B:
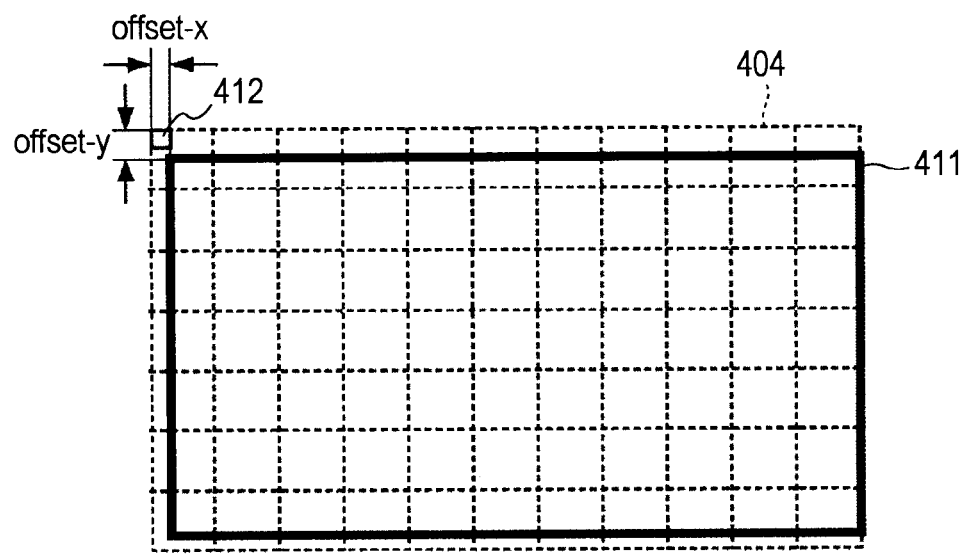

In the case of an example illustrated in FIG. 21B, the ALF block 404 coincides with the right end of the frame 411. By moving the position of the ALF block as described above, the image encoding apparatus or the image decoding apparatus can control the local filter process so that better filter result can be obtained. Also, the movement place (destination) in this case is optional and may be any position where a good filter resultant value can be obtained.

[Update of a Block Size]

Figure 22A:
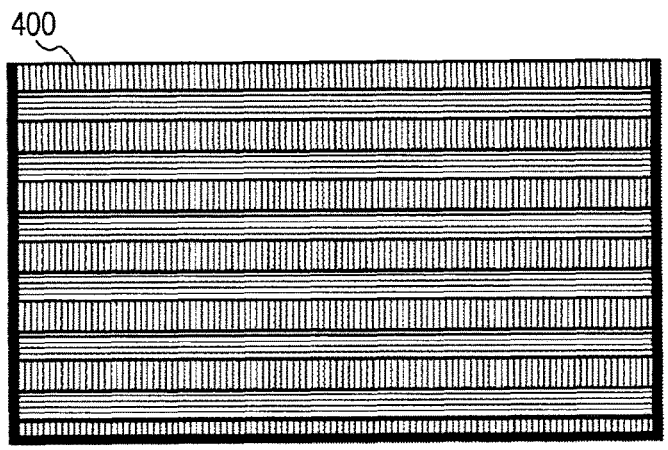
FIGS. 22A to 22C are diagrams illustrating an example of a shape of the change of an ALF block size.
Figure 22B:
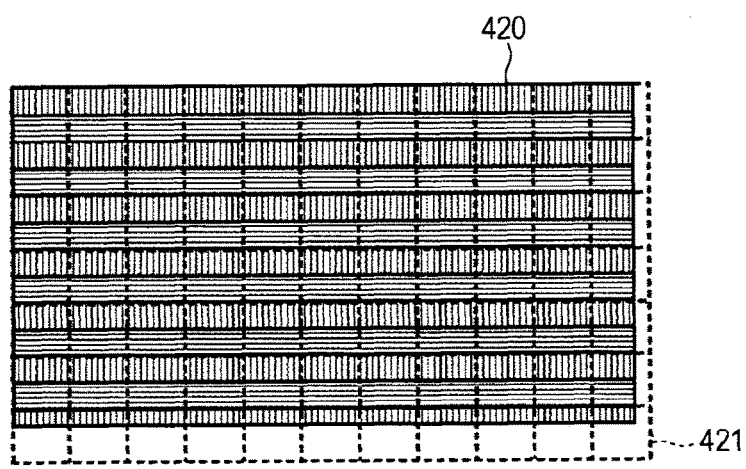

Further, the ALF block size may be updated. For example, like the frame 400 as indicated in FIG. 22A, if a horizontally long region which is composed of the same textures exists, the respective square ALF blocks 421 include a plurality of textures, and thus the effect of the filter process may deteriorate.

Figure 22C:
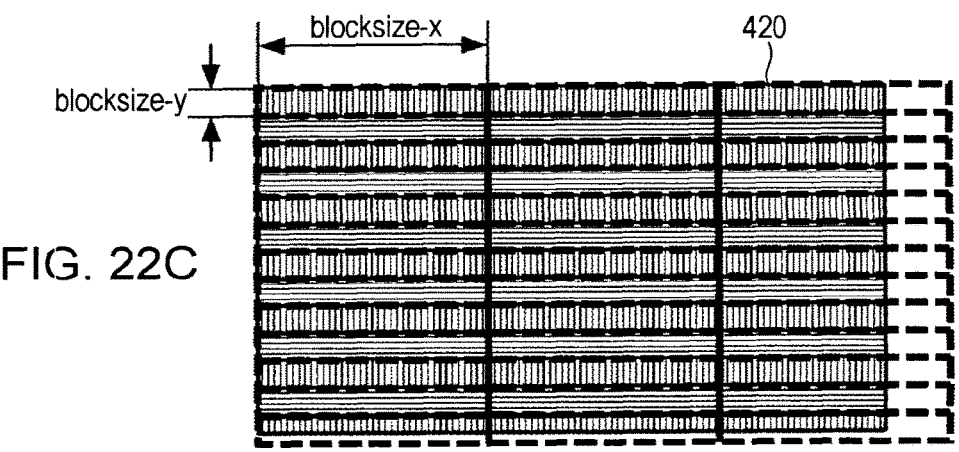

Accordingly, the control information generation unit, as illustrated in FIG. 22C, may update the ALF block size to match the contents of the image such as the texture structure and so on. In the case of an example illustrated in FIG. 22C, the respective ALF blocks are set to be in the form of a horizontally long rectangle to match the texture structure. By doing this, the image encoding apparatus or the image decoding apparatus can control the local filter process so that a better filter result can be obtained.

[Configuration of a Device]

Figure 23:
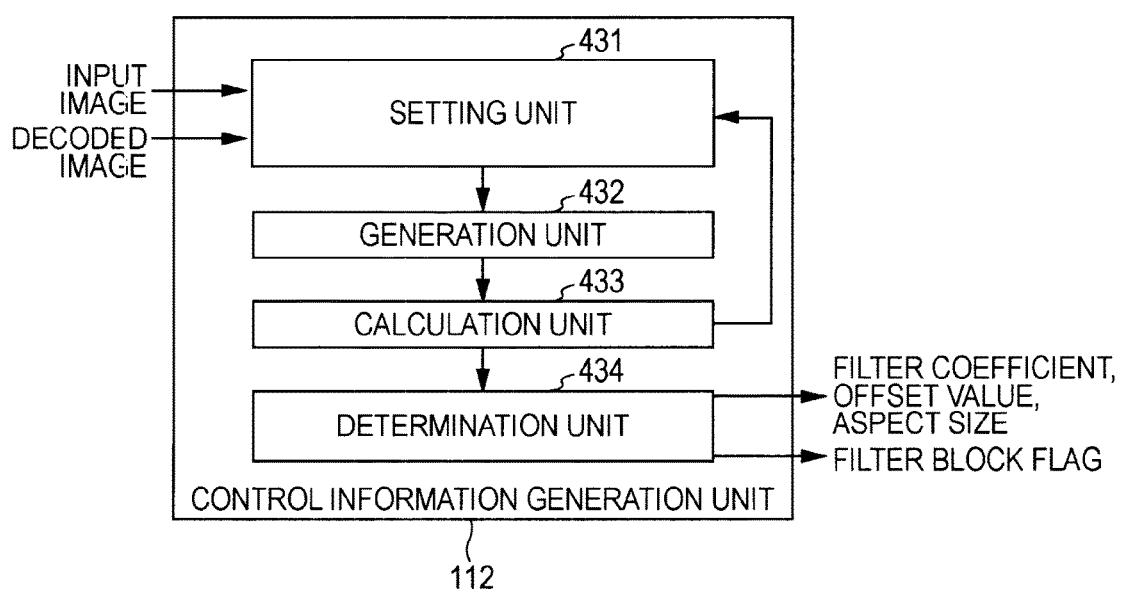
FIG. 23 is a block diagram illustrating another configuration example of a control information generation unit.

FIG. 23 is a block diagram illustrating another configuration example of the control information generation unit 112.

In this case, the control information generation unit 112 includes a setting unit 431, a generation unit 432, a calculation unit 433, and a determination unit 434.

The setting unit 431 sets the filter coefficient, ALF block size, and offset value. A method of setting these parameters is optional. For example, the parameters are set in the same manner as those in the method according to the first embodiment of the invention. Also, candidate values may be prepared in advance. However, in any case, a plurality of parameters (candidate values or combinations thereof) is prepared.

The setting unit 431 sets the filter coefficient, vertical and horizontal sizes of the ALF block, and offset value by selecting values among the plurality of candidate values one by one.

The generation unit 432 generates the filter block flag of the respective ALF block using the parameters set by the setting unit 431.

The calculation unit 433 performs the control using the filter block flag generated by the generation unit 432, performs the filter process using the parameters set by the setting unit 431, and calculates the cost value for determining the result of the filter process.

The generation unit 432 and the calculation unit 433 perform their processing as the setting unit 431 changes the respective parameter values, and thus a plurality of cost values based on different set patterns is calculated.

The determination unit 434 determines and outputs the filter coefficient, vertical and horizontal sizes of the ALF block, and offset value by adopting the set pattern when the best result of comparing the plurality of cost values is obtained. Also, the determination unit 434 outputs the filter block flag at that time.

[Flow of Processing]

Figure 24:
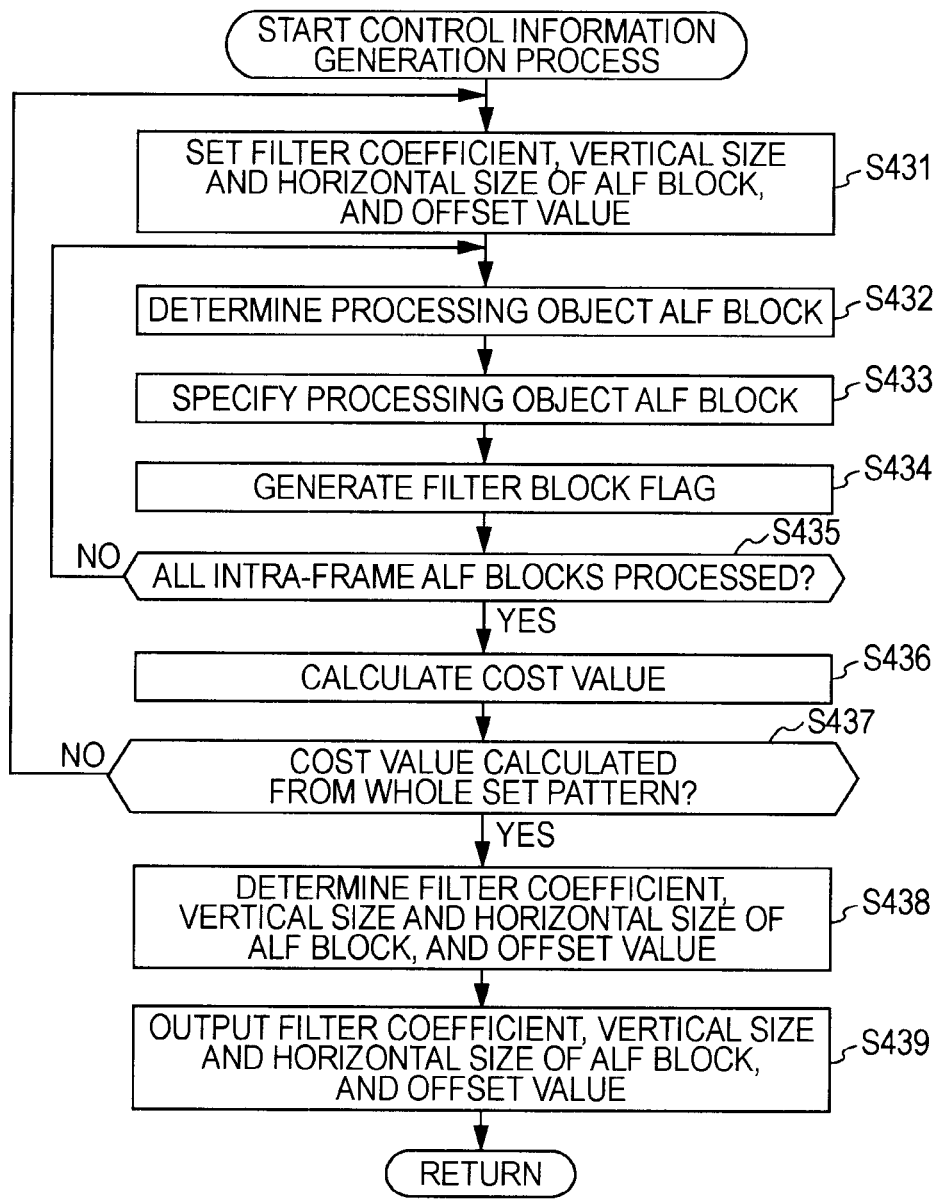
FIG. 24 is a flowchart illustrating another example of the flow of a control information generation process.

Next, with reference to the flowchart of FIG. 24, another example of the flow of the control information generation process will be described. The control information generation process corresponds to the example which has been described with reference to the flowchart of FIG. 14. That is, the control information generation process is executed in step S110 of FIG. 11.

When the control information generation process starts, the setting unit 431, in step S431, sets the filter coefficient, vertical and horizontal sizes of the ALF block, and offset value. A plurality of candidate values of the respective parameters is generated or prepared. The setting unit 431 prepares one setting pattern (combination of values) by selecting the respective parameter values one by one among the plurality of candidate values.

If the respective parameter values are set, the generation unit 432 determines, in step S432, the ALF block to be processed, and specifies, in step S433, the region of the ALF block to be processed from the parameter values set in step S431. This region specifying method is the same as that described in the first embodiment of the invention.

In step S434, the generation unit 432 generates the filter block flag of the ALF block to be processed. This method of generating the filter block flag is the same as that described in the first embodiment of the invention. If the filter block flag value of "0" or "1" is generated, the generation unit 432 determines whether or not all the ALF blocks in the frame have been processed in step S435. If it is determined that non-processed ALF blocks exist, the proceeding returns to step S432 to repeat the subsequent process.

If it is determined that all the ALF blocks in the frame have been processed in step S435, the processing proceeds to step S436.

In step S436, the calculation unit 433 calculates the cost value of the result of the filter process. The cost function is calculated, for example, using the following Equation (8) based on the Lagrange's method of undetermined multiplier.

$$J = D + \lambda \times R \quad (8)$$

Here, J denotes a cost value, D denotes an amount of distortion, R denotes a bit rate, and λ denotes an experimentally obtained coefficient, which frequently depend on the quantization parameter or picture type during an encoding operation. Using this Equation, the cost value J is calculated.

In step S437, the calculation unit 433 determines whether or not the cost values have been calculated in all of the set patterns. For example, if it is determined that the non-selected candidate values of the respective parameters, such as the filter coefficient, vertical and horizontal sizes of the ALF block, and offset value, exist, and the cost values have not yet been calculated from all the set patterns, the processing returns to step S431, and the subsequent process is repeated with respect to the new set pattern.

As described above, if it is determined that the cost values have been calculated in all the set patterns in step S437 through the repetition of steps S431 to S437, the processing proceeds to step S438.

In step S438, the determination unit 434 specifies the set pattern in which the cost value J is minimized by comparing the obtained cost values J, and determines the filter coefficient, the vertical and horizontal sizes of the ALF block, and the offset value through the set pattern.

If the filter coefficient, the vertical and horizontal sizes of the ALF block, and the offset value are determined, the determination unit 434 outputs their values in step S439.

If the filter coefficient, the vertical and horizontal sizes of the ALF block, and the offset value are output, the control information generation process is ended, the processing returns to step S110 in FIG. 11, and processes subsequent to the step S111 are performed.

As described above, by calculating the cost value J, the control information generation unit 112 can optimize the control information values, such as the filter coefficient, the vertical and horizontal sizes of the ALF block, and the offset value. Of course, the filter block flag value can be optimized.

Accordingly, the image encoding apparatus 100 can perform the local control of the filter process more appropriately during the encoding. Also, the image encoding apparatus 100 encodes the respective determined parameters of the control information, in the same manner as those in the first embodiment of the invention, and includes the encoded parameters in a slice header of the image compression information.

By doing this, the image decoding apparatus 200 can perform the decoding process in the same manner as that in the first embodiment of the invention, and thus can perform the adaptive filter process using the respective parameters. That is, the image encoding apparatus 100 can make the image decoding apparatus 200 perform the local control of the filter process more appropriately during the decoding operation. That is, the image decoding apparatus 200 can perform the local control of the filter process more appropriately during the decoding operation by performing the filter process using the control information determined as described above by the image encoding apparatus 100.

5. Fifth Embodiment

[Explanation of QALF]

As indicated in T. Chujoh, N. Wada and G. Yasuda, "Quadtree-based Adaptive Loop Filter," ITU-T SG16 Q6 VCEG Contribution, VCEG-AK22(rl), Japan, April, 2009, the ALF block may have a quadtree structure. This technology is called a QALF (Quadtree-based Adaptive Loop Filter). The quadtree structure is a layered structure in which a region of one ALF block of one upper layer is divided into four regions in a lower layer.

FIGS. 25A to 25D illustrates an example in which the division of the ALF block is expressed by a quadtree structure having three layers at maximum, and the filter block flags are designated to the respective ALF blocks.

Figure 25:
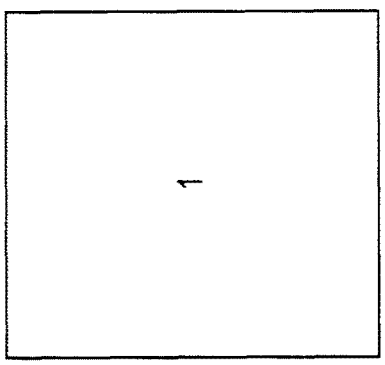
FIGS. 25A to 25D are diagrams illustrating another example of an ALF block and a filter block flag.

FIG. 25A illustrates layer 0 which is an ALF block that is the root of the quadtree structure. In the quadtree structure, the respective ALF block has a block partitioning flag that indicates whether or not the block has been divided into four regions in the lower layer. The block partitioning flag value of the ALF block as illustrated in FIG. 25A is "1". That is, the ALF block is divided into four regions in the lower layer (layer 1). FIG. 25B illustrates layer 1. That is, four ALF blocks are formed in layer 1.

If the block partitioning flag is "0", the block is not divided into four regions in the lower layer. That is, further division is not performed, and the filter block flag is generated with respect to the ALF block. That is, the ALF block of which the block partitioning flag is "0" also has the filter block flag. In FIG. 25B, "0" on the left side of "0-1" indicates the block partitioning flag of the ALF block, and "1" on the right side indicates the filter block flag of the ALF block.

Two ALF blocks of which the block partitioning flag of layer 1 is "1" is further divided into four regions in the lower layer (layer 2). FIG. 25C illustrates the layer 2. That is, in layer 2, 10 ALF blocks are formed.

In the same manner, the ALF block of which the block partitioning flag is "0" in layer 2 is allocated with the filter block flag. In FIG. 25C, the block partitioning flag of one ALF block is "1". That is, the ALF block is further divided into four regions in the lower layer (layer 3). FIG. 25D illustrates layer 3. That is, in layer 3, 13 ALF blocks are formed.

Figure 26:
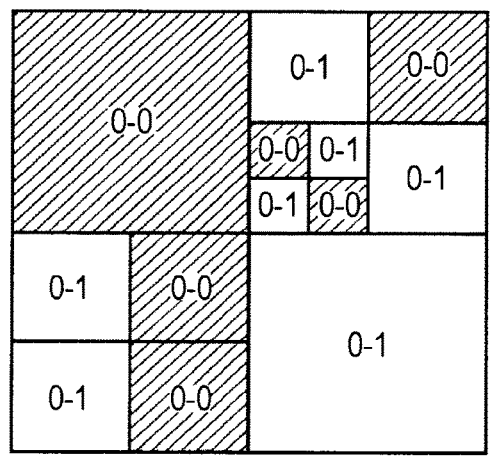
FIG. 26 is a diagram illustrating another example of an ALF block and a filter block flag.

By making the quadtree as illustrated in FIGS. 25A to 25D, the ALF blocks are finally configured as illustrated in FIG. 26. In the quadtree structure as described above, the sizes of the ALF blocks may differ for the respective layers. That is, by taking the quadtree structure, the ALF blocks may have different sizes in the frame.

The control of the filter block flag in the respective ALF block is that same as that in the first embodiment of the invention. That is, the filter process is not performed with respect to the region of the ALF block of which the filter block flag value is "0" (portions indicated by slanting lines in FIG. 26).

In the case of the multi-slice, the reduction of the encoding efficiency occurs when the ALF block is set in a slice region that is smaller than the frame, and thus the same problem occurs in the QALF having an improved expression of the ALF block.

Figure 27:
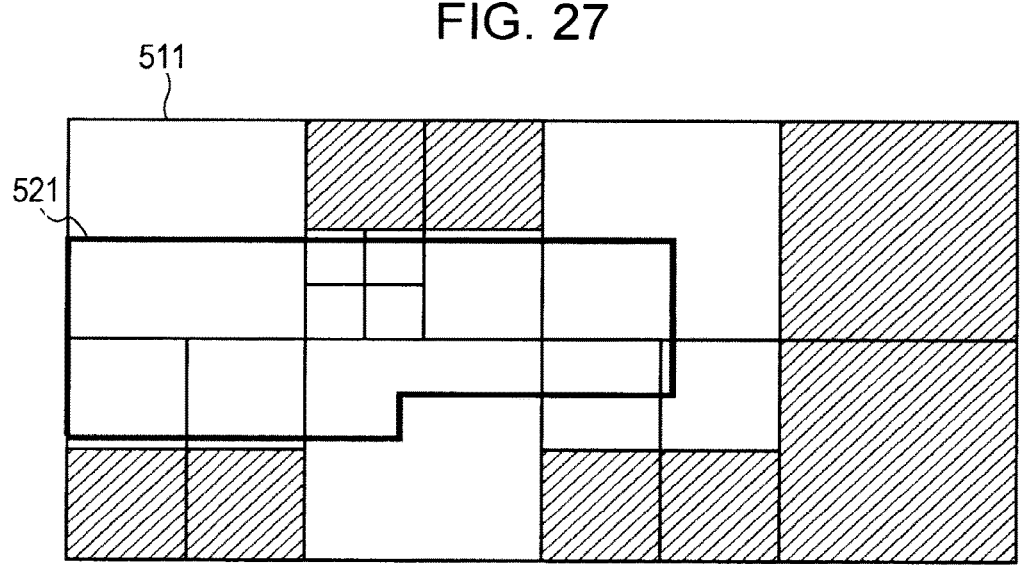
FIG. 27 is a diagram illustrating the shape of the processing in the case of a multi-slice.

FIG. 27 illustrates an example of the region of slice 1 of FIG. 5 that is encoded using the QALF technology. Here, a QALF block 511 is an ALF block formed in the quadtree structure, and the region indicated by a thick line 521 represents the region of slice 1. In FIG. 27, there are many QALF blocks 511 including the boundary (indicated by a thick line 521) of the slice.

Accordingly, if the filter process is performed as in the related art, the encoding efficiency may deteriorate, the filter process may be complicated, the delay time may be increased, or the effect of the filter process may deteriorate.

Also, in the same manner as the BALF described in the first embodiment of the invention, the QALF block indicated by slanting lines in FIG. 27 does not include the region of slice 1, and thus becomes an unnecessary ALF block.

If the filter block flag is provided even to the unnecessary ALF block as in the related art, the image compression information is unnecessarily increased to deteriorate the encoding efficiency.

Even in the case of the QALD, by the same method as that of the BALF in the first to fourth embodiments of the invention, the image encoding apparatus 100 moves the QALF block 511 to obtain a better filter result. For example, the image encoding apparatus 100 buries the control information in the slice header based on the syntax as indicated in FIG. 28. Accordingly, in the same manner as the BALF, the control information is transmitted even to the image decoding apparatus 200.

That is, the image encoding apparatus 100 and the image decoding apparatus 200 can perform the local control of the filter process more appropriately during the encoding or decoding operation.

Also, the image encoding apparatus 100 suppresses the generation of the unnecessary filter block flag, by the same method as that of the BALF in the first to fourth embodiments of the invention, and thus the unnecessary filter block flag may not be included in the slice header.

That is, the image encoding apparatus 100 and the image decoding apparatus 200 can recognize that the blocks indicated by slanting lines in FIG. 27 do not include the corresponding slice (slice 1 in FIG. 27). Accordingly, the image encoding apparatus 100 generates the filter block flag only with respect to the ALF blocks of the quadtree structure including the corresponding slice, and supplies the filter block flag to the image decoding apparatus 200 together with the image compression information, so that the generation of the unnecessary filter block flag is suppressed and the deterioration of the encoding efficiency is suppressed.

6. Sixth Embodiment

[Personal Computer]

The above-described series of processes may be executed by hardware or by software. In this case, for example, a personal computer as illustrated in FIG. 29 may be configured.

In FIG. 29, a CPU 601 of a personal computer 600 executes various kinds of processes according to a program stored in a ROM (Read Only Memory) 602 or a program loaded from a storage unit 613 to a RAM (Random Access Memory) 603. In the RAM 603, data that is necessary for the CPU 601 to execute various kinds of processes may be stored appropriately.

The CPU 601, ROM 602, and RAM 603 are connected together through a bus 604. Also, an input/output interface 610 is connected to the bus 604.

The input/output interface 610 is connected to an input unit 611 composed of a keyboard, a mouse, and the like, an output unit 612 composed of a display having a CRT (Cathode Ray Tube) or an LCD (Liquid Crystal Display), a speaker, or the like, a storage unit 613 composed of a hard disc or the like, and a communication unit 614 composed of a modem or the like. The communication unit 614 performs the communication process through a network including the Internet.

The input/output interface 610 is also connected to a drive 615 if necessary. A removable medium 621, such as a magnetic disc, an optical disc, a magneto optic disc, or a semiconductor memory, is appropriately mounted on the drive 615, and a computer program read from the removable medium is installed in the storage unit 613 if necessary.

In the case of executing the above-described series of processing by software, a program configuring the software is installed from a network or a recording medium.

The recording medium, for example, separately from a device main body as illustrated in FIG. 29, may be configured not only by a removable media 621 composed of a magnetic disc (including a flexible disc) recorded with a program distributed to transmit a program to a user, an optical disc (including a CD-ROM (Compact Disc-Read Only Memory) and a DVD (Digital Versatile Disc)), an optimagnetic disc (including MD (Mini Disc)), a semiconductor memory, or the like, but also by a ROM 602 recorded with a program which is pre-inserted into the device main body to be transferred to a user, a hard disc included in the storage unit 613, or the like.

In this case, a program executed by a computer may be a program that performs processing in a time-series manner according to the order as described above in the specification or may be a program that performs processing in parallel or in a necessary timing when such processing is necessary.

In addition, in this specification, the steps describing the program recorded on the recording medium include processes performed in a time-series manner according to the order as described above and processes performed in parallel or separately even though it is not necessarily performed in a time-series manner.

Also, in this specification, the system indicates the whole device configured by a plurality of devices (apparatuses).

Also, as described above, the configuration explained as one device (or a processing unit) may be divided into a plurality of devices (or processing units). In contrast, as described above, a plurality of devices (or processing units) may be gathered and configured as one device (or a processing unit). Also, it is also possible to add a configuration in addition to the above-described devices (or processing units). Further, if the configuration or operation is substantially the same as the whole system, a part of the configuration of a certain device (or a processing unit) may be included in the configuration of another device (or another processing unit). The present invention is not limited to the above-described embodiments, and diverse modifications can be made without departing from the scope of the invention.

For example, the above-described image encoding apparatus 100 and the image decoding apparatus 200 may be applied to an arbitrary electronic appliance. Hereinafter, an example thereof will be described.

7. Seventh Embodiment

[Television Receiver]

FIG. 30 is a block diagram illustrating a main configuration example of a television receiver using the image decoding apparatus 200 to which the present invention is applied.

A television receiver 1000 as illustrated in FIG. 30 includes a ground-wave tuner 1013, a video decoder 1015, an image processing circuit 1018, a graphics generation circuit 1019, a panel driving circuit 1020, and a display panel 1021.

The ground-wave tuner 1013 receives a broadcast wave signal of a ground analog broadcasting through an antenna, acquires an image signal by demodulating the received broadcast wave signal, and supplies the acquired image signal to the video decoder 1015. The video decoder 1015 decodes the image signal supplied from the ground-wave tuner 1013, and supplies the obtained digital component signal to the image signal processing circuit 1018.

The image signal processing circuit 1018 performs predetermined processes such as noise removal and so on with respect to the image data supplied from the video decoder 1015, and supplies the obtained image data to the graphics generation circuit 1019.

The graphics generation circuit 1019 generates image data of a program that is displayed on the display panel 1021 or image data obtained through processing based on an application supplied through a network, and supplies the image data or picture data to the panel driving circuit 1020. Also, the graphics generation circuit 1019 generates image data (graphics) for displaying a picture that is used by a user to select items, and supplies image data, which is obtained by overlapping the image data of the program on the generated image data, to the panel driving circuit 1020.

The panel driving circuit 1020 displays the image of the program or above-described various kinds of pictures on the display panel 1021 by driving the display panel 1021 based on the data that is supplied from the graphics generation circuit 1019.

The display panel 1021 may be composed of an LCD (Liquid Crystal Display) and so on, and displays the image of the program and so on in accordance with the control of the panel driving circuit 1020.

Also, the television receiver 1000 includes an audio A/D (Analog/Digital) conversion circuit 1014, an audio signal processing circuit 1022, an echo cancel/audio synthesis circuit 1023, an audio amplifying circuit 1024, and a speaker 1025.

The ground-wave tuner 1013 acquires not only the image signal but also the audio signal by demodulating the received broadcast wave signal. The ground-wave tuner 1013 supplies the acquired audio signal to the audio A/D conversion circuit 1014.

The audio A/D conversion circuit 1014 performs the A/D conversion process with respect to the audio signal supplied from the ground-wave tuner 1013, and supplies the obtained digital audio signal to the audio signal processing circuit 1022.

The audio signal processing circuit 1022 performs a predetermined process, such as noise removal, with respect to the audio data supplied from the audio A/D conversion circuit 1014, and supplies the obtained audio data to the echo cancel/audio synthesis circuit 1023.

The echo cancel/audio synthesis circuit 1023 supplies the audio data supplied from the audio signal processing circuit 1022 to the audio amplifying circuit 1024.

The audio amplifying circuit 1024 performs a D/A conversion process and amplifying process with respect to the audio data supplied from the echo cancel/audio synthesis circuit 1023, adjusts the volume of the audio signal, and outputs the audio signal through the speaker 1025.

Further, the television receiver 1000 includes a digital tuner 1016 and an MPEG decoder 1017.

The digital tuner 1016 receives a broadcast wave signal of a digital broadcasting (ground digital broadcasting, BS (Broadcasting Satellite)/CS (Communications Satellite) digital broadcasting, or the like) through an antenna, demodulates the received digital broadcast wave signal, acquires MPEG-TS (Moving Picture Experts Group-Transport Stream), and supplies the MPEG-TS to the MPEG decoder 1017.

The MPEG decoder 1017 removes scramble that is carried on the MPEG-TS supplied from the digital tuner 1016, and extracts a stream that includes program data to be reproduced (to be viewed). The MPEG decoder 1017 decodes audio packets that constitute the extracted stream, and supplies the obtained audio data to the audio signal processing circuit 1022. Also, the MPEG decoder 1017 decodes image packets that constitute the stream, and supplies the obtained image data to the image signal processing circuit 1018. Also, the MPEG decoder 1017 supplies EPG (Electronic Program Guide) data extracted from the MPEG-TS to the CPU 1032 through a path (not illustrated).

The television receiver 1000 uses the above-described image decoding apparatus 200 as the MPEG decoder 1017 for decoding the image packets. In this case, the MPEG-TS that is transmitted from a broadcasting station and so on is encoded by the image encoding apparatus 100.

The MPEG decoder 1017, in the same manner as the image decoding apparatus 200, moves the position of the ALF blocks to arrange the boundary of the ALF block onto the end of the slice based on the offset value. Accordingly, the MPEG decoder 1017 can reduce the number of ALF blocks that include the boundary of the slice. As a result, the MPEG decoder 1017 can perform the local control of the filter process more appropriately.

The image data supplied from the MPEG decoder 1017, in the same manner as the image data supplied from the video decoder 1015, is processed through the image signal processing circuit 1018, appropriately overlaps the generated image data and so on through the graphics generation circuit 1019, and is supplied to the display panel 1021 through the panel driving circuit 1020 to display the image.

The audio data supplied from the MPEG decoder 1017, in the same manner as the audio data supplied from the audio A/D conversion circuit 1014, is processed through the audio signal processing circuit 1022, and is supplied to the audio amplifying circuit 1024 through the echo cancel/audio synthesis circuit 1023 to be D/A-converted or amplified. As a result, audio with the adjusted volume is output through the speaker 1025.

Also, the television receiver 1000 includes a microphone 1026 and an A/D conversion circuit 1027.

The A/D conversion circuit 1027 receives the user's audio signal that is received through the microphone 1026 installed on the television receiver 1000, performs the A/D conversion process with respect to the received audio signal, and supplies the obtained digital audio data to the echo cancel/audio synthesis circuit 1023.

The echo cancel/audio synthesis circuit 1023, in the case where audio data of a user (user A) of the television receiver 1000 is supplied from the A/D conversion circuit 1027, performs the echo cancel with respect to the audio data of the user A, and outputs audio data that is obtained by synthesizing the audio data with another audio data and so on to the speaker 1025 through the audio amplifying circuit 1024.

Further, the television receiver 1000 includes an audio codec 1028, an internal bus 1029, an SDRAM (Synchronous Dynamic Random Access Memory) 1030, a flash memory 1031, a CPU 1032, a USB (Universal Serial Bus) interface 1033, and a network interface 1034.

The A/D conversion circuit 1027 receives the user's audio signal received through the microphone 1026 for speech conversation that is installed on the television receiver 1000, performs the A/D conversion process with respect to the received audio signal, and supplies the obtained digital audio data to the audio codec 1028.

The audio codec 1028 converts the audio data supplied from the A/D conversion circuit 1027 into data of a predetermined format for transmission through a network, and supplies the converted data to the network interface 1034 through the internal bus 1029.

The network interface 1034 is connected to the network through a cable mounted on a network terminal 1035. The network interface 1034, for example, transmits the audio data supplied from the audio codec 1028 to other devices connected to the network. Also, the network interface 1034, for example, receives the audio data transmitted from other devices connected through the network through the network terminal 1035, and supplies the received audio data to the audio codec 1028 through the internal bus 1029.

The audio codec 1028 converts the audio data supplied from the network interface 1034 into data of a predetermined format, and supplies the converted data to the echo cancel/audio synthesis circuit 1023.

The echo cancel/audio synthesis circuit 1023 performs the echo cancel with respect to the audio data supplied from the audio codec 1028, and outputs audio data that is obtained by synthesizing the audio data with another audio data and so on to the speaker 1025 through the audio amplifying circuit 1024.

The SDRAM 1030 stores various kinds of data that are necessary for the CPU 1032 to perform the process.

The flash memory 1031 stores programs that are executed by the CPU 1032. The program stored in the flash memory 1031 is read by the CPU 1032 at a predetermined timing such as at a start of the television receiver 1000. The flash memory 1031 also stores the EPG data acquired through the digital broadcasting, data acquired from a predetermined server through the network, and the like.

For example, the flash memory 1031 stores the MPEG-TS which includes the content data that is acquired from the predetermined server through the network under the control of the CPU 1032. The flash memory 1031, under the control of the CPU 1032, supplies the MPEG-TS to the MPEG decoder 1017 through the internal bus 1029.

The MPEG decoder 1017 processes the MPEG-TS in the same manner as the MPEG-TS supplied from the digital tuner 1016. As described above, the television receiver 1000 receives the content data composed of an image or audio through the network, decodes the content data using the MPEG decoder 1017, and displays the image or outputs the audio.

Also, the television receiver 1000 includes a light sensing unit 1037 that receives an infrared signal transmitted from a remote controller 1051.

The light sensing unit 1037 receives the infrared rays from the remote controller 1051, and outputs a control code that indicates the contents of user manipulation obtained through the demodulation to the CPU 1032.

The CPU 1032 executes the program stored in the flash memory 1031, and controls the whole operation of the television receiver 1000 in accordance with the control code and so on supplied from the light sensing unit 1037. The CPU 1032 is connected to respective units of the television receiver 1000 through paths (not illustrated).

The USB interface 1033 performs data transmission/reception between the television receiver 1000 and an external device that is connected through a USB cable mounted on the USB terminal 1036. The network interface 1034 is connected to the network through the cable mounted on the network terminal 1035, and performs data transmission/reception with various kinds of devices connected to the network in addition to the audio data.

The television receiver 1000 can perform the local control of the filter process more appropriately with respect to the broadcast wave signal received through the antenna or the content data acquired through the network by using the image decoding apparatus 200 as the MPEG decoder 1017.

8. Eighth Embodiment

[Portable Phone]

FIG. 31 is a block diagram illustrating a main configuration example of a portable phone that uses the image encoding apparatus and the image decoding apparatus to which the present invention is applied.

A portable phone 1100 as illustrated in FIG. 31 includes a main control unit 1150 that generally control the respective units, a power supply circuit unit 1151, a manipulation input control unit 1152, an image encoder 1153, a camera interface unit 1154, an LCD control unit 1155, an image decoder 1156, a multiple separation unit 1157, a recording/reproducing unit 1162, a modulation/demodulation circuit unit 1158, and an audio codec 1159. The respective units are connected together through a bus 1160.

Also, the portable phone 1100 includes a manipulation key 1119, a CCD (Charge Coupled Device) camera 1116, a liquid crystal display 1118, a storage unit 1123, a transmission/reception circuit unit 1163, an antenna 1114, a microphone 1121, and a speaker 1117.

The power supply circuit unit 1151, if a call-off and power key is in an on state by a user's manipulation, supplies the power from a battery pack to respective units and the portable phone 1100 is in an operable state.

The portable phone 1100, based on the control of the main control unit 1150 composed of the CPU, ROM, RAM, and the like, performs various kinds of operations, such as audio signal transmission/reception, e-mail or image data transmission/reception, image capturing, and data recording, in various kinds of modes, such as a voice call mode, and a data communication mode.

For example, in a voice call mode of the portable phone 1100, the audio codec 1159 converts an audio signal collected by a microphone 1121 into digital audio data, the modulation/demodulation circuit unit 1158 performs a spectrum diffusion process with respect to the digital audio data, and the transmission/reception circuit unit 1163 performs a digital/analog conversion process and frequency conversion process with respect to the processed digital audio data. The portable phone 1100 transmits the signal for transmission obtained through the conversion process to a base station (not illustrated) through the antenna 1114. The signal (audio signal) for transmission that is transmitted to the base station is supplied to an opposite party's portable phone through the public switched telephone network.

Also, for example, in a voice call mode of the portable phone 1100, the transmission/reception circuit unit 1163 amplifies the signal received through the antenna 1114 and performs a frequency conversion process and analog/digital conversion process with respect to the amplified signal. The modulation/demodulation circuit unit 1158 performs a spectrum inverse diffusion process with respect to the analog/digital converted signal, and the audio codec 1159 converts the output of the modulation/demodulation circuit unit into an analog audio signal. The portable phone 1100 outputs the analog audio signal obtained by the conversion through the speaker 1117.

Further, for example, in the case of transmitting an e-mail in a data communication mode of the portable phone 1100, the manipulation input control unit 1152 receives text data of the e-mail input through the manipulation of the manipulation key 1119, the main control unit 1150 processes the text data, and the LCD control unit 1155 displays the text data on the liquid crystal display 1118 as an image.

Also, in the portable phone 1100, the main control unit 1150 generates e-mail data based on the text data received through the manipulation input control unit 1152 or a user instruction. In the portable phone 1100, the modulation/demodulation circuit unit 1158 performs the spectrum diffusion process with respect to the e-mail data, and the transmission/reception circuit unit 1163 performs the digital/analog conversion process and frequency conversion process with respect to the output of the modulation/demodulation circuit unit. The portable phone 1100 transmits the signal for transmission that is obtained through the conversion process to a base station (not illustrated) through the antenna 1114. The signal for transmission (e-mail) transmitted to the base station is supplied to a predetermined destination through a network, a mail server, and the like.

Also, for example, in the case of receiving the e-mail in a data communication mode of the portable phone 1100, the transmission/reception circuit unit 1163 receives the signal transmitted from the base station through the antenna 1114, amplifies the received signal, and performs the frequency conversion process and the analog/digital conversion process with respect to the amplified signal. In the portable phone 1100, the modulation/demodulation circuit unit 1158 performs the spectrum inverse diffusion process with respect to the received signal to restore the original e-mail data. In the portable phone 1100, the LCD control unit 1155 displays the restored e-mail data on the liquid crystal display 1118.

At this time, in the portable phone 1100, it is also possible that the recording/reproducing unit 1162 records (stores) the received e-mail data in the storage unit 1123.

The storage unit 1123 is an arbitrary rewritable storage medium. The storage unit 1123 may be a semiconductor memory such as a RAM or built-in flash memory, a hard disc, a magnetic disc, a magneto optic disc, an optical disc, a USB memory, or a removable medium such as a memory card. Of course, the storage unit 1123 may be any other medium except for the above-described media.

Further, for example, in the case of transmitting image data in a data communication mode of the portable phone 1100, the CCD camera 1116 generates the image data through capturing. The CCD camera 1116, which has optical devices such as a lens and an iris, and a CCD as a photoelectric transformation element, captures an image of an object, transforms the intensity of received light into an electric signal, and generates image data of the image of the object. In the CCD camera 1116, the image encoder 1153 encodes the image data through the camera interface unit 1154 to output encoded image data.

In the portable phone 1100, the image encoding apparatus 100 is used as the image encoder 1153 that performs the above-described process. Accordingly, in the same manner as the image encoding apparatus 100, the image encoder 1053 can perform the local control of the filter process more appropriately.

In the portable phone 1100, at the same time, the audio codec 1159 converts the audio collected by the microphone 1121 during the operation of the CCD camera 1116 into digital audio data and encodes the digital audio data.

In the portable phone 1100, the multiple separation unit 1157 multiplexes the encoded image data supplied from the image encoder 1153 and the digital audio data supplied from the audio codec 1159 in a predetermined method. In the portable phone 1100, the modulation/demodulation circuit unit 1158 performs the spectrum diffusion process with respect to the obtained multiplexed data, and the transmission/reception circuit unit 1163 performs the digital/analog conversion process and the frequency conversion process with respect to the output of the modulation/demodulation circuit unit 1158. The portable phone 1100 transmits the signal for transmission obtained through the conversion process to the base station (not illustrated) through the antenna 1114. The signal for transmission (image data) transmitted to the base station is supplied to a communication opposite party through the network and so on.

In the case where the image data is not transmitted, the image data generated by the CCD camera 1116 of the portable phone 1100 may be displayed on the liquid crystal display 1118 through the LCD control unit 1155, without passing through the image encoder 1153.

Also, for example, in the case of receiving data of a moving image file linked to a simple homepage and so on in a data communication mode of the portable phone 1100, the transmission/reception circuit unit 1163 receives the signal transmitted from the base station through the antenna 1114, amplifies the received signal, and performs the frequency conversion process and the analog/digital conversion process with respect to the amplified signal. In the portable phone 1100, the modulation/demodulation circuit unit 1158 performs the spectrum inverse diffusion process with respect to the received signal to restore the original multiplexed data. In the portable phone 1100, the multiple separation unit 1157 separates the multiplexed data into encoded image data and audio data.

In the portable phone 1100, the image decoder 1156 decodes the encoded image data to generate reproduced moving image data, and the LCD control unit 1155 displays the reproduced moving image data on the liquid crystal display 1118. Accordingly, for example, the moving image data included in the moving image file linked to the simple homepage is displayed on the liquid crystal display 1118.

In the portable phone 1100, the image decoding apparatus 200 is used as the image decoder 1156 that performs the above-described process. Accordingly, in the same manner as the image decoding apparatus 200, the image decoder 1056 moves the position of the ALF blocks based on the offset value supplied from the image encoding apparatus 100 so that the boundary of the ALF block coincides with the end of the slice, and performs the adaptive filter control process (and filter process). Accordingly, the image decoder 1156 can perform the local control of the filter process more appropriately.

In the portable phone 1100, at the same time, the audio codec 1159 converts the digital audio data into an analog audio signal, and outputs the analog audio signal through the speaker 1117. Accordingly, for example, the audio data included in the moving image file linked to the simple homepage is reproduced.

In the same manner as the e-mail, in the portable phone 1100, it is also possible that the recording/reproducing unit 1162 records (stores) the data linked to the simple homepage in the storage unit 1123.

Also, in the portable phone 1100, the main control unit 1150 analyzes a two-dimensional code that is obtained by the CCD camera 1116 through capturing, and acquires information recorded as the two-dimensional code.

Further, in the portable phone 1100, the infrared communication unit 1181 communicates with an external device using infrared rays.

Using the image encoding apparatus 100 as the image encoder 1153, the portable phone 1100 can perform the local control of the filter process more appropriately with respect to the encoded data that is generated by encoding the image data generated by the CCD camera 1116.

Also, using the image decoding apparatus 200 as the image decoder 1156, the portable phone 1100 can perform the local control of the filter process more appropriately with respect to the data of the moving image file linked to the simple homepage and so on.

As described above, it is exemplified that the portable phone 1100 uses the CCD camera 1116. However, instead of the CCD camera 1116, an image sensor using a CMOS (Complementary Metal Oxide Semiconductor) (CMOS image sensor) may be used. Even in this case, in the same manner as the case where the CCD camera 1116 is used, the portable phone 1100 can generate the image data of the image of the object by capturing the image of the object.

Also, although the portable phone 1100 has been described, for example, the image encoding apparatus 100 or the image decoding apparatus 200 can be applied to any device which has the same capturing function or communication function as that of the portable phone 1100, such as a PDA (Personal Digital Assistant), a smart phone, an UMPC (Ultra Mobile Personal Computer), a net book, and a notebook type personal computer, in the same manner as the portable phone 1100.

9. Ninth Embodiment

[Hard Disc Recorder]

Figure 32:
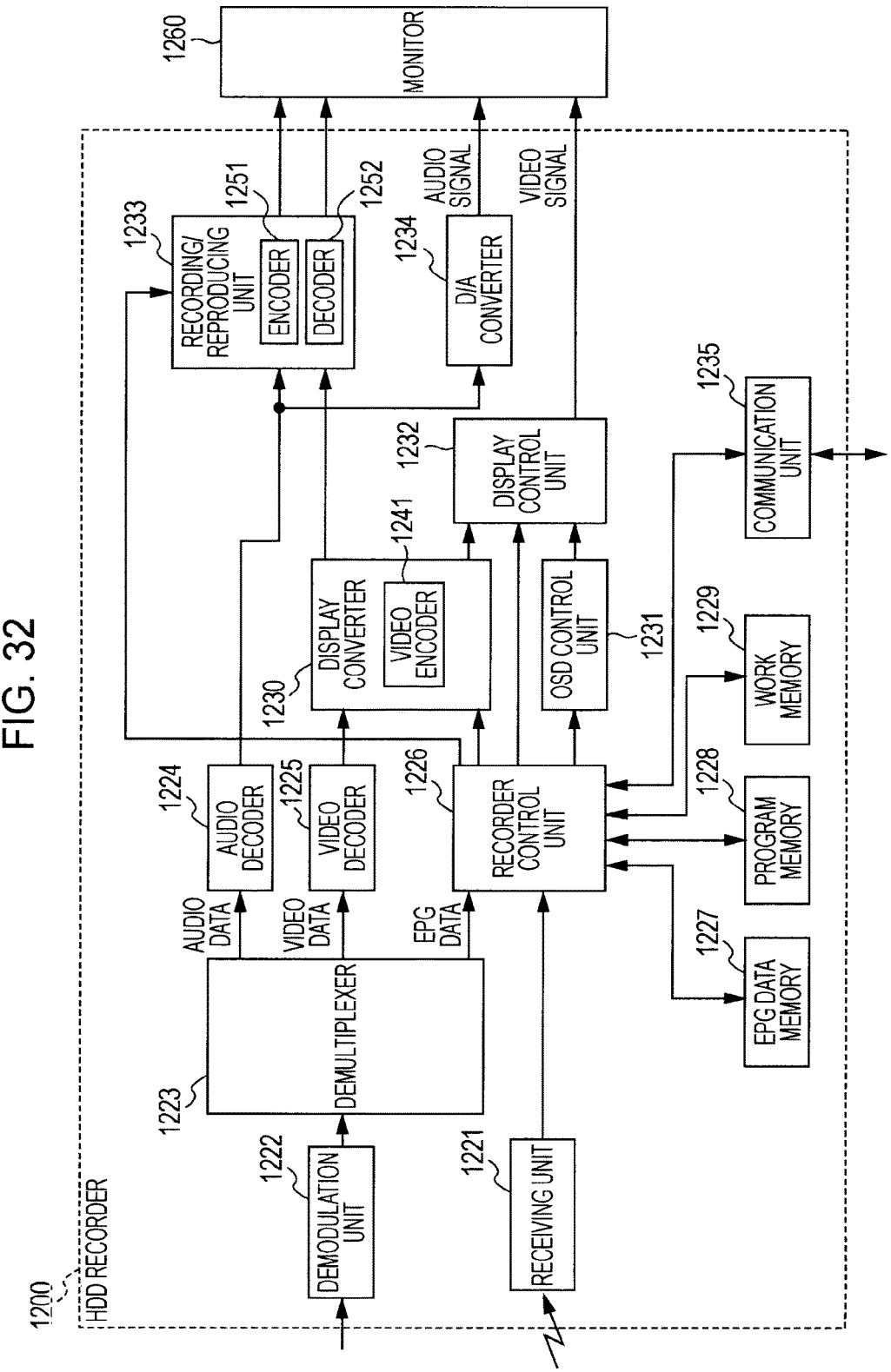
FIG. 32 is a block diagram illustrating a main configuration example of a hard disc recorder to which the present invention is applied.

FIG. 32 is a block diagram illustrating a main configuration example of a hard disc recorder using the image encoding apparatus and the image decoding apparatus to which the present invention is applied.

A hard disc recorder (HDD recorder) 1200 as illustrated in FIG. 32 is a device that preserves audio data and video data of a broadcasting program, which is included in a broadcast wave signal (television signal) that is transmitted from a ground antenna and so on and is received through a tuner, in a built-in hard disc, and provides the preserved data to a user in a timing according to the user's instruction.

The hard disc recorder 1200, for example, may extract the audio data and the video data from the broadcast wave signal, appropriately decode the extracted audio data and video data, and store the decoded audio data and video data in the built-in hard disc. Also, the hard disc recorder 1200, for example, may acquire audio data and video data from other devices through the network, appropriately decode the acquired audio data and video data, and store the decoded audio data and video data in the built-in hard disc.

Further, the hard disc recorder 1200, for example, may decode the audio data and video data recorded in the built-in hard disc to supply the decoded audio data and video data to a monitor 1260, display the image on a screen of the monitor 1260, and output the audio through a speaker provided in the monitor 1260. Also, the hard disc recorder 1200, for example, may decode audio data and video data extracted from the broadcast wave signal acquired through the tuner or audio data and video data acquired from another device through the network to supply the decoded audio data and video data to the monitor 1260, display the image on the screen of the monitor 1260, and output the audio through the speaker provided in the monitor 1260.

Of course, other operations can also be performed.

As illustrated in FIG. 32, the hard disc recorder 1200 includes a receiving unit 1221, a demodulation unit 1222, a demultiplexer 1223, an audio decoder 1224, a video decoder 1225, and a recorder control unit 1226. The hard disc recorder 1200 also includes an EPG data memory 1227, a program memory 1228, a work memory 1229, a display converter 1230, an OSD (On Screen Display) control unit 1231, a display control unit 1232, a recording/reproducing unit 1233, a D/A converter 1234, and a communication unit 1235.

Also, the display converter 1230 has a video encoder 1241, and the recording/reproducing unit 1233 has an encoder 1251 and a decoder 1252.

The receiving unit 1221 receives an infrared signal from a remote controller (not illustrated), converts the received infrared signal into an electric signal, and outputs the electric signal to the recorder control unit 1226. The recorder control unit 1226, for example, is composed of a microprocessor and so on, and performs various kinds of processes in accordance with programs stored in the program memory 1228. The recorder control unit 1226 used the work memory 1229 if necessary.

The communication unit 1235 is connected to the network, and performs a communication process with another device through the network. For example, the communication unit 1235 is controlled by the recorder control unit 1226, communicates with the tuner (not illustrated), and output a selection control signal mainly to the tuner.

The demodulation unit 1222 demodulates the signal supplied from the tuner, and outputs the demodulated signal to the demultiplexer 1223. The demultiplexer 1223 separates the data supplied from the demodulation unit 1222 into audio date, video data, and EPG data, and outputs the data to the audio decoder 1224, the video decoder 1225, and the recorder control unit 1226, respectively.

The audio decoder 1224 decodes the input audio data, and outputs the decoded audio data to the recording/reproducing unit 1233. The video decoder 1225 decodes the input vide data and outputs the decoded video data to the display converter 1230. The recorder control unit 1226 supplies the input EPG data to the EPG data memory 1227 to store the EPG data in the EPG data memory 1227.

The display converter 1230 encodes the video data supplied from the video decoder 1225 or the recorder control unit 1226 into, for example, NTSC (National Television Standards Committee) type video data through the video encoder 1241, and outputs the encoded video data to the recording/reproducing unit 1233. Also, the display converter 1230 converts the picture size of the video data supplied from the video decoder 1225 or the recorder control unit 1226 into a size that corresponds to the size of the monitor 1260, converts the video data into the NTSC type video data through the video encoder 1241, converts the vide data into an analog signal, and outputs the analog video signal to the display control unit 1232.

The display control unit 1232, under the control of the recorder control unit 1226, overlaps an OSD signal output from the OSD (On Screen Display) control unit 1231 on the video signal input from the display converter 1230, and outputs the overlapping video signal to the display of the monitor 1260 to display the overlapping video signal.

The D/A converter 1234 converts the audio data output from the audio decoder 1224 into an analog audio signal, and supplies the converted analog audio signal to the monitor 1260. The monitor 1260 outputs the audio signal through the built-in speaker.

The recording/reproducing unit 1233 has a hard disc as a storage medium for recording the video data or audio data.

The recording/reproducing unit 1233, for example, encodes the audio data supplied from the audio decoder 1224 through the encoder 1251. Also, the recording/reproducing unit 1233 encodes the video data supplied from the video encoder 1241 of the display converter 1230 through the encoder 1251. The recording/reproducing unit 1233 synthesizes the encoded data of the audio data with the encoded data of the video data through the multiplexer. The recording/reproducing unit 1233 performs the channel coding of the synthesized data, amplifies the channel-coded data, and records the data in the hard disc through a recording head.

The recording/reproducing unit 1233 reproduces the data recorded in the hard disc through a reproducing head, amplifies the reproduced data, and separates the data into audio data and video data through a demultiplexer. The recording/reproducing unit 1233 decodes the audio data and the video data through the decoder 1252. The recording/reproducing unit 1233 D/A-converts the decoded audio data, and outputs the converted analog audio signal to the speaker of the monitor 1260. Also, the recording/reproducing unit 1233 D/A-converts the decoded video data, and outputs the converted analog video signal to the display of the monitor 1260.

The recorder control unit 1226 reads latest EPG data from the EPG data memory 1227 based on a user instruction that is indicated by the infrared signal received from the remote controller through the receiving unit 1221, and supplies the EPG data to the OSD control unit 1231. The OSD control unit 1231 generates image data that corresponds to the input EPG data and outputs the generated image data to the display control unit 1232. The display control unit 1232 outputs the video data input from the OSD control unit 1231 on the display of the monitor 1260 to display the video data. Accordingly, the EPG (Electronic Program Guide) is displayed on the display of the monitor 1260.

Also, the hard disc recorder 1200 acquires various kinds of data, such as video data, audio data, or EPG data, supplied from another device through the network such as the Internet.

The communication unit 1235, under the control of the recorder control unit 1226, acquires the encoded data such as the video data, audio data, and EPG data transmitted from another device through the network, and supplies the acquired data to the recorder control unit 1226. The recorder control unit 1226, for example, supplies the encoded data of the acquired video data or audio data to the recording/reproducing unit 1233 to store the encoded data in the hard disc. At this time, the recorder control unit 1226 and the recording/reproducing unit 1233 may perform re-encoding and so on if necessary.

Also, the recorder control unit 1226 decodes the encoded data of the acquired video data and audio data, and supplies the obtained video data to the display converter 1230. The display converter 1230, in the same manner as the video data supplied from the video decoder 1225, processes the video data supplied from the recorder control unit 1226, and supplies the processed video data to the monitor 1260 through the display control unit 1232 to display the image.

Also, to match the image display, the recorder control unit 1226 supplies the decoded audio data to the monitor 1260 through the D/A converter 1234, and outputs the audio through the speaker.

Further, the recorder control unit 1226 decodes the encoded data of the acquired EPG data, and supplies the decoded EPG data to the EPG data memory 1227.

As described above, the hard disc recorder 1200 is a decoder that is built in the video decoder 1225, the decoder 1252, and the recorder control unit 1226, and uses the image decoding apparatus 200. Accordingly, the decoder that is built in the video decoder 1225, the decoder 1252, and the recorder control unit 1226, in the same manner as the image decoding apparatus 200, moves the position of the ALF blocks based on the offset value so that the boundary of the ALF block coincides with the end of the slice. Accordingly, the decoder that is built in the video decoder 1225, the decoder 1252, and the recorder control unit 1226 can perform the local control of the filter process more appropriately.

Accordingly, the hard disc recorder 1200, for example, can perform the local control of the filter process more appropriately with respect to the video data received through the tuner or the communication unit 1235 or the video data recorded in the hard disc of the recording/reproducing unit 1233.

Also, the hard disc recorder 1200 uses the image encoding apparatus as the encoder 1251. Accordingly, the encoder 1251, in the same manner as the image encoding apparatus 100, can suppress the reduction of the effect due to the local control of the filter process.

Accordingly, the hard disc recorder 1200, for example, can perform the local control of the filter process more appropriately with respect to the encoded data recorded in the hard disc.

As described above, it is exemplified that the video data and the audio data are recorded in the hard disc by the hard disc recorder 1200. However, any recording medium may be used. For example, even the recorder that adopts a recording medium except for the hard disc, such as the flash memory, optical disc, and video tape, can adopt the image encoding apparatus 100 and the image decoding apparatus 200 in the same manner as the above-described hard disc recorder 1200.

10. Tenth Embodiment

[Camera]

Figure 33:
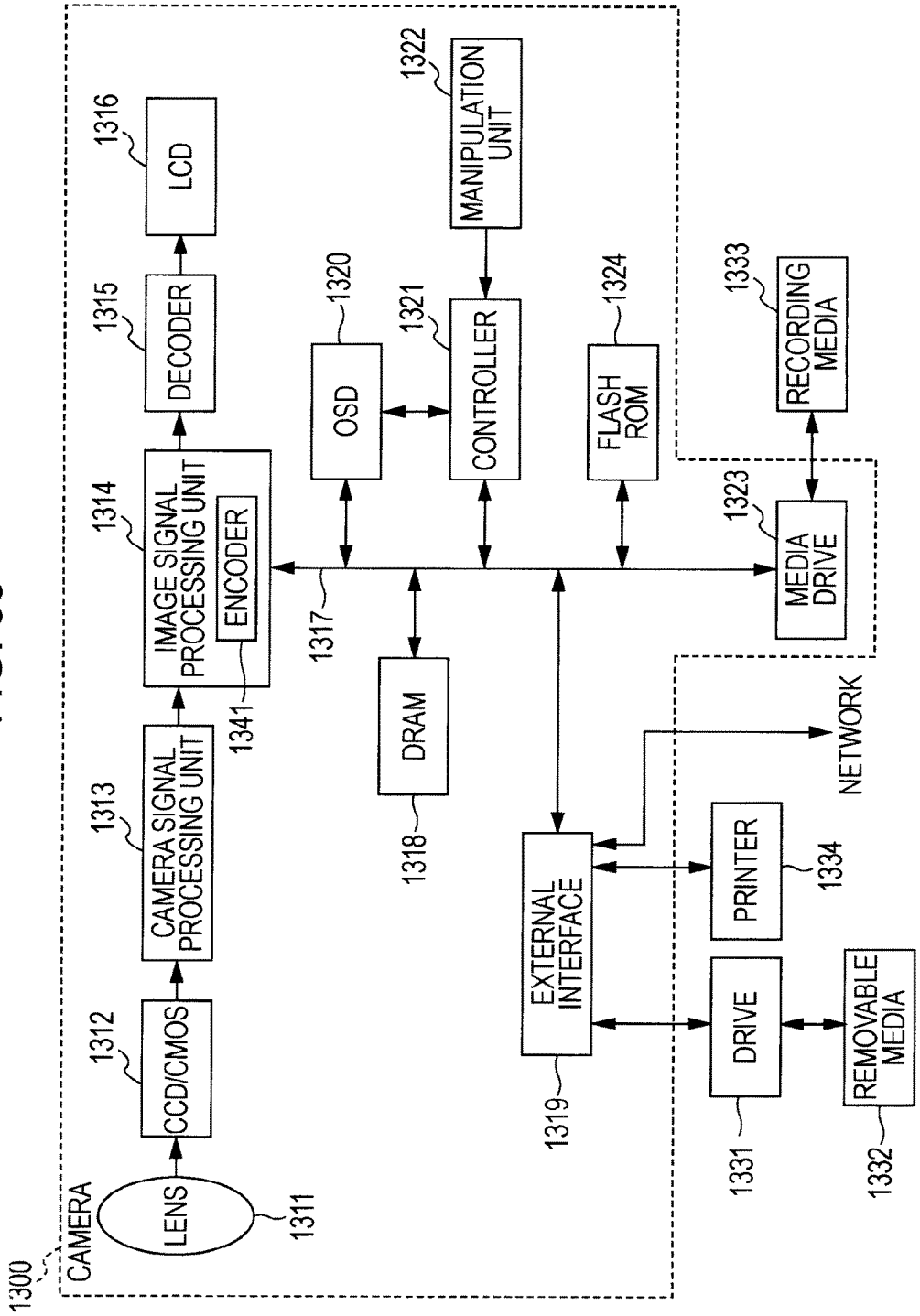
FIG. 33 is a block diagram illustrating a main configuration example of a camera to which the present invention is applied.

FIG. 33 is a block diagram illustrating a main configuration example of a camera that uses the image encoding apparatus and the image decoding apparatus to which the present invention is applied.

A camera 1300 as illustrated in FIG. 33 captures an image of an object, and displays the image of the object on the LCD 1316, or records the image in the recording medium 1333 as image data.

A lens block 1311 makes light (an image of an object) incident to a CCD/CMOS 1312. The CCD/CMOS 1312, which is an image sensor using the CCD or CMOS, converts the intensity of the received light into an electric signal, and supplies the electric signal to a camera signal processing unit 1313.

The camera signal processing unit 1313 converts the electric signal supplied from the CCD/CMOS 1312 into color difference signals of Y, Cr, and Cb, and supplies the color difference signals to the image signal processing unit 1314. The image signal processing unit 1314, under the control of a controller 1321, performs a predetermined image process with respect to the image signal supplied from the camera signal processing unit 1313, or encodes the image signal through an encoder 1341. The image signal processing unit 1314 supplies the encoded data generated by encoding the image signal to a decoder 1315. Further, the image signal processing unit 1314 acquires the data for display that is generated from the on screen display (OSD) 1320, and supplies the acquired data to the decoder 1315.

In the above-described process, the camera signal processing unit 1313 maintains the image data or encoded data obtained by encoding the image data in a DRAM (Dynamic Random Access Memory) 1318 if necessary, by appropriately using the DRAM 1318 connected through a bus 1317.

The decoder 1315 supplies the image data obtained by decoding the encoded data supplied from the image signal processing unit 1314 (decoded image data) to an LCD 1316. Also, the decoder 1315 supplies the data for display that is supplied from the image signal processing unit 1314 to the LCD 1316. The LCD 1316 appropriately synthesizes the image of the decoded image data supplied from the decoder 1315 with the image of the data for display, and displays the synthesized image.

The on screen display 1320, under the control of the controller 1321, outputs the data for display, such as a menu screen composed of symbols, characters, or diagrams, and icons, to the image signal processing unit 1314 through the bus 1317.

The controller 1321 performs various kinds of processes based on a signal that indicates the contents which a user has instructed using a manipulation unit 1322, and controls the image signal processing unit 1314, the DRAM 1318, an external interface 1319, the on screen display 1320, and a media drive 1323 through the bus 1317. IN a flash ROM 1324, a program or data, which is necessary for the controller 1321 to perform the various kinds of processes, is stored.

For example, the controller 1321, instead of the image signal processing unit 1314 or the decoder 1315, may encode the image data stored in the DRAM 1318 or decodes the encoded data stored in the DRAM 1318. In this case, the controller 1321 may perform the encoding/decoding process in the same method as the encoding/decoding method of the image signal processing unit 1314 or the decoder 1315, or may perform the encoding/decoding process in a method which the image signal processing unit 1314 or the decoder 1315 does not correspond to.

Also, for example, if a start of image printing is instructed through a manipulation unit 1322, the controller 1321 reads the image data from the DRAM 1318, and supplies the read image data to a printer 1334 connected to the external interface 1319 through the bus 1317 to print the image.

Further, for example, if the image recording is instructed through the manipulation unit 1322, the controller 1321 reads the encoded data from the DRAM 1318, and supplies the read encoded data to a recording medium 1333 mounted on the media drive 1323 through the bus 1317 to store the encoded data therein.

The recording medium 1333, for example, is a removable medium through which data read/write is possible, such as the magnetic disc, magneto optic disc, optical disc, or semiconductor memory. The kind of the recording medium 1333 as the removable medium is optional, and the recording medium may be a tape device, a disc, or a memory card. Of course, the recording medium may be a non-contact IC card.

Also, by unifying the media drive 1323 and the recording medium 1333, a non-portable storage medium, for example, a built-in hard disc drive, or an SSD (Solid State Drive) may be configured.

The external interface 1319 is composed of a USB input/output terminal or the like, and is connected to the printer 1334 when the image is printed. Also, the external interface 1319, if necessary, is connected to a drive 1331 on which the removable medium 1332, such as the magnetic disc, optical disc, or magneto optic disc, is appropriately mounted, and a computer program read from the removable medium is installed in a flash ROM 1324 if necessary.

Further, the external interface 1319 has a network interface connected to a predetermined network such as LAN or Internet. The controller 1321, for example, reads the encoded data from the DRAM 1318 in accordance with an instruction from the manipulation unit 1322, and supplies the read encoded data from the external interface 1319 to another device connected through the network. Also, the controller 1321 acquires the encoded data or image data, which is supplied from another device through the network, through the external interface 1319, and maintains the acquired data in the DRAM 1318 or supplies the acquired data to the image signal processing unit 1314.

As described above, the camera 1300 uses the image decoding apparatus 200 as the decoder 1315. Accordingly, the decoder 1315, in the same manner as the image decoding apparatus 200, moves the position of the ALF blocks based on the offset value so that the boundary of the ALF block coincides with the end of the slice. Accordingly, the decoder 1315 can perform the local control of the filter process more appropriately.

Accordingly, the camera 1300 can perform the local control of the filter process more appropriately with respect to the image data generated from the CCD/CMOS 1312, the encoded data of the video data read from the DRAM 1318 or the recording medium 1333, or the encoded data of the video data acquired through the network.

Also, the camera 1300 uses the image encoding apparatus 100 as the encoder 1341. Accordingly, the encoder 1341, in the same manner as the image encoding apparatus 100, can perform the local control of the filter process more appropriately.

Accordingly, the camera 1300 can perform the local control of the filter process more appropriately with respect to the encoded data recorded in the DRAM 1318 or the recording medium 1333 or the encoded data provided to another device.

In this case, the decoding method of the image decoding apparatus 200 or the image decoding apparatus 400 may be applied to the decoding process performed by the controller 1321. In the same manner, the encoding method of the image encoding apparatus 100 may be applied to the encoding process performed by the controller 1321.

Also, the image data captured by the camera 1300 may be a moving image or a still image.

Of course, the image encoding apparatus 100 and the image decoding apparatus 200 can be applied to devices or systems except for the above-described devices.

Also, the size of the macro block is not limited to 16×16 pixels. For example, macro blocks of any size, such as 32×32 pixels as illustrated in FIG. 34, may be adopted.

As described above, it is exemplified that the flag information and so on is multiplexed (described) into bit streams. However, in addition to such multiplexing, for example, the flag and the image data (or bit stream) may be transmitted (recorded). There may be a shape in which the flag and the image data (or bit stream) are connected (added) together.

The connection (addition) indicates a state in which the image data (or bit stream) and the flag are linked together (a state in which the image data and the flag correspond to each other), and their physical position relationship is optional. For example, the image data (or bit stream) and the flag may be transmitted through separate transmission paths. Also, the image data (or bit stream) and the flag may be recorded in separate recording media (or in separate recording areas in the same recording medium). In this case, the unit for linking the image date (or bit stream) to the flag is optional, for example, it may be set to the encoding processing unit (one frame, multiple frames, or the like).

The present application contains subject matter related to that disclosed in Japanese Priority Patent Application JP 2009-179396 filed in the Japan Patent Office on Jul. 31, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image decoding apparatus comprising:
   circuitry configured to
   decode encoded data including slice control data indicating whether or not a filtering process is to be performed on each slice of an image, and, only if the slice control data indicates that the filtering process is to be performed on a slice of the image, extract block control data for each block included in the slice of the image, the block control data indicating whether or not the filtering process is to be performed on each block; and
   perform the filtering process on the image generated by decoding the encoded data based on the slice control data and the block control data.

2. The image decoding device according to claim 1, wherein the circuitry is further configured to decode the slice control data and the block control data together with the image.

3. The image decoding device according to claim 2, wherein the slice control data and the block control data is encoded in each corresponding slice header of the image.

4. The image decoding device according to claim 1, wherein the circuitry is further configured to perform filtering the image as the filtering process, according to the slice control data and the block control data, wherein performing the filtering according to the block control data includes performing the filtering on a block included in a slice when the slice control data of the slice indicates that the filtering process is to be performed on the slice and the block control data of the block indicates that the filtering process is to be performed on the block.

5. The image decoding device according to claim 4, wherein
   the block control data for each block in the slice includes a flag indicating whether filtering is to be performed on the respective block, and
   when the circuitry performs the filtering, the circuitry performs the filtering with respect to each block when a flag included in the block control data for the respective block indicates that filtering is to be performed on the respective block.

6. The image decoding device according to claim 4, wherein the circuitry is further configured to control a display to display the image in which the filtering was applied as the filtering process, according to the slice control data and the block control data.

7. The image decoding device according to claim 1, wherein the circuitry is further configured to store the filtered image.

8. An image decoding method comprising:
   decoding encoded data including slice control data indicating whether or not a filtering process is to be performed on each slice of an image, and, only if the slice control data indicates that the filtering process is to be performed on a slice of the image, extracting block control data for each block included in the slice of the image, the block control data indicating whether or not the filtering process is to be performed on each block; and
   performing the filtering process on the image generated by decoding the encoded data based on the slice control data and the block control data.

9. The image decoding method according to claim 8, further comprising decoding the slice control data and the block control data together with the image.

10. The image decoding method according to claim 8, wherein the slice control data and the block control data is encoded in each corresponding slice header of the image.

11. The image decoding method according to claim 8, further comprising performing filtering the image as the filtering process, according to the slice control data and the block control data, wherein performing the filtering according to the block control data includes performing the filtering on a block included in a slice when the slice control data of the slice indicates that the filtering process is to be performed on the slice and the block control data of the block indicates that the filtering process is to be performed on the block.

12. The image decoding method according to claim 11, wherein
    the block control data for each block in the slice includes a flag indicating whether filtering is to be performed on the respective block, and
    when the circuitry performs the filtering, the circuitry performs the filtering with respect to each block when a flag included in the block control data for the respective block indicates that filtering is to be performed on the respective block.

13. The image decoding method according to claim 11, further comprising controlling a display to display the image in which the filtering was applied as the filtering process, according to the slice control data and the block control data.

14. The image decoding method according to claim 8, further comprising storing the filtered image.

15. A non-transitory computer-readable storage medium storing computer-readable instructions thereon, which, when executed by a computer, cause the computer to perform a method comprising:
    decoding encoded data including slice control data indicating whether or not a filtering process is to be performed on each slice of an image, and, only if the slice control data indicates that the filtering process is to be performed on a slice of the image, extracting block control data for each block included in the slice of the image, the block control data indicating whether or not the filtering process is to be performed on each block; and
    performing the filtering process on the image generated by decoding the encoded data based on the slice control data and the block control data.

16. The non-transitory computer-readable storage medium according to claim 15, further comprising decoding the slice control data and the block control data together with the image.

17. The non-transitory computer-readable storage medium according to claim 16, wherein the slice control data and the block control data is encoded in each corresponding slice header of the image.

18. The non-transitory computer-readable storage medium according to claim 15, further comprising performing filtering the image as the filtering process, according to the slice control data and the block control data, wherein performing the filtering according to the block control data includes performing the filtering on a block included in a slice when the slice control data of the slice indicates that the filtering process is to be performed on the slice and the block control data of the block indicates that the filtering process is to be performed on the block.

19. The non-transitory computer-readable storage medium according to claim 18, wherein
the block control data for each block in the slice includes a flag indicating whether filtering is to be performed on the respective block, and
when the circuitry performs the filtering, the circuitry performs the filtering with respect to each block when a flag included in the block control data for the respective block indicates that filtering is to be performed on the respective block.

20. The non-transitory computer-readable storage medium according to claim 18, further comprising controlling a display to display the image in which the filtering was applied as the filtering process, according to the slice control data and the block control data.

21. The non-transitory computer-readable storage medium according to claim 15, further comprising storing the filtered image.

* * * * *